US012801151B2

(12) United States Patent
Lynch et al.

(10) Patent No.: US 12,801,151 B2
(45) **Date of Patent: *Nov. 17, 2026**

(54) ACTION MODEL FOR A ROBOT

(71) Applicant: Figure AI Inc., San Jose, CA (US)

(72) Inventors: Corey Lynch, San Jose, CA (US); Yevgen Chebotar, San Jose, CA (US); Toki Migimatsu, San Jose, CA (US); Michael Ahn, San Jose, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/415,408

(22) Filed: Dec. 10, 2025

(65) Prior Publication Data

US 2026/0118878 A1 Apr. 30, 2026

Related U.S. Application Data

(63) Continuation of application No. 19/319,712, filed on Sep. 4, 2025, now Pat. No. 12,578,733.

(60) Provisional application No. 63/819,533, filed on Jun. 6, 2025, provisional application No. 63/776,429, filed on Mar. 24, 2025, provisional application No. 63/760,617, filed on Feb. 19, 2025, provisional application No. 63/725,279, filed on Nov. 26, 2024, provisional application No. 63/722,057, filed on Nov.

(Continued)

(51) Int. Cl.

| | |
|---|---|
| ***G05D 1/495*** | (2024.01) |
| ***G06F 40/40*** | (2020.01) |
| *G05D 101/15* | (2024.01) |
| *G05D 109/12* | (2024.01) |

(52) U.S. Cl.

CPC ............. *G05D 1/495* (2024.01); *G06F 40/40* (2020.01); *G05D 2101/15* (2024.01); *G05D 2109/12* (2024.01)

(58) Field of Classification Search

CPC ............... G05D 1/495; G05D 2101/15; G05D 2109/12; G06F 40/40

See application file for complete search history.

(56) References Cited

U.S. PATENT DOCUMENTS

| | | | |
|---|---|---|---|
| 5,280,431 | A | 1/1994 | Summerville |
| 7,912,574 | B2 | 3/2011 | Wurman |

(Continued)

FOREIGN PATENT DOCUMENTS

| | | | | |
|---|---|---|---|---|
| CN | 118809620 | A | 10/2024 | |
| WO | 2023210914 | A1 | 11/2023 | |
| WO | WO-2024073076 | A1 * | 4/2024 | ............. G08G 1/167 |

OTHER PUBLICATIONS

N. Vahrenkamp, S. Wieland, P. Azad, D. Gonzalez, T. Asfour and R. Dillmann, "Visual servoing for humanoid grasping and manipulation tasks," Humanoids 2008—8th IEEE-RAS International Conference on Humanoid Robots, Daejeon, Korea (South), 2008, pp. 406-412, doi: 10.1109/ICHR.2008.4755985. (Year: 2008).

(Continued)

*Primary Examiner* — Calvin Cheung

(57) ABSTRACT

A robot comprising a sensor configured to obtain data, an alpha model trained on video data and configured to generate data based upon both a spoken command from a human and data from the sensor, and a beta model configured to generate output data used to control an extent of the robot based in part upon the data generated by the alpha model and the data from the sensor.

35 Claims, 24 Drawing Sheets

Related U.S. Application Data 18, 2024, provisional application No. 63/715,270, filed on Nov. 1, 2024, provisional application No. 63/705,791, filed on Oct. 10, 2024, provisional application No. 63/703,454, filed on Oct. 4, 2024, provisional application No. 63/696,507, filed on Sep. 19, 2024, provisional application No. 63/696,533, filed on Sep. 19, 2024, provisional application No. 63/692,747, filed on Sep. 10, 2024, provisional application No. 63/690,334, filed on Sep. 4, 2024.

(56) References Cited

U.S. PATENT DOCUMENTS

| | | | | |
|---|---|---|---|---|
| 7,966,093 | B2 | 6/2011 | Zhuk | |
| 8,676,381 | B2 | 3/2014 | Kwon | |
| 8,942,848 | B2 | 1/2015 | Pratt | |
| 9,230,159 | B1 * | 1/2016 | Vijayanarasimhan | G06V 10/255 |
| 9,448,560 | B2 | 9/2016 | D'Andrea | |
| 10,963,493 | B1 | 3/2021 | Hu | |
| 11,457,983 | B1 | 10/2022 | Roh | |
| 12,466,075 | B2 | 11/2025 | Stathis | |
| 12,482,243 | B1 | 11/2025 | Cass | |
| 12,515,706 | B2 | 1/2026 | Li | |
| 2002/0103576 | A1 | 8/2002 | Takamura | |
| 2003/0060930 | A1 | 3/2003 | Fujita | |
| 2004/0015265 | A1 | 1/2004 | Asano | |
| 2004/0019485 | A1 | 1/2004 | Kobayashi | |
| 2004/0039483 | A1 | 2/2004 | Kemp | |
| 2004/0230340 | A1 | 11/2004 | Fukuchi | |
| 2008/0256008 | A1 * | 10/2008 | Kwok | G06N 3/004 706/20 |
| 2012/0155775 | A1 | 6/2012 | Ahn | |
| 2013/0218339 | A1 | 8/2013 | Maisonnier | |
| 2014/0316566 | A1 | 10/2014 | Mazel | |
| 2019/0130896 | A1 | 5/2019 | Zhou | |
| 2019/0163985 | A1 | 5/2019 | Wang | |
| 2020/0114506 | A1 | 4/2020 | Toshev | |
| 2020/0117214 | A1 | 4/2020 | Jonak | |
| 2020/0117336 | A1 | 4/2020 | Mani | |
| 2021/0181716 | A1 | 6/2021 | Quinlan | |
| 2021/0193138 | A1 | 6/2021 | Yu | |
| 2021/0331313 | A1 | 10/2021 | Klingensmith | |
| 2021/0387346 | A1 | 12/2021 | Gillett | |
| 2021/0390420 | A1 | 12/2021 | Barnett | |
| 2021/0398524 | A1 | 12/2021 | Gao | |
| 2022/0019796 | A1 * | 1/2022 | McNichols | G06N 20/00 |
| 2022/0186787 | A1 * | 6/2022 | Thompson | F16H 49/001 |
| 2023/0123443 | A1 * | 4/2023 | Atarot | G10L 15/28 704/275 |
| 2023/0126906 | A1 | 4/2023 | Kranski | |
| 2023/0168921 | A1 | 6/2023 | Kim | |
| 2023/0222454 | A1 | 7/2023 | Cella | |
| 2023/0306302 | A1 | 9/2023 | Mori | |
| 2023/0351203 | A1 * | 11/2023 | Ozay | G06N 3/096 |
| 2024/0095077 | A1 | 3/2024 | Singh | |
| 2024/0193848 | A1 | 6/2024 | Wang | |
| 2024/0199068 | A1 | 6/2024 | Pavone | |
| 2024/0289973 | A1 | 8/2024 | Liu | |
| 2025/0018583 | A1 | 1/2025 | Monti | |
| 2025/0103064 | A1 | 3/2025 | Shan | |
| 2025/0218160 | A1 | 7/2025 | Wang | |
| 2026/0016809 | A1 | 1/2026 | Shu-Xing Cheng | |

OTHER PUBLICATIONS

Ding, M., Yang, Z., Hong, W., Zheng, W., Zhou, C., Yin, D., & Tang, J. (2021). Cogview: Mastering text-to-image generation via transformers. arXiv:2105.13290v3. (Year: 2021).

English Translation of CN-118809620-A (Year: 2024).

Online Hierarchical Optimization for Humanoid Control (Year: 2016).

A Resilient and Energy-Aware Task Allocation Framework for Heterogeneous Multi-Robot Systems (Year: 2021).

Jiang et al. "Active Retrieval Augmented Generation," Dec 6-10, 2023, Proceedings of the 2023 Conference on Empirical Methods in Natural Language Processing, pp. 7969-7992. (Year: 2023).

Tian et al. "Design of a Flexible Articulated Robotic Hand for a Humanoid Robot," Oct. 15-17, 2019, 2019 IEEE-RAS 19th International Conference on Humanoid Robots (Humanoids), pp. 572-577. (Year: 2019).

* cited by examiner

ACTION MODEL FOR A ROBOT

CROSS-REFERENCE TO RELATED APPLICATIONS

This application is a continuation of U.S. patent application Ser. No. 19/319,712, filed Sep. 4, 2025, which claims the benefit of and priority to U.S. Provisional Patent Application Nos. 63/690,334, filed Sep. 4, 2025, 63/692,747, Sep. 10, 2024, 63/696,507, filed Sep. 19, 2024, 63/696,533, filed Sep. 19, 2024, 63/703,454, filed Oct. 4, 2024, 63/705,791, filed Oct. 10, 2024, 63/715,270, filed Nov. 1, 2024, 63/722,057, filed Nov. 18, 2024, 63/725,279, filed Nov. 26, 2024, 63/760,617, Feb. 19, 2025, 63/776,429, filed Mar. 24, 2025 and 63/819,533, filed Jun. 6, 2025, each of which is fully incorporated herein by reference.

TECHNICAL FIELD

This disclosure relates to systems, methods, and techniques for developing, deploying, using, and refining an action model to control a robot. The robot may include a plurality of hardware and software components that are configured to substantially mimic the movements, functionality, and capabilities of a human.

BACKGROUND

The field of robotics has long pursued the goal of creating humanoid robots capable of performing complex tasks in unstructured, human-centric environments. A significant challenge in this pursuit is the development of control systems that can manage the vast number of degrees of freedom (DoF) inherent in a humanoid form. Conventional robotic control systems have traditionally been limited in their scope and capability. Many existing models are narrowly focused, designed to control only a specific part of the robot, such as a 7-DoF end-effector or arm. This approach effectively treats the robot as a disembodied limb, failing to coordinate the entire body. As a result, such systems cannot perform actions that require dynamic balance, postural adjustments, or the use of the torso and legs to extend reach and navigate obstacles. The movements produced are often rigid and limited to a constrained set of pre-programmed motions.

Furthermore, a common deficiency in conventional systems is their reliance on generating discrete, or "binned," action outputs. This method breaks down continuous motion into a finite set of poses or commands. The result is often jerky, imprecise, and unnatural movement, akin to a video with a low frame rate. This discretization introduces compounding errors over time, causing the robot to deviate from its intended path and struggle with tasks requiring fluid, continuous adjustments. These systems lack the temporal consistency needed for smooth, long-horizon tasks and are not robust enough to adapt to the unpredictable nature of real-world environments.

Therefore, a significant need exists for a more advanced control architecture that can overcome these fundamental limitations. There is a demand for a system that can provide comprehensive, whole-body control over a high-degree-of-freedom humanoid robot and generate continuous, real-time control outputs to produce fluid, human-like motion, thereby enabling more effective and reliable performance in complex, dynamic settings.

SUMMARY

The presently disclosed subject matter is directed to a humanoid robot. Particularly, the robot comprises a plurality of actuators configured to control degrees of freedom of the humanoid robot. The robot comprises a plurality of sensors configured to capture multimodal sensory data including visual data, proprioceptive state information, and audio data. The robot comprises a bipedal action model (BAM) configured to receive the multimodal sensory data and natural language instructions as inputs, process the inputs through neural network architectures to generate continuous control commands for the plurality of actuators, and output action chunks comprising sequences of future actions spanning a predetermined time horizon. The continuous control commands directly specify control parameters for the degrees of freedom.

The presently disclosed subject matter is directed to a method for controlling a humanoid robot. Particularly, the method comprises receiving multimodal sensory inputs including visual data from onboard cameras, proprioceptive state information from joint encoders, and natural language instructions. The method comprises processing the multimodal sensory inputs through a bipedal action model (BAM) comprising neural network architectures. The method comprises generating continuous control commands for degrees of freedom based on the processed inputs. The method comprises organizing the continuous control commands into action chunks comprising sequences of future actions spanning a predetermined time horizon. The method comprises executing the action chunks to control movement of the humanoid robot.

The presently disclosed subject matter is directed to a bipedal action model (BAM) system for humanoid robot control. Particularly, the system comprises an alpha model configured to process high-level cognitive tasks including natural language understanding and long-horizon planning at a first frequency. The system comprises a beta model configured to process reactive control tasks at a second frequency higher than the first frequency. The system comprises a latent vector interface connecting the alpha model to the beta model, wherein the alpha model generates semantic information passed through the latent vector to condition the beta model's generation of continuous control commands for degrees of freedom of a humanoid robot.

The presently disclosed subject matter is directed to a computer-implemented method for training a bipedal action model (BAM). Particularly, the method comprises obtaining training data comprising internet-scale data, simulation data, and real-world humanoid robot demonstration data arranged in a layered structure. The method comprises preprocessing the training data including tokenization, normalization, and multimodal alignment. The method comprises training neural network models using the preprocessed training data with a loss function selected from regression losses and cross-entropy losses. The method comprises generating the BAM configured to output continuous control commands for degrees of freedom of a humanoid robot based on multimodal sensory inputs and natural language instructions.

The presently disclosed subject matter is directed to a humanoid robot control system. Particularly, the system comprises a perception system configured to process audio-visual data from sensors and generate three-dimensional images with contextual annotations. The system comprises a movement controller configured to determine action sequences based on environmental mapping and coordination planning. The system comprises a behavior manager configured to manage robot behaviors using model predictive control and mode selection. The system comprises a local artificial intelligence system comprising a bipedal action model (BAM) configured to drive autonomous operation by processing multimodal inputs and generating continuous control outputs for degrees of freedom.

The presently disclosed subject matter is directed to a method for controlling a humanoid robot. Particularly, the method comprises receiving multimodal input data comprising robot sensor data, robot state data, and user input data. The method includes processing the multimodal input data using a bipedal action model to generate continuous output data. The method includes applying an action chunking algorithm to the continuous output data to generate a sequence of action chunks, wherein each action chunk comprises a plurality of future actions spanning a predetermined time horizon. The method includes executing the sequence of action chunks to control movement of the humanoid robot.

The presently disclosed subject matter is directed to a humanoid robot system. Particularly, the system comprises a plurality of sensors configured to generate robot sensor data. The system includes a processor configured to execute a bipedal action model that processes multimodal input data comprising the robot sensor data, robot state data, and user input data to generate continuous output data comprising floating-point action vectors. The system includes actuators configured to execute the continuous output data to control movement of the humanoid robot.

The presently disclosed subject matter is directed to a method for deploying a bipedal action model (BAM) on a humanoid robot. Particularly, the method comprises selecting a deployment configuration specifying allocation of computational resources between local onboard processors and remote servers. The method comprises obtaining neural network model components including at least one of a vision-language model and a cross-attention encoder-decoder transformer. The method comprises training the neural network model components using multimodal training data to generate the BAM. The method comprises deploying the BAM to control degrees of freedom of the humanoid robot through generation of continuous action commands based on real-time sensory inputs.

The presently disclosed subject matter is directed to an article of manufacture comprising a non-transitory computer-readable medium storing instructions that, when executed by a processor, cause a humanoid robot to receive multimodal sensory data including visual frames, proprioceptive state information, and natural language commands, process the multimodal sensory data through a bipedal action model (BAM) comprising neural network architectures trained on layered training data, generate continuous control commands for degrees of freedom of the humanoid robot, organize the continuous control commands into action chunks spanning future time horizons, and execute the action chunks to perform autonomous tasks.

The presently disclosed subject matter is directed to systems and methods for controlling a humanoid robot using a bipedal action model (BAM) that comprises an alpha model and a beta model. The alpha model, which may be a vision-language transformer trained on a foundational layer of internet-scale image-text pairs and human videos using cross-entropy loss, is configured to process natural language commands and visual data to generate semantic representations at a first, lower frequency, such as between 1 Hz and 20 Hz. The beta model, which may be a cross-attention encoder-decoder transformer, is configured to receive these semantic representations through a latent vector interface and generate continuous control commands at a second, higher frequency, such as between 100 Hz and 10,000 Hz. The beta model is trained using regression loss on a layered dataset that includes simulation data and a top layer of real-world humanoid robot teleoperation data. The generated control commands are packaged into action chunks spanning a time horizon of 50 to 150 milliseconds, comprising sequences of floating-point values that specify joint position targets, velocities, and torques for each degree of freedom, with safety checks performed prior to execution to validate joint limits and avoid collisions.

BRIEF DESCRIPTION OF THE DRAWINGS

The drawing figures depict one or more implementations in accordance with the present teachings, by way of example only, not by way of limitation. These figures are intended to illustrate and not to restrict the scope of the disclosure. In the figures, like reference numerals refer to the same or similar elements. This convention is maintained throughout the drawings for consistency.

DETAILED DESCRIPTION

Figure 1:
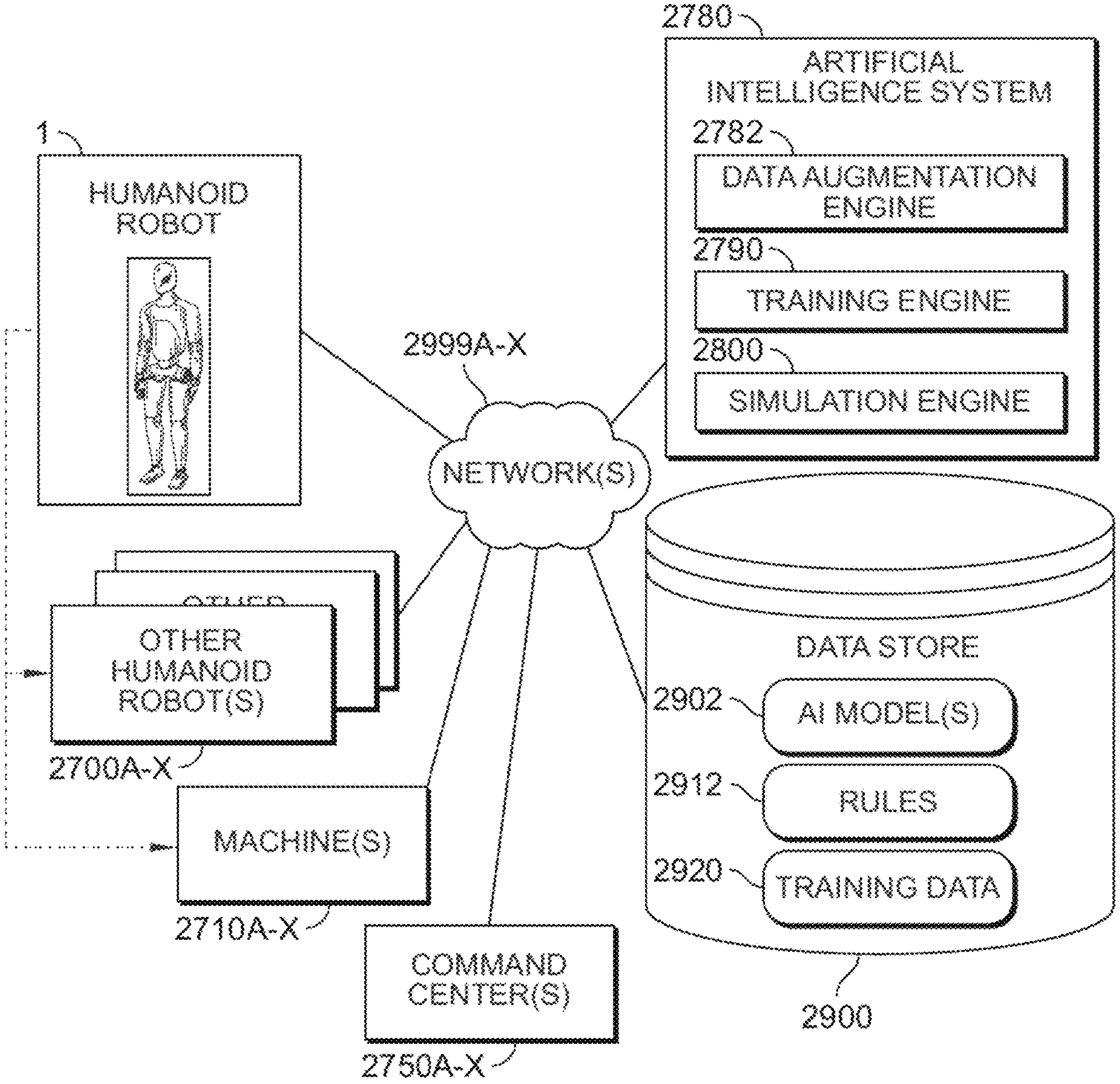
FIG. 1 is a diagram illustrating an environment and a network in which one or more humanoid robots of FIG. 1 may operate, connect, command or be commanded by, control or be controlled by, and/or interact.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively high-level, without detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A. INTRODUCTION

Disclosed herein is a bipedal action model (BAM) architecture characterized by a decoupled dual-system design, comprising a high-level cognitive alpha model and a low-level reactive motor beta model. The alpha model, which may be a large, pretrained vision-language model with billions of parameters, is responsible for perception, language understanding, and long-horizon planning. It operates at a low frequency to process complex multimodal inputs, such as a user command like "get me a drink from the fridge," and generates a task-conditioning latent vector that encapsulates the semantic goal of the task. This latent vector is then passed to the beta model, a smaller, high-frequency visuomotor policy with millions of parameters, which translates the high-level intent from alpha model into precise, continuous robot actions. This separation of concerns allows for independent development and optimization of the reasoning and control components, enabling the robot to benefit from the broad world knowledge of large models while maintaining the real-time responsiveness required for fluid and safe physical interaction in dynamic environments.

The placement of the alpha and beta models offers a range of deployment configurations to balance computational resources, latency, and autonomy. A fully local deployment, with both models running on the bipedal robot or humanoid robot's onboard hardware, minimizes communication latency and enables network-independent operation, which is suitable for tasks in environments with unreliable connectivity, but places a high demand on the robot's computational resources. The BAM's model architecture is highly configurable, allowing for different combinations of single and multiple models for the alpha and beta models to be employed. A system may be composed of a first pool that contains a single alpha model and a second pool that contains a single beta model. Meanwhile, the training of a BAM relies on a layered data structure that is designed to provide the model with a broad understanding of the world while grounding it in the specifics of robotic embodiment. The foundational layer consists of vast quantities of internet-scale text, images, and videos, supplemented by human demonstration data collected through robot-free methods like VR/AR systems, which provides a broad base of common-sense knowledge. The middle layer is composed of simulation and synthetic data, which provides a scalable way to generate millions of task-specific training examples in a controlled environment. The top layer contains the highest-fidelity real-world robot data, collected through teleoperation, which is essential for fine-tuning the model, bridging the sim-to-real gap, and ensuring its actions are physically plausible and effective.

The training process for a BAM can be adapted to its specific architecture, such as an beta model-only or a combined alpha/beta model, and can be based on imitation learning or other types of learning. The process can involve preparing a comprehensive, multimodal training dataset, which is then used to train the selected model configuration. For an beta model-only, the training focuses on learning a direct mapping from visual and state inputs to actions, making it highly proficient at a specific task. The co-trained of the combined alpha/beta model can be an end-to-end process, where the error between the beta model's predicted action and a ground-truth demonstration are backpropagated through both models. This allows the high-level alpha model to be fine-tuned and its general knowledge to be grounded in the physical actions of the beta model, leading to a more robust and generalizable policy.

The deployment of a trained BAM can involve a continuous, closed-loop process of perception, planning, and action. During runtime, the deployed model receives a stream of multimodal inputs, including user commands and real-time sensor and state data from the robot. This data is ingested by the BAM, which outputs a sequence of action chunks representing the desired future trajectory of the robot. These high-level actions can then translated into low-level motor commands by a whole body controller, which also performs a series of safety checks to ensure the commands are kinematically feasible and collision-free before executing them on the robot's actuators. The robot's new state is then fed back into the BAM, allowing for a continuous cycle of action generation that enables the robot to perform long-horizon tasks and dynamically adapt to its environment.

The disclosed BAM integrates artificial intelligence models into a tangible system that solves significant, long-standing technological problems in robotic control. The disclosed BAM is not merely an instruction to "apply" an abstract idea on a generic computer; rather, it is a particular technological solution to a deeply rooted technological problem. A primary technical improvement offered by the BAM is its revolutionary approach to whole-body, continuous control. Conventional robotic systems are fundamentally limited, often confined to controlling a 7-degree-of-freedom (DoF) end-effector with discrete, binned-value outputs, which results in movements that are characteristically clunky, stilted, and imprecise. The disclosed BAM architecture overcomes this critical deficiency by providing direct, continuous control over the full sixty-two degrees of freedom of the bipedal or humanoid robot. This is not a mere improvement in processing speed but a fundamental paradigm shift in robotic control, enabling highly coordinated, human-like motions that leverage the robot's entire physical structure for dynamic balance, extended reach, and sophisticated obstacle negotiation. This constitutes a specific, tangible improvement to the functioning and capability of the robot itself, far exceeding the abstract idea of robotic control.

Action chunking can be used for the BAM output, where the alpha model predicts a sequence of multiple future actions in a single inference step. This approach offers several advantages, including the mitigation of compounding errors in imitation learning, the ability to handle non-Markovian behaviors in demonstration data, and the decoupling of the model's low inference frequency from the robot's high control frequency, which can be helpful in achieving smooth, human-like motion. Various action chunking strategies can be employed, from simple sequential execution, which is easy to implement but may lead to jerky movements, to more advanced asynchronous methods like real-time chunking and temporal ensemble, which are designed to improve motion smoothness and reactivity by overlapping the prediction and execution of action chunks.

Furthermore, the BAM provides a particular solution to the well-known technical problem of compounding errors in imitation learning through its use of "action chunking." By predicting and executing a sequence of future actions in a single inference step, the BAM architecture specifically mitigates the accumulation of small prediction errors that cause prior art systems to deviate from desired trajectories. This technique provides a concrete solution that improves the temporal consistency and reliability of the robot's movements. This is combined with a specific and versatile internal architecture, such as the hierarchically arranged alpha and beta models with defined local, remote, or split deployment configurations, which solves the technical challenge of achieving real-time, context-aware decision-making without the debilitating latency that plagues remote-only systems. The invention is therefore not directed to the mere idea of a solution, but to a particular, structured, and effective way of achieving a desired technical outcome.

B. DEFINITIONS

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although selected human medical terminology is used to describe features and/or relative positions related to the bipedal or humanoid robot, it should be understood that said medical terminology may not directly correspond to the exact same features of a human. It should be understood that names of various assemblies and components (e.g., including housings and assemblies contained within) may generally relate to a location of similar anatomy of a human body and may not have an exact correlation in dimension, function, or shape. The reference system including three orthogonal reference planes is defined with respect to the robot in a neutral standing position to describe relative positions of components of the robot. Although standard human medical terminology is used to describe the anatomical reference planes (i.e., sagittal, coronal, transverse) of the robot, the planes may be shifted from the typical location on a human to be meaningful for the kinematic layout and features of the robot.

Humanoid Robot: a robot that is capable of bipedal locomotion and includes components (e.g., head, torso, etc.) that generally resemble parts of a human. However, the robot does not need to include every part of a human (e.g., hands with over ten degrees of freedom), nor do its components need to have a shape that exactly or substantially resembles human parts. Furthermore, it should be understood that a humanoid robot is not designed to be primarily quadruped or have a wheeled base.

Neutral State: a state where the robot is standing upright on a horizontal support surface (PG) and facing a forward direction with its torso substantially vertically aligned over its pelvis and legs, where the legs are substantially straight with the knees substantially aligned under the hips and substantially above the ankles, such that the robot's weight is balanced over its feet. In the neutral state, the robot's head is facing forward (i.e., in the forward direction), the arms are located at the sides of the robot, the hands are oriented with the palms facing substantially inward, and the fingers pointing in a substantially downward direction toward the horizontal support surface. An illustrative example of the neutral state for the humanoid robot 1 is shown FIG. 3A.

Figure 3A:
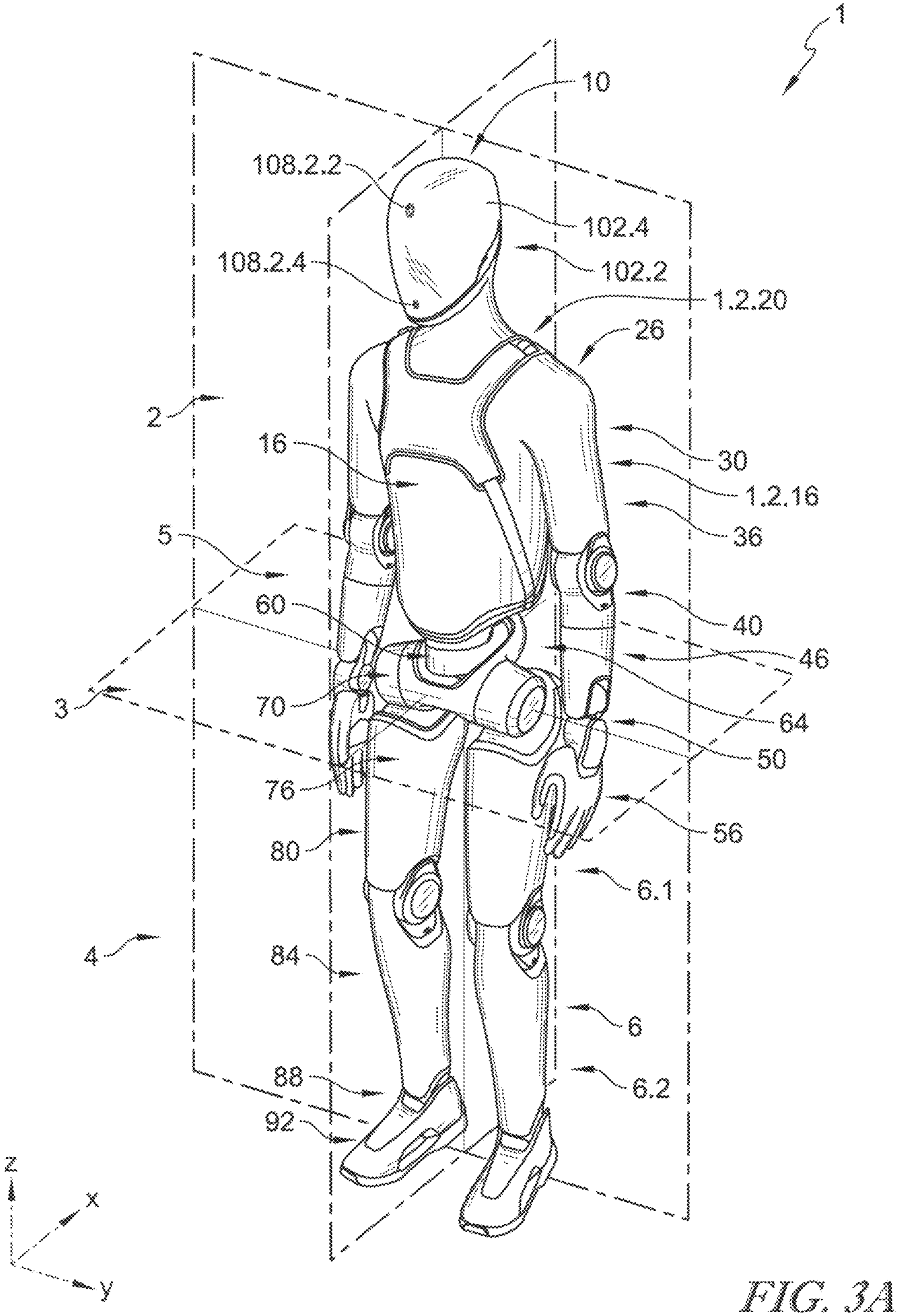
FIG. 3A is a perspective view of the humanoid robot of FIGS. 1-2.
Figure 3B:
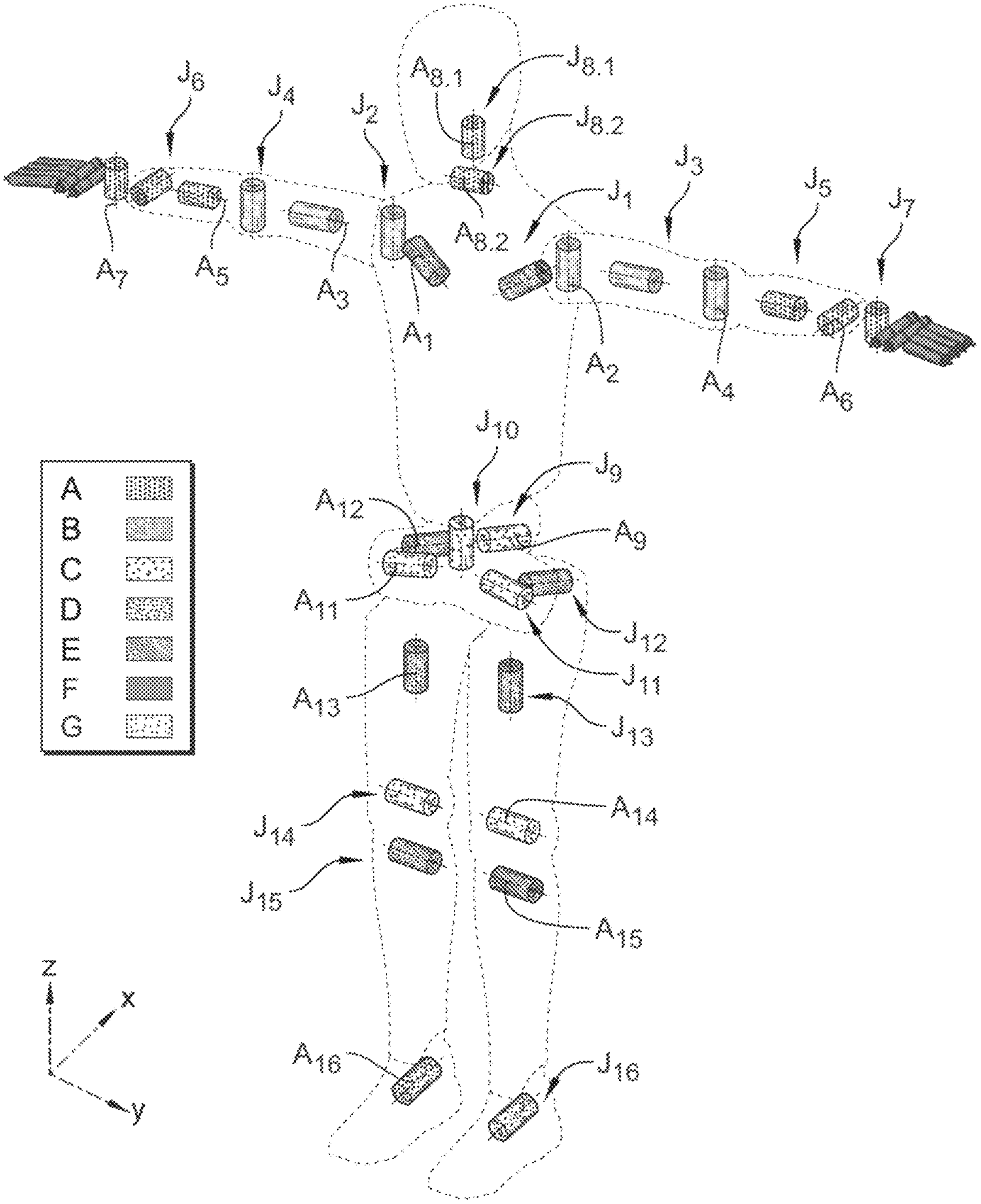
FIG. 3B is a diagram illustrating actuators contained within the humanoid robot of FIG. 1-3A and the corresponding rotational axes of said actuators.

Extended State: a state of the robot with the arms extended outward laterally at the shoulder (as illustrated in FIG. 3B) and oriented with the palms of the hands substantially facing downward and the fingers pointing in a substantially outward direction, where the central and lower portions of the robot remain in a neutral state.

Sagittal Plane: a vertical plane when the robot is in the neutral state that aids in defining left and right sides of the robot for all states. Accordingly, the sagittal plane may: (i) divide the robot and/or the torso into left and right portions or halves, (ii) extend through an axis of rotation about which the torso twists or rotates relative to the pelvis and legs, (iii) contain an origin point of the robot, and/or (iv) be positioned between the left and right legs, and/or left and right arms. In an illustrative embodiment, the sagittal plane (Ps) (e.g., as illustrated in FIG. 3A) is a vertical plane positioned at a midway point between the left and right legs and the left and right arms and contains a rotational axis $A_{10}$ of a torso twist actuator (J10) (e.g., as illustrated in FIG. 3B) located in the spine 60 of the robot 1 and divides the left and right sides of the robot 1 (e.g., as illustrated in FIG. 3A). In other words, in an illustrative embodiment, the sagittal plane (Ps) is a plane that is colinear with the rotational axis $A_{10}$ of the torso twist actuator (J10).

Coronal Plane: a vertical plane when the robot is in the neutral state that aids in defining front and back portions of the robot for all states. Accordingly, the coronal plane may: (i) divide the robot and/or the torso into front and back portions or halves, (ii) contain an axis of rotation about which the torso pitches forward or backward from the neutral state, (iii) contain an axis of rotation of a knee joint about which a lower shin pitches forward and backward, and/or (iv) contains an axis of rotation of an elbow joint about which a lower forearm moves forward and backward, when the robot is in the extended state. In various embodiments, said axis of rotation for torso pitch may be two colinear axes, a single centrally located axis, an axis defined by a line connecting the midpoints of two non-collinear actuator axes that provide the torso pitch function, or an axis defined by a line connecting the center of actuator bearings of two actuators that provide the torso pitch function. In the illustrative embodiment (see, e.g., FIGS. 3A and 3B), the coronal plane ($P_C$) is a vertical plane that contains the rotational axes $A_{11}$ of the hip flex actuators (J11) located in the hips 70 (and likewise may contain an axis defined by a line connecting the midpoints of a left hip flex actuator (J11) axis ($A_{11}$) and a right hip flex actuator (J11) axis ($A_{11}$) and rotational axis $A_{10}$ of torso twist actuator (J10) located in the spine 60 of the robot 1. As shown in these figures, the coronal plane ($P_C$) does not bisect the robot, or torso, into equal front and back halves, as it is offset forward of a majority of the arm actuators in the extended position, and other positional relationships that can be understood from the figures.

Transverse Plane: a horizontal plane that aids in defining the upper and lower portions of the robot. Accordingly, the transverse plane may: (i) divide the robot into upper and lower portions or halves, and/or (ii) contain an axis of rotation about which the torso pitches forward or backward, as discussed above. In the illustrative embodiment, the transverse plane ($P_T$) is a horizontal plane that contains the mid-point of the rotational axes $A_{11}$ of the hip flex actuators (J11) located in the hips 70 of the robot 1.

Origin Point: an orthogonal intersection point of the sagittal plane, coronal plane, and transverse plane, all of which extend through the humanoid robot disclosed herein. In the illustrative embodiment of the robot 1 shown in FIG. 3A, an origin point (Cp) is present and shown.

Reference Axes: consist of: (i) the Z-axis (vertical) is defined pursuant to the intersection of the sagittal plane and coronal plane, (ii) the Y-axis (horizontal) is defined pursuant to the intersection of the coronal plane and transverse plane; and (iii) the X-axis (depth) is defined pursuant to the intersection of the sagittal plane and transverse plane. FIG. 3A illustrates example Z, Y, X reference axes where the sagittal, coronal, and transverse planes share a common origin point.

Kinematic Chain: a representation of an assembly of rigid bodies connected by joints to provide constrained motion. Within this application, e.g., FIG. 3B, a kinematic chain is illustrated by cylindrical bodies, where the respective central axis of each individual cylindrical body represents the position and orientation of the axis of rotation for the individual joints. For example, each rotary actuator has a central rotational axis. Other types of actuators may include linkages that provide rotational movement about one or more rotational axes via linkages, bearing or other rotation features, or other means.

Range of Motion: a range of rotational motion of an actuator about an axis of rotation, where a first and second angle define a rotational limit in opposing rotational directions from a neutral position of the actuator with the limits expressed in Radians.

Degrees of Freedom (DoF): the number of parameters that define the configuration of the kinematic chain and possible movements associated therewith.

Singularities: geometric configurations of the robot's joints in which one or more degrees of freedom are effectively lost due to the alignment or overlap of rotational or translational axes, which in some cases is also affected by interference of extents of components where one or more of the components are moved by the joint.

Actuator Bearing: a specific component of the individual actuator that is generally ring-shaped with parallel edge guides, wherein the rotational axis ($A_n$) of the actuator is centered within the actuator bearing and orthogonal to the parallel edge guides. Within this application, the actuator bearings of individual actuators are referenced to further define orientation of the rotational axes and/or relative size of the individual actuator.

Actuator bearing plane ($B_n$): a plane defined mid-width of actuator bearing between parallel edge guides and orthogonal to the rotational axis ($A_n$).

Textile: a flexible (e.g., fabric-like), highly durable cover material that has high elastic stretch capabilities and is resistant to pilling, abrasions, and cuts. A textile includes both common textiles (e.g., traditional woven cloth), engineered textiles, and non-fabric-like materials (e.g., plastics or polymers), and/or a combination of the above.

C. ROBOT(S) AND ENVIRONMENT

FIG. 1 illustrates an exemplary network and/or operational environment in which a humanoid robot (also referred to as a bipedal robot) 1, which is further detailed in additional figures herein, may operate. The environment may include a plurality of interconnected components, such as: (i) the humanoid robot 1, (ii) one or more other humanoid robots 2700A-X which may the same as or different from the robot 1, (iii) one or more machines 2710A-X, (iv) one or more command centers 2750A-X, (v) one or more remote artificial intelligence (AI) system(s) 2780 which are remote from the robot 1, such as a cloud-base AI system, and (vi) one or more data stores 2900. Each component may be interconnected with another component, directly or indirectly, by at least one of: (i) one or more networks 2999A-X, (ii) direct communication systems (not illustrated—e.g., a data store 2900 may have direct communication with a remote AI system 2780) and/or (iii) physical contact with one another (e.g., the humanoid robot 1 may be in direct physical contact when operating a machine 2710A-X). The one or more networks 2999A-X may include, for example, the Internet, a local area network, a wide area network, a private network, a cloud computing network, or a network based on a wireless communication protocol. Additionally, it should be understood that the humanoid robot 1 may be interconnected with one or more other humanoid robots 2700A-X through a wireless communication protocol, such as a Bluetooth connection or a connection based on a near-field communication protocol, or through a wired connection.

The humanoid robot 1 may be collocated with one or more of the other humanoid robots 2700A-X to collectively or separately perform a given task or workflow. Such operations may occur, e.g., at a worksite such as a factory, warehouse, industrial facility, or home. Furthermore, the humanoid robot 1 may also be situated in a separate geographical location relative to other humanoid robots 2700A-X. For example, the humanoid robot 1 may be located in a given worksite, while another humanoid robot 2700A-X is located at another worksite in a different geographical location.

The operational environment may generally include machines 2710A-X, which may be embodied as any device, heavy machinery, or object with which a humanoid robot 1 and/or other humanoid robots 2700A-X may interact. For instance, a machine 2710A-X can include, among other things, tools, packaging machinery, forklifts, drilling machines, pallet movers, HVAC equipment, carts, bins, and platform machines.

The command centers 2750A-X may be comprised of one or more physical computing devices or virtual computing instances executing on a local or cloud network. These centers 2750A-X may be utilized for one or more of monitoring, managing, and configuring tasks, as well as for issuing control directives to the humanoid robot 1 and other humanoid robots 2700A-X at one or more worksites. A command center 2750A-X may be collocated with any of the humanoid robot 1 or the other humanoid robots 2700A-X, or it may be located in a different geographical location from the robots 1 and other humanoid robots 2700A-X. The computing devices of the command centers 2750A-X may execute software that is used to monitor (e.g., charge level, task performance, etc.), manage the robots 1 and other humanoid robots 2700A-X, and/or transmit long-horizon goals, tasks, and control directives to the robots 1 and other humanoid robots 2700A-X over the networks 2999A-X. Additionally and as such, the humanoid robots 1 and other humanoid robots 2700A-X may each be configured to: (i) send data to the command centers 2750A-X, (ii) perform a given task based on the transmitted long-horizon goals, tasks, and control directives, and/or (iii) infer a task based on the transmitted long-horizon goals, tasks, and control directives.

The command centers 2750A-X may determine, based on available humanoid robots 1 and the capabilities of each robot, which of the robots may be best suited for a given task. For example, the command centers 2750A-X may identify a humanoid robot 2700A-X to transfer parts to the other room once they are placed in the jig. The command centers 2750A-X may thereafter relay the assignment to the assigned other humanoid robot 2700A-X, which may be identified based on a unique identifier (e.g., serial number) assigned to each of the humanoid robots 1 and 2700A-X, and also to the other humanoid robots 2700A-X to indicate which other humanoid robot 2700A-X has been assigned the task.

The remote AI system 2780 may be comprised of one or more computing devices that are configured to perform global operations related to AI/ML for the entire computing environment. For example, the remote AI system 2780 may store, retrieve, and otherwise manage data within the data store 2900. This data may include one or more AI models 2902, rules 2912, and training data 2920. The AI models 2902 may be embodied as any type of model that: (i) can be run in an environment that is remote from the humanoid robot 1 and 2700A-X, while being in communication with the humanoid robot 1 to enable the humanoid robots 1 and 2700A-X to perform the functions described herein (e.g., observing, reasoning, and performing tasks), (ii) can be sent to the humanoid robot 1 and 2700A-X, where the humanoid robot 1 and 2700A-X runs the model locally to perform the functions described herein, and/or (iii) can be used in the training of any model described herein. For instance, the AI models 2902 may comprise artificial neural networks, convolutional neural networks, recurrent neural networks, generative adversarial networks, variational autoencoders, diffusion models, transformer models, natural language processing models (e.g., speech-to-text and/or text-to-speech), object detection models, image segmentation models, facial recognition models, transfer learning models, autoregressive models, large language models, visual language models, vision-action models, multi-modal language models, graph neural networks, reinforcement learning models, or any other type of model known in the art or disclosed herein. The rules 2912 may be comprised of sets of rules and conditions that are used to enable: (i) deterministic behavior by the humanoid robot 1 and the other humanoid robots 2700A-X, (ii) training the models that enable the humanoid robots 1 and 2700A-X to perform the functions described herein, and/or any other known rule. For example, the rules 2912 may include any combination of finite state machines, reactive control protocols, safety rules, configuration files, task sequencing protocols, safety protocols, and/or protocols for compliance with standards, safety, morals and/or regulations.

The training data 2920 may be embodied as any type of data that is used to train one or more of the AI models 2902. For example, the training data 2920 may include: (i) image data, such as raw image data, annotated image data, or synthetic data comprising computer-generated images used to augment real image datasets, particularly in instances where usable data is scarce; (ii) video data, such as raw video data, annotated video data, or synthetic data; (iii) text data, such as natural language instructions, dialogue data, machine-readable instructions, or natural language mapping data; (iv) depth data, such as map data or point cloud data; (v) robot joint trajectories; (vi) robot joint locations; (vii) robot joint location data, which may be obtained from teleoperation of a robot; (viii) robot joint rotations data, which may also be obtained from teleoperation of a robot; (ix) other robot sensor data, such as inertial measurement unit (IMU) data, force and torque data, or proximity sensor data; (x) simulation data; (xi) human demonstration data, such as first person or third person images or videos of humans performing a task; (xii) robot demonstration data, such as images or videos of other robots performing a task; (xiii) any combination of the aforementioned data types; and/or (xiv) any other known data type. For clarity, it should be understood that any data type that is described above may be either labeled or unlabeled.

The remote AI system 2780 may include a data augmentation engine 2782, a training engine 2790, and a simulation engine 2800. The data augmentation engine 2782 may be embodied as any combination of hardware, software, or circuitry that is configured to increase the size and diversity of the training data 2920, particularly in instances where the training data is limited. For example, the data augmentation engine 2782 may be configured to perform: (i) image augmentation of visual data such as images and video frames (e.g., identifying anatomical point and/or kinematic chains), (ii) sensor data augmentation to simulate real-world inaccuracies like noise, thereby assisting in training the AI models 2902 to account for such inaccuracies, (iii) trajectory augmentation to modify the speed or timing of movements, which assists the AI models 2902 in learning to recognize and adapt to different behaviors, or to alter the trajectories or paths of the robot 1 in simulations, and (iv) domain randomization, which involves altering parameters including textures, lighting, and object positions.

The illustrative training engine 2790 may be embodied as any combination of hardware, software, or circuitry for training the AI models 2902, given a set of rules 2912 and training data 2920. To do so, the training engine 2790 may apply a variety of AI/ML techniques, such as supervised learning techniques (e.g., classification, regression), unsupervised learning techniques (e.g., clustering, dimensionality reduction, anomaly detection), semi-supervised learning techniques (e.g., training with both labeled and unlabeled data), reinforcement learning techniques (e.g., model-free methods, model-based methods), ensemble learning, active learning, and transfer learning techniques (e.g., by leveraging pre-trained models 2902). It should be understood that each of these techniques may be applied online or offline.

The simulation engine 2800 may be embodied as any combination of hardware, software, or circuitry for executing one or more of the AI models 2902 within a virtualized simulation environment. This allows for the simulation and analysis of various aspects of the humanoid robot 1, such as its kinematics, sensor behavior, overall behavior, anomalies, and the like. For example, the simulation engine 2800 may generate the simulation environment based on real-world mapping data that was previously observed and/or generated by the humanoid robot 1 or other humanoid robots 2700A-X, or that was obtained from third-party services. The simulation engine 2800 may also generate a physics-accurate model of the humanoid robot 1, which has a specified configuration (e.g., a physical structure, joints, sensors, actuators, and other components with predefined parameter sets). The data generated from the simulations may then be used by the training engine 2790 to build, train, alter, fine-tune, or modify a previously generated model, a new model, and/or rules. Advantageously, the simulation engine 2800 is designed to improve efficiencies in the manufacture, testing, and deployment of a given humanoid robot 1 for a specified purpose.

The remote AI system 2780 may account for the substantial computing and resource demands required by AI/ML-based techniques by processing at least a portion of data, requests, and/or training. As such, the humanoid robots 1 may be configured with considerably less powerful compute, network, and storage resources. For instance, the humanoid robot 1 may prioritize certain processes, such as those relating to the performance of a presently assigned task, and offload other processes, such as the refining of local AI/ML models, to the remote AI system 2780. The remote AI system 2780 may also periodically update the humanoid robots 1 and 2700A-X with refined AI models 2902 and training data 2920, or it may receive updates and propagate them to the robots 1, for instance, via over-the-air updates or push subscription-based updates. The remote AI system 2780 may also push updated rules 2912 to the robots 1 and 2700A-X. Additionally, the remote AI system 2780 may receive data from each of the humanoid robots 1 and 2700A-X, which may include behavioral information, learning information, model reinforcement data, and the like. The remote AI system 2780 may store such data as training data 2920 and subsequently use this data to refine the AI models 2902.

Although FIG. 1 depicts the data augmentation engine 2782, the training engine 2790, and the simulation engine 2800 as executing on a single remote AI system 2780, one of skill in the art will recognize that each of these engines may execute on separate systems or computing nodes associated with the remote AI system 2780. Such an arrangement may be advantageous in improving the performance and resource management of each of the engines 2782, 2790, and 2800.

D. HUMANOID ROBOT

Figure 2:
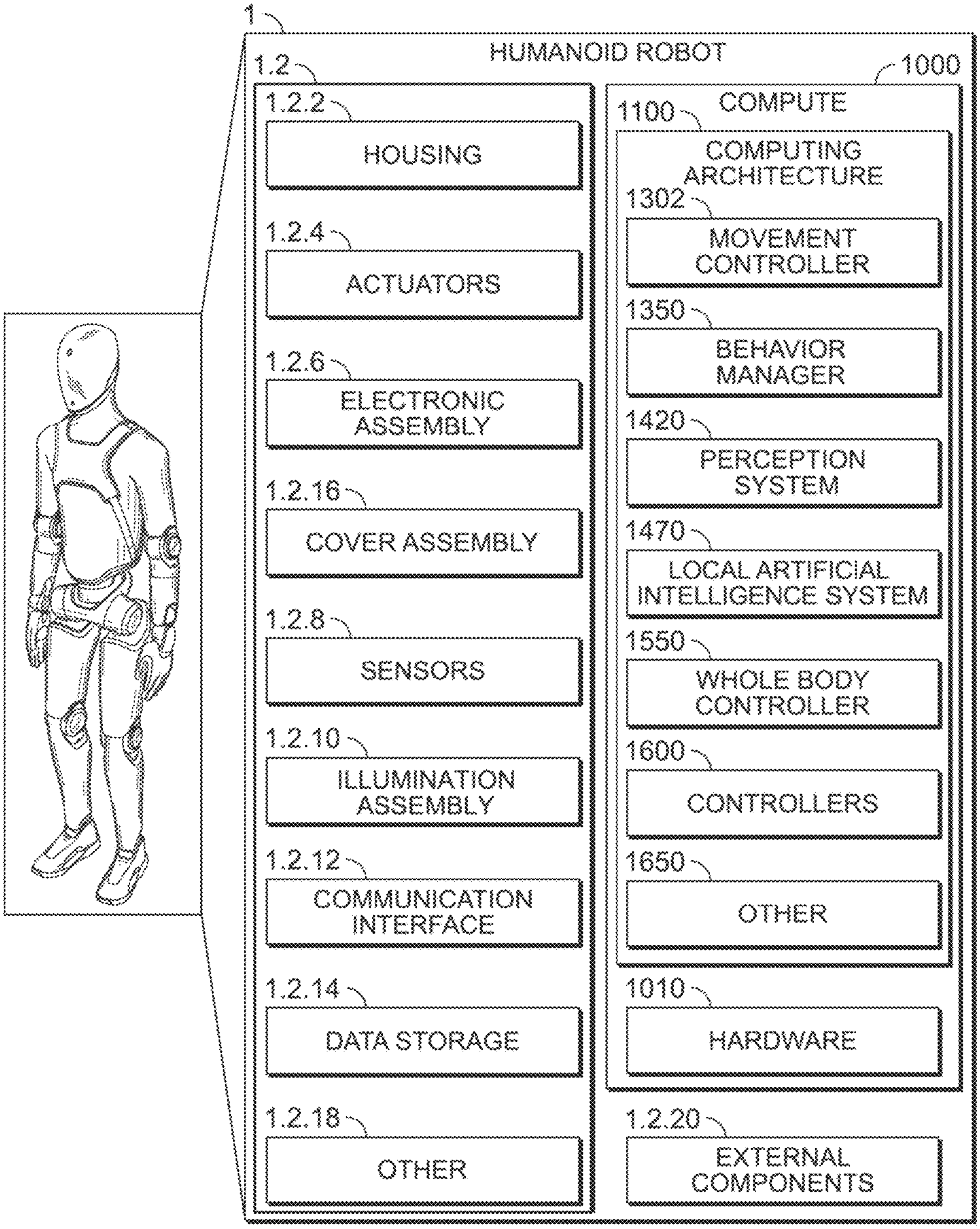
FIG. 2 is a block diagram illustrating components of the humanoid robot of FIG. 1.

FIG. 2 is a block diagram of a humanoid robot 1 that includes a variety of architectures and other components that may include: (i) a mechanical/electrical architecture 1.2 that includes housings 1.2.2, actuators 1.2.4, electronic assembly 1.2.6, sensors 1.2.8, communication interface 1.2.12, illumination assembly 1.2.10, data storage 1.2.14, exterior covering assembly 1.2.16, external components 1.2.20, other components 1.2.18, and (ii) compute 1000 that includes a computing architecture 1100.

a. Humanoid Robot Configuration

The high-level configuration for the robot 1 includes assemblies that function together to provide the robot with a humanoid shape and enable said robot to perform human-like movements. As such, the structures and kinematic principles that are inherent to non-humanoid systems cannot be simply adopted or implemented into a humanoid robot 1 without undergoing careful analysis and empirical verification against the complex realities of design, testing, and manufacturing. Theoretical designs that attempt such direct modifications are insufficient, and in some instances woefully insufficient, because they amount to mere design exercises that are not tethered to the complex realities of successfully creating a functional, general-purpose humanoid robot.

i. Robot Components

In addition to the general systems, assemblies, components, and parts described above, the humanoid robot 1 in the illustrative embodiment shown in FIG. 3A may include the following systems, assemblies, components, and parts, which can be broadly categorized into three regions. As shown in FIG. 3A, these three regions include: (i) an upper portion 2, which includes a head and neck assembly 10, a torso 16, left and right arm assemblies 5, and left and right hands 56; (ii) a central portion 3, which includes a spine 60, a pelvis 64, and left and right upper leg assemblies 6.1 of left and right leg assemblies 6; and (iii) a lower portion 4, which includes left and right lower leg assemblies 6.2 of leg assemblies 6.

In the illustrative embodiment shown in FIG. 3A, each arm assembly 5 may include a shoulder 26, an upper humerus 30, a lower humerus 36, an upper forearm 40, a lower forearm 46, and a wrist 50. The hand 56 is coupled to the wrist 50. Each leg assembly 6 may include: (i) an upper leg assembly 6.1, which may comprise a hip 70, an upper thigh 76, and a lower thigh 80, and, (ii) a lower leg assembly 6.2, which may comprise a shin 84, a talus 88, and a foot 92. In other embodiments, some of these systems, assemblies, components, or parts may be omitted, combined, or replaced with alternative designs.

1. Head and Neck Assembly

The head and neck assembly 10 of the humanoid robot 1 may be designed to enhance its anthropomorphic characteristics, while also providing functional capabilities that support interaction, perception, and communication. The head and neck assembly 10 is coupled to a torso 16 and possesses an overall shape that generally resembles the general shape of a human head. The head and neck assembly 10 is, however, specifically designed to lack pronounced human facial structures, such as cheeks, eye protrusions, a mouth, or other moving parts, to maintain a non-humanlike appearance. The exterior surface of the head 10.1 is characterized by an absence of large flat surfaces (e.g., the head 10.1 is not a cube or prism) and the head is also not formed with significant cylindrical features or perfect circles. Instead, almost all exterior surfaces of the head 10.1 are curvilinear or contain substantial curvilinear aspects, which presents a generally egg-shaped appearance when viewed from the front or top.

Structurally, the head 10.1 is symmetrical about the sagittal plane $P_S$ but is asymmetrical about Z-Y and X-Y planes that intersect the head and are parallel to the coronal plane ($P_C$) and the transverse plane ($P_T$), respectively. The width (parallel to the y-axis) and depth (parallel to the x-axis) of the head 10.1 change constantly from top to bottom, reaching a maximum dimension in the temple region, which is located at approximately 30-50% of the head's height from its top end.

The head 10.1 itself may house a range of components, such as high-resolution cameras, microphones, and displays, all of which are contained within an impact-resistant polymer shell 102.2. This shell 102.2 includes a large, freeform (i.e., not conforming to a regular or formal structure or shape) frontal shield 102.4 that covers the frontal and crown regions of the head 10.1. The frontal shield 102.4 is formed as a separate and distinct piece from the displays positioned behind it, thereby protecting the displays and internal electronics from damage. This separation provides a significant advantage during the performance of industrial tasks, as a damaged frontal shield 102.4 is substantially cheaper and easier to replace than a damaged display. The frontal shield 102.4 extends rearward beyond an auricular region into an occipital region and extends down to a chin region, but it does not extend below a jaw line.

Cameras embedded within the head 10.1 may include RGB, depth-sensing, thermal imaging capabilities and/or any other cameras disclosed herein, which are designed to enable the humanoid robot 1 to perform tasks such as object recognition, environmental mapping, and facial expression analysis. For the specific purpose of generating a low-latency Virtual Reality (VR) view, a pair of high-resolution, high-frame-rate RGB cameras with global shutters may be utilized. For example, this pair of cameras may be the vertically arranged cameras 108.2.2 and 108.2.4, or they may be horizontally arranged internal/external cameras. Microphones may be arranged in an array to facilitate directional audio input and noise cancellation, which enhances the ability of the humanoid robot 1 to understand and respond to verbal commands.

Displays integrated into the head 10.1 may serve as user interfaces, providing visual feedback or conveying expressions to improve communication and user engagement. Unlike the heads of conventional robots, the disclosed head 10.1 includes a main display 108.4 that is curved in at least one direction and is positioned at an angle relative to a sagittal plane. This curved design permits the inclusion of a larger display with a greater surface area compared to a flat screen, which increases the amount of information that can be conveyed, such as robot status and sensor data. This information is displayed using generic blocks or shapes rather than anthropomorphic features like eyes or a mouth. In addition to the main display 108.4, two side-facing displays are included to show indicia such as the identification number/serial number, battery life, current task, any required safety indicia, and/or any other information associated with the humanoid robot 1.

Further, an extent of the illumination assembly 1.2.10, which comprises a plurality of light emitters, is positioned adjacent to an edge (e.g., lower) of the frontal shield 102.4. These light emitters may be configured to function as indicator lights to communicate the status of the robot 1 to nearby humans—for instance, by emitting light that appears to humans in different colors (e.g., yellow for working, green for idle, red for an error state, or blue for thinking) or illumination sequences-without relying on the main displays. This method of communication may be more power-efficient than displays, and may relay information more rapidly.

Additionally, the head 10.1 may house: (i) other sensors, such as gyroscopes and accelerometers, (ii) heat management systems (e.g., heat pipes, fans, etc.), (iii) wireless communication modules (e.g., 5G cellular, Wi-Fi, Bluetooth) and antennas. To maximize bandwidth and ensure connectivity, a plurality of 5G cellular radios may be positioned in the torso 16 and wired through the neck to the antennas in the head 10.1. The head and neck assembly 10 may also incorporate advanced materials and shock-absorbing structures to protect the sensitive electronic components housed within, which may improve the overall durability and reliability of the humanoid robot 1.

The head and neck assembly 10 may include two primary actuators: a head twist actuator (J8.1) 120, which is responsible for enabling rotational movement of the head 10.1 about axis $A_{8.1}$, which is a vertical (yaw) axis when the robot is in the neutral state, and a head nod actuator (J8.2) 140, which enables rotation of the head 10.1 about the axis $A_{8.2}$, which is a horizontal axis when the robot is in the neutral state. Together, these two actuators may provide two degrees of freedom for the head 10.1, allowing it to perform movements that emulate natural human head motions. The head twist actuator (J8.1) 120 may be positioned within the head and neck assembly 10, while the head nod actuator (J8.2) 140 may be located at the base of the neck. This head twist actuator (J8.1) 120 and head nod actuator (J8.2) 140 may each utilize a motor, a gear reduction system, and sensors or encoders that are similar to the actuator types discussed herein.

The head actuators, J8.1 and J8.2, may work in coordination to position the head 10.1 accurately, enabling the humanoid robot 1 to track objects, focus on specific areas of interest, or maintain eye contact during human-robot interactions. The actuators may be controlled, in conjunction with input from visual and inertial sensors, to execute smooth, human-like movements. For example, the head twist actuator (J8.1) 120 may rotate the head 10.1 to follow a moving object, while the head nod actuator (J8.2) 140 adjusts the pitch to maintain an optimal viewing angle.

Variations of this design may include the addition of a third actuator to provide roll motion, which would further increase the range of movement of the head 10.1 to three degrees of freedom (3-DoF) and could enable more expressive head gestures, such as tilting the head sideways to convey curiosity or empathy. Alternatively, for specialized applications, the actuators (J8.1) and/or (J8.2) may be replaced with compact linear actuators or parallel-link mechanisms.

Additionally, variations of head 10.1 may include modular head designs that allow for the quick customization or replacement of sensory and communication components. These modular designs may facilitate easy upgrades or modifications to the capabilities of the humanoid robot 1 without requiring extensive changes to the overall head and neck assembly 10. Furthermore, advanced control algorithms may be implemented to enable more natural, biomimetic head movements, potentially incorporating machine learning techniques to adapt and refine the motion patterns of the head 10.1 based on interaction data and environmental feedback.

2. Torso

The torso assembly 16 is a central component within the humanoid robot 1, extending vertically between the waist and the head and neck assembly 10, and horizontally between the shoulders 26. The torso 16 is designed to provide the robot 1 with a generally humanoid shape, offer structural and operable support for the arm assemblies 5 and the head and neck assembly 10, and house and protect internal components, including the arm actuators (J1) 190 and an electronics assembly 1.2.6 housed at least partially within the torso 16.

The electronics assembly 1.2.6 within the torso 16 contains various interconnected components that are essential for the operation of the robot 1, including the battery pack, the compute 1000 (which includes CPUs and GPUs), power distribution unit, and a charging system. The components are strategically positioned to optimize space and balance. The battery pack may be rearwardly offset, positioned in a rear section of the torso 16, while the compute 1000 is placed in a forward section. This spatial distribution helps to maintain a balanced posture, allows for efficient cooling, and maximizes the size and power density of the battery pack. A cooling system may be integrated between the battery pack and the compute 1000 to manage their respective thermal loads. The electronics assembly 1.2.6 may be designed with modularity to facilitate easier maintenance, repair, and upgrades. The charging system may support both wired and wireless protocols. A wired system might use a docking station, while a wireless system could utilize inductive charging, with coils that may be embedded in a housing 1.2.2 and/or the feet 92. The charging system may also include safety features such as overcharge protection and temperature monitoring.

The torso 16 may have a total volume of more than 10 liters, preferably more than 15 liters, and most preferably more than 20 liters. However, the torso 16 has a total volume that is less than 40 liters and most preferably less than 30 liters. The torso 16 also has an uninterrupted internal height that is more than 250 mm, and is preferably near to 300 mm, but is less than 350 mm. This substantial internal volume may accommodate a battery pack that exceeds 2 liters, preferably more than 4 liters, and most preferably more than 6 liters in capacity. Consequently, the humanoid robot 1 may incorporate a battery pack with a capacity exceeding 2.5 kWh, which may provide an operational runtime of over 3.5 hours under normal conditions, and preferably more than 4.5 hours, and most preferably more than 6 hours. In some implementations, the torso 16 may adopt a quasi-trapezoidal prism configuration, wherein its front surface is smaller than its back surface, with angled side shrouds connecting these two sections. This geometric design may enhance the range of motion of the robot 1, particularly by improving its ability to reach across its own body.

3. Arm Assemblies

The arm assemblies include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the arm assembly may incorporate features such as hard-stops, cooling channels, heat sinks, or other materials, structures, components, or assemblies described herein. For example, a heat pipe may extend from the hand to the lower forearm. Furthermore, the wrist 50 may include a quick-release mechanism that enables the interchange of different end-effectors or tools. Moreover, the housing of each component may be designed with internal reinforcement structures, may be made from various materials (e.g., metal alloys or advanced materials like carbon-fiber-reinforced polymers).

4. Leg Assemblies

The leg assemblies 6 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the leg assembly may incorporate features such as hard-stops, cooling channels, heat sinks, or other materials, structures, components, or assemblies described herein. For example, a heat pipe may extend from the knee to the shin 84. Furthermore, the talus 88 may include a quick-release mechanism that enables the interchange of a different foot 92. Moreover, the housing of each component may be designed with internal reinforcement structures, may be made from various materials (e.g., metal alloys or advanced materials like carbon-fiber-reinforced polymers).

To enhance the stability and adaptability of the humanoid robot 1, the leg assemblies 6 may incorporate advanced sensing and control systems, as well as comprehensive protective systems. For instance, force sensors located in the feet 92 and ankles may provide real-time feedback on ground contact forces and pressure distribution. This data may be used by the control system of the humanoid robot 1 to make rapid adjustments in order to maintain balance, especially when moving on uneven or dynamic surfaces. Inertial measurement units (IMUs) positioned in the leg assemblies 6 and the pelvis 64 may also provide crucial information on the orientation and acceleration of each leg segment, thereby allowing for the precise control of leg positioning during movement.

b. Mechanical and Electrical Architecture

The mechanical and electrical architecture 1.2 may be embodied as any combination of hardware, software, and circuitry that enables the humanoid robot 1 to operate and perform physical functions in response to electrical charges or electrical signals. As illustrated comprehensively in additional figures herein, the robot 1 is composed of a plurality of assemblies and components that are specifically arranged to emulate or generally resemble human anatomical structures and their functional characteristics. A humanoid form is advantageous because it enables the robot 1 to execute a wide range of general tasks that are typically performed by humans, such as walking between different locations, handling and moving objects, and retrieving items from various positions and orientations. Non-humanoid forms (e.g., wheeled robots or quadrupeds) typically lack the versatility and effectiveness that are required to perform such a diverse array of generalized tasks.

i. Actuators

The actuators 1.2.4 contained within the robot 1 include thirty actuators (J1)-(J16), excluding the end effectors, that are housed within various components of the robot 1 to actuate movement of said components. An additional aggregate total of twelve actuators are in both hands 56 combined. Below is a summary table showing the actuator 1.2.4 reference names and numbers for the thirty actuators (J1)-(J16), the quantity of each, descriptive actuator names used herein for consistency, common corresponding informal actuator names, and associated rotational axes from the high-level configuration of the illustrative embodiment robot 1. Specific actuators in each hand 56 (e.g., six actuators in each hand) are not individually included in the below table

TABLE 2

| Actuator | Qty | Actuator Name | Informal Actuator Name(s) | Axis |
|---|---|---|---|---|
| (J1) 190 | 2 | arm | primary arm | $A_1$ |
| (J2) 280 | 2 | shoulder | (none) | $A_2$ |
| (J3) 320 | 2 | upper arm twist | upper arm x, upper arm roll | $A_3$ |
| (J4) 374 | 2 | elbow | arm z, arm yaw, lower humerus | $A_4$ |
| (J5) 468 | 2 | lower arm twist | lower arm x, lower arm roll | $A_5$ |
| (J6) 484 | 2 | wrist flex | wrist/hand y, wrist/hand pitch, flick | $A_6$ |
| (J7) 520 | 2 | wrist pivot | wrist/hand z, wrist/hand yaw, wave | $A_7$ |
| (J8.1) 120 | 1 | head twist | head no | $A_{8.1}$ |
| (J8.2) 140 | 1 | head nod | head yes | $A_{8.2}$ |
| (J9) 680 | 1 | torso lean | spine x, torso/spine roll | $A_9$ |
| (J10) 620 | 1 | torso twist | spine z, torso/spine yaw | $A_{10}$ |
| (J11) 720 | 2 | hip flex | hip y, hip/leg pitch, forward kick | $A_{11}$ |
| (J12) 768 | 2 | hip roll | hip x, hip/leg roll, sideways kick | $A_{12}$ |
| (J13) 782 | 2 | leg twist | hip z, hip/leg yaw | $A_{13}$ |
| (J14) 820 | 2 | knee | lower thigh, lower leg y, lower leg pitch, rear kick | $A_{14}$ |
| (J15) 860 | 2 | foot flex | foot y, foot pitch, or first ankle | $A_{15}$ |
| (J16) 900 | 2 | foot roll | talus, foot roll, foot x, second ankle | $A_{16}$ |

It should be understood that in other embodiments, some of these systems, assemblies, components, and/or parts may be omitted, combined, or replaced with alternative systems, assemblies, components, and/or parts.

ii. External Cover Assembly

The illustrative embodiment robot 1 includes various components (e.g., assemblies) with housings 1.2.2 (e.g., to form an exoskeleton) that are designed to protect the operational systems of the robot 1, such as actuators 1.2.4 and electronics assembly 1.2.6, provide structural support, and give form to the robot 1. Said housings 1.2.2 can be comprised of hard or rigid casings that may include internal mounting features designed to support systems in specific locations, structural features engineered to withstand operational loads, and internal and/or external features that allow for interoperation between adjacent components and/or are formed to resemble human features. Some housings 1.2.2 additionally include one or more detachable shells that may overlay a casing to allow access to internal assemblies or to complete the form of the component.

The requirements of the housings 1.2.2 can vary in shape and form based on the individual structural or material requirements for each specific component. While it may be desirable to utilize a particular material for all housings 1.2.2 to create a consistent exterior appearance, fabrication may be complicated by specific structural or operational needs at different locations. It may not be necessary to utilize the same materials in different housings 1.2.2 that experience different load requirements. Various materials may be preferred for a specific housing 1.2.2 based on properties such as strength, toughness, elasticity, weight, and conductivity. Similarly, the complexity of some housing 1.2.2 designs may be better suited for one type of manufacturing process, such as machining, die casting, injection molding, or composite fabrication, over another. Because there is a desire or need to use different materials within different regions and/or use materials that do not have a consistent exterior appearance, the illustrative embodiment robot 1 includes exterior coverings of the exterior covering assembly 1.2.16 that are designed to at least partially hide the housings 1.2.2 under a textile exterior layer that can be easily swapped if damaged, serve to protect internal components from dust and debris, are designed to fit the form of the robot 1 without substantial wrinkling, and/or allow for venting or address thermal considerations at specified locations.

The exterior coverings may have a multi-layered assembly, which may include: (i) an energy-absorbing material that is coupled to the coupling layer, (ii) a coupling layer (e.g., plastic or polymer based), wherein the coupling layer facilitates attachment to, or attachment at, a housing 1.2.2, and/or (iii) an exterior coverings material (e.g., a textile). Alternatively, the multi-layered assembly may omit the coupling layer, the energy-absorbing material, and/or exterior covering material. In each case, the movement of the nearby joint may cause one housing 1.2.2 to impact or crush the energy absorbing layer instead of another housing 1.2.2, thereby mitigating or eliminating structural stress or load on either housing 1.2.2 and/or the respective actuator 1.2.4. Additionally, the energy attenuation members help to reduce pinch points, and/or allow for a more human-like appearance.

1. Energy Attenuation Assembly

The energy attenuation assembly may be composed of a plurality of integrated or removable energy attenuation members, such as pads, panels, or bumpers, that are attached to housings 1.2.2 of the robot 1 and/or are positioned within the external covers. Said energy attenuation members may: (i) be attached directly to a particular exterior side of a housing 1.2.2 (e.g., overlie the housing), (ii) surround an exterior of a housing 1.2.2 and not be directly attached (e.g., friction fit), (iii) be attached to the edges of an opening formed in the housing 1.2.2 (e.g., act as a deformational extent of the housing), and/or (iv) be attached to or retained by the exterior coverings.

The disclosed robot 1 includes a torso energy attenuation member, elbow energy attenuation members, and leg energy attenuation members. Additionally, energy attenuation members may be included at the hip, shin, and/or foot. Some or all energy attenuation members may also be omitted. Energy attenuation members can be configured to enhance or alter the shape of the robot 1 without adding substantial weight and to provide a deformable structure with energy absorption properties to protect underlying components.

The energy attenuation members can be made from a wide variety of materials, including: (i) polymers, such as polyethylene foam (PE Foam), ethylene vinyl acetate (EVA) foam, polyurethane foam (including Memory Foam and Open-cell Polyurethane Foam); (ii) rubber foams; (iii) natural foams; (iv) engineered foams; (v) composite and hybrid materials; (vi) expanded polystyrene (EPS); (vii) expanded polypropylene (EPP); (viii) Koroyd®; (ix) D3O®; (x) Poron® XRD; (xi) thermoplastic elastomers (TPE) or thermoplastic polyurethane (TPU); (xii) any other material known to one of skill in the art that accomplishes the desired energy absorption characteristics; (xiii) any combination of the above. Furthermore, the energy-absorbing material may alternatively or additionally include other structures of said materials, wherein said structures may include lattices and/or repeating units, such as a cube, sphere, cylinder, cone, pyramid, torus, prism, tetrahedron, dodecahedron, octahedron, icosahedron, ellipsoid, paraboloid, cuboid, or hexahedron. It should be understood that the repeating unit or lattice cell may be contained in a specific region or may propagate throughout the entire energy attenuation member. Additionally, the energy attenuation members and/or the assembly may have varying properties, such as thickness, density, C/D ratio, and stiffness. This variation may be arranged in a gradient manner, wherein the energy-absorbing materials transition from softer to firmer layers or regions to provide progressive energy dissipation.

2. Exterior Coverings

The exterior coverings, which can include a neck cover, a torso cover, an upper leg cover, a shin cover, a foot cover, a lower arm cover, and a hand cover, are designed not to interfere with the robot's range of motion, to allow access to underlying components, to potentially add indicators to the external surface, and to improve the robot's overall aesthetic appearance. As shown in the figures, a single exterior covering does not extend over all actuators in the robot 1, and typically does not cover more than five actuators at a time. In other words, the exterior covering does not resemble an oversized jumpsuit with a closure running from, e.g., the robot's pelvis to its head region, nor does it include a hood that extends around a substantial portion of the robot's head. Instead, the exterior covering is strategically and tightly fitted in certain regions and may include different inserts (e.g., a different textile) that are positioned between the moving aspects of joints.

Exterior coverings materials of the exterior covering assembly 1.2.16 can be made from one or more textiles and can be customized or selected to reduce wrinkling and to allow for the twisting or movement of the underlying components without restriction or substantial distortion. For example, the exterior coverings materials may be designed to allow the lower arm to twist and rotate from about −120 degrees to about 180 degrees. Additionally, the exterior coverings materials may be selected to allow for the cooling of components, the viewing of indicator lights, or the operation of buttons through said exterior coverings. This provides a substantial benefit over conventional systems that lack these advanced features. It should be understood that this disclosure contemplates using or including exterior coverings materials that: (i) integrate lights from the robot 1 into said exterior covering, and specifically into a textile itself, (ii) may be translucent or temporarily translucent (e.g., based on time or environment), and/or (iii) can be formed (e.g., woven) in a manner that allows light to be transmitted through the textile.

As such, various types of lights (e.g., fiber optic lighting, led strip lights, led rope lights, micro-led string lights, led neon flex, phosphorescent paint, OLED panels (organic light-emitting diode), laser diode lighting, neon tubing, electroluminescent panels, led edge-lit panels, flexible led sheets, flexible OLED strips, inductive electroluminescent displays, laser fiber cables, quantum dot light-emitting displays, phosphor-coated led strips, laser-activated fluorescent materials, electroluminescent paint, laser-illuminated fiber bunches, phosphor-coated electroluminescent (PCEL) materials, smart RGB led strips, light-up silicone tubing (LED or EL-based), laser wire, or other electroluminescent materials such as EL wire, EL tape, or EL film) that are coupled to the humanoid robot 1 may be visible through the exterior coverings material. The exterior coverings material can include reflective yarn or night-luminous yarn that changes its appearance when light is shining on its surface. In other embodiments, a shiny, reflective, iridescent, matte, or textured polyurethane film can be applied to the surface of the exterior coverings material (e.g., a textile) in certain areas to provide an additional reflective effect or for another purpose, such as displaying a logo, pattern, or labels.

The exterior coverings material can also include features to accommodate the thermal considerations of the robot 1. In various examples, the exterior coverings material can be a custom textile that utilize different weaves in different locations to allow for ventilation in specific areas. Additionally, the exterior coverings material can include textiles or threads that are heat-sensitive and change color with a change in temperature. In summary, the exterior coverings may additionally be made from, include, or specifically omit any one or any combination of the following material types: durable materials, flame-resistant materials, waterproof materials, hazard materials, chemical-resistant materials.

Alternatively or additionally, the exterior covering assembly 1.2.16 may include features such as closures (e.g., a zipper that runs a partial or full length of the exterior covering assembly 1.2.16), attachment points, couplers, self-cleaning nanocoatings, thermoelectric materials, photochromic dyes, or electromagnetic shielding layers, as well as modular, quick-release panels or e-textile technology with conductive fibers woven throughout to create a distributed sensor network that is capable of detecting impacts, monitoring joint angles, or even harvesting energy from movement. The exterior covering assembly 1.2.16 may be designed to include inserts (which may also be textiles or may be other materials) that are positioned strategically between moving joint components to further ensure that pivoting motion is not restricted at the joints of the humanoid robot 1. Different textile materials, patterns, knits, weaves, etc. may be incorporated to facilitate movement in specific regions, thereby enhancing the functional dexterity of the robot 1.

iii. Sensors

Figure 4:
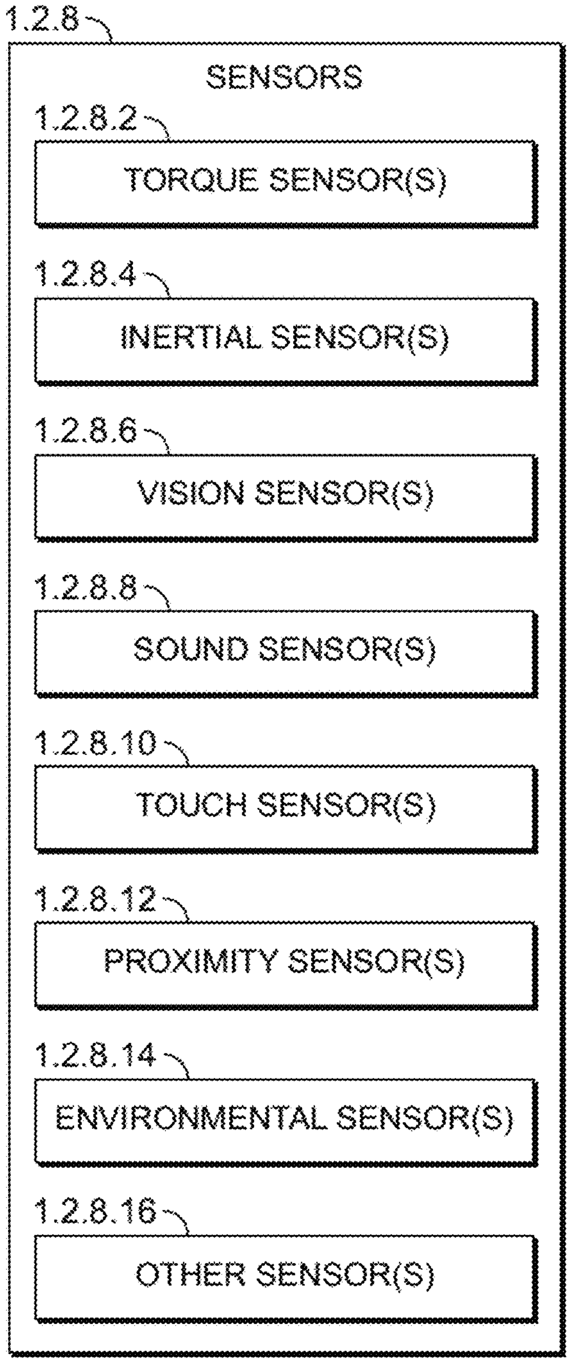
FIG. 4 is a block diagram of sensors for the humanoid robot of FIGS. 1-3B.

As illustrated in FIG. 4, sensors 1.2.8 may be embodied as any hardware, software, and/or circuitry for providing sensor data indicative of perceived stimuli, conditions, and measurements to enable the humanoid robot 1 to process, reason, and act appropriately (e.g., based on a given task, a set of rules, and/or other constraints). The sensors 1.2.8 may include one or more torque sensors 1.2.8.2, inertial sensors 1.2.8.4, visual sensors 1.2.8.6, auditory sensors 1.2.8.8, touch sensors 1.2.8.10, proximity sensors 1.2.8.12, environmental sensors 1.2.8.14, and other sensors 1.2.8.16. The sensors 1.2.8 may provide sensor data (e.g., torque, inertia measures, audiovisual sensor data, touch data, proximity data, environmental data, etc.) to the compute 1000 processors, further described below, to enable appropriate interaction between the humanoid robot 1 and the environment.

The torque sensors 1.2.8.2 may comprise one or more torque cells that are positioned within the actuators and are designed to measure the amount of force or torque applied to a part of the humanoid robot 1. The measurements may be transmitted to other components of the humanoid robot 1, such as the whole body controller 1550 or one or more controllers 1600, to enable balance, locomotion, manipulation, and handling by the humanoid robot 1.

The inertial sensors 1.2.8.4 may comprise sensors for measuring the motion, position, and orientation of the humanoid robot 1 relative to the environment for purposes of navigation, stabilization, and interaction with the environment and surroundings. For example, the inertial sensors 1.2.8.4 can include one or more accelerometers (e.g., to measure acceleration forces in one or more directions for use in determining changes in velocity and orientation), gyroscopes (e.g., to measure angular velocity for use in tracking rotational movement and maintaining balance), IMUs (e.g., combining the accelerometers and gyroscopes for use in providing comprehensive motion and orientation data), and Global Positioning System (GPS) receivers (e.g., to provide location data based on satellite signals, for use in outdoor navigation and positioning).

The visual sensors 1.2.8.6 may comprise sensors for capturing visual data, including cameras (e.g., red-green-blue (RGB) standard color cameras, grayscale monocular cameras, and stereo cameras (e.g., to capture depth perception)), depth cameras (e.g., depth cameras using technologies such as structured light or time-of-flight to measure distance to objects, AzureR Kinect® depth camera, Intel® RealSense® depth camera, etc.), LIDAR (Light Detection and Ranging) sensors (e.g., to measure distance to objects by emitting laser pulses, analyze the reflections, and provide detailed 2D or 3D maps of the environment), radar (e.g., to detect objects via radio waves and measure distance and speed for use in various applications including navigation and obstacle detection). Visual sensors 1.2.8.6 may also include event-based cameras, which report changes in pixel intensity rather than full frames, offering advantages in speed and data efficiency for dynamic scenes. Examples of said visual sensors 1.2.8.6 include the cameras 108.2.2 and 108.2.4 contained in the head 10.1 of the robot 1.

The auditory sensors 1.2.8.8 may comprise sensors for capturing audio data, including microphones (e.g., to capture audio signals for voice recognition, environmental noise detection, or communication), ultrasonic transducers (e.g., to capture distance measurement and obstacle detection through high-frequency sound waves), spatial audio sensors such as microphone arrays and direction of arrival sensors (e.g., to capture sound from different locations to determine the direction and distance of sound sources for 3D positioning). Auditory sensors 1.2.8.8 could also include specialized acoustic sensors for detecting specific sound patterns, such as the sound of failing machinery or distress calls, further enhancing the robot's environmental awareness.

The touch sensors 1.2.8.10 may comprise sensors for detecting physical contact or pressure applied to the surface of the humanoid robot 1, e.g., to enable tactile feedback, safety and collision avoidance, object handling and manipulation, and interaction with the environment and surroundings. Example touch sensors 1.2.8.10 may include pressure sensors to measure an amount of pressure applied to a surface by the humanoid robot 1, such as capacitive sensors (e.g., to detect touch or proximity through changes in capacitance), resistive sensors (e.g., to detect pressure or touch by measuring changes in resistance), piezoelectric sensors (e.g., to generate an electrical charge in response to mechanical stress or pressure and detect vibrations or impact), force-sensitive resistors (e.g., to change resistance based on the amount of applied force), and optical touch sensors (e.g., to use light beams or infrared to detect touches or proximity). Alternative touch sensors 1.2.8.10 may involve artificial skin technologies that provide a more distributed and nuanced sense of touch, capable of detecting not only contact but also shear forces and temperature changes on the robot's surfaces.

The proximity sensors 1.2.8.12 may comprise sensors for detecting the presence or absence of objects within a given range without necessarily making physical contact with the object, e.g., to provide obstacle avoidance, navigation, and object detection. Example proximity sensors 1.2.8.12 can include ultrasonic sensors (e.g., to measure distance by emitting ultrasonic waves and detecting reflection of the waves for avoiding obstacles and measuring distance) and infrared rangefinders (e.g., to detect, using infrared light, the presence or distance of objects for proximity sensing and simple obstacle detection). Capacitive proximity sensors may also be used as part of proximity sensors 1.2.8.12, particularly for close-range interactions.

The environmental sensors 1.2.8.14 may comprise sensors for measuring various physical parameters of the environment and surroundings to enable the humanoid robot 1 to interact with the environment and surroundings, adapt to changes in the environment and surroundings, and perform a given task. Example environmental sensors 1.2.8.14 can include thermocouples (e.g., to measure temperature by generating a voltage proportional to temperature difference), thermistors (e.g., to measure temperature based on changes in resistance), magnetometers (e.g., to measure magnetic fields for navigation and orientation), light sensors (e.g., to measure intensity of light in the environment), gas sensors (e.g., to detect presence and concentration of various gases and monitor air quality), and humidity sensors (e.g., to measure relative humidity in the air). Other environmental sensors 1.2.8.14 could include barometric pressure sensors for altitude determination or weather prediction, radiation sensors for operation in hazardous environments, or particulate matter sensors for air quality assessment in industrial settings.

iv. Communication Interfaces

Figure 5:
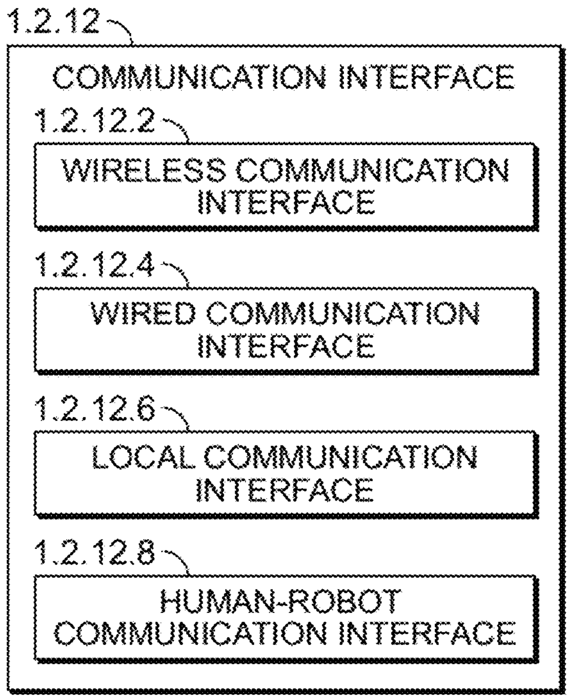
FIG. 5 is a block diagram of a communication interface for the humanoid robot of FIGS. 1-3B.

The communication interfaces 1.2.12 may be embodied as any hardware, software, or circuitry to enable the exchange of data, signals, and other forms of communication between different components within the humanoid robot 1, and between the humanoid robot 1 and other systems (e.g., other humanoid robots 2700A-X, the command centers 2750A-X, the remote AI system 2780), and other components and devices interconnected over the networks 2999A-X. Specifically, FIG. 5 shows that the humanoid robot 1 may be configured with a variety of communication interfaces 1.2.12. The communication interfaces 1.2.12 may be embodied as any combination of a communication circuit, device, or collection thereof, capable of enabling communications over a network (e.g., the networks 2999A-X). The communication interfaces 1.2.12 may be configured to use any one or more communication technology (e.g., wired or wireless communications) and associated protocols to effect such communication.

Referring to FIG. 5, examples of communication interfaces 1.2.12 include a wireless communication interface 1.2.12.2 (e.g., Bluetooth®, Wi-Fi®, WiMAX, Cellular (e.g., 3G, 4G, 5G), Zigbee, LoRa (Long Range) and RF (Radio Frequency)), a wired communication interface 1.2.12.4 (e.g., Ethernet, USB, Serial Communication (e.g., RS-232, RS-485), and Controller Area Network (CAN) interface)), a local communication interface 1.2.12.6 (e.g., an I2C (Inter-Integrated Circuit), SPI (Serial Peripheral Interface)), and a human-robot communication interface 1.2.12.8 (e.g., voice recognition systems to enable communication through spoken commands using speech recognition technology, touch interfaces such as touchscreens or physical buttons for direct human interaction with the humanoid robot 1). Alternatively or additionally, the human-robot communication interface 1.2.12.8 may include gesture recognition systems or gaze tracking, allowing for more intuitive and non-verbal interaction with human operators. The communication interfaces 1.2.12 may also include a network interface controller (NIC) (not illustrated), which may also be referred to as a host fabric interface (HFI). The NIC may be embodied as one or more add-in-boards, daughtercards, controller chips, chipsets, or other devices that may be used by the humanoid robot 1 for network communications with remote devices.

v. Data Storage

Referring back to FIG. 2, the data storage 1.2.14 may be embodied as any hardware, software, or circuitry for storing, retrieving, and maintaining data for the humanoid robot 1. More particularly, the data storage 1.2.14 may be embodied as any type of device configured for short-term or long-term storage of data. The data storage 1.2.14 may be embodied as memory devices and circuits, solid state drives (SSDs), memory cards, hard disk drives, USB flash drives, or other data storage devices. The data storage 1.2.14 can be embodied as one or more SSDs that expose internal parallelism to components of the humanoid robot 1, allowing the humanoid robot 1, for example, via the compute 1000, to perform storage operations on the data storage 1.2.14 in parallel.

The data storage 1.2.14 may also include memory devices, which may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards, and similar standards, may be referred to as DDR-based standards and communication interfaces of the storage devices that implement such standards may be referred to as DDR-based interfaces.

The memory device is a block addressable memory device, such as those based on NAND or NOR technologies. A memory device may also include a three dimensional crosspoint memory device (e.g., Intel® 3D XPoint® memory), or other byte addressable write-in-place nonvolatile memory devices. In an embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the device itself and/or to a packaged memory product. For data storage 1.2.14, a hierarchical storage architecture may be employed, using faster, smaller caches for frequently accessed data and larger, slower storage for archival or less critical data, optimizing both speed and capacity.

c. Compute

As illustrated in FIG. 2, the compute 1000 may comprise any combination of hardware, software, and circuitry to perform various computing functions that enable the humanoid robot 1 to operate semi- or fully-autonomously. Specifically, the compute 1000 includes: (i) compute hardware 1010, and (ii) computing architecture 1100. Such functions may include processing long-horizon goals, coordinating with other humanoid robots 2700A-X, processing sensor information, controlling the humanoid robot 1 based on the sensor information and goals, controlling the activation or deactivation of mechanical components, learning, simulating, refining behavioral models, and policy management.

i. Hardware

The compute hardware 1010 may operate as one or more general purpose processors or special purpose processors (e.g., digital signal processors, application specific integrated circuits (ASICs), field programmable gate arrays (FPGAs), etc.) that can be configured to execute computer-readable program instructions stored in the aforementioned data storage devices. Such instructions can be executed to provide controller operations (e.g., to activate or deactivate components of the mechanical and electrical architecture 1.2, etc.). Specifically, the humanoid robot 1 may be configured with a variety of processors such as one or more central processing units (CPUs) 1100 (e.g., x86 CPUs, ARM CPUs, RISC-V CPUs, embedded CPUs such as Internet-of-Things CPUs or mobile CPUs), graphics processing units (GPUs) (e.g., ray tracing GPUs, accelerated computing GPUs, embedded GPUs such as system-on-chip (SoC) GPUs or mobile GPUs), neural network processing units (for example, tensor processing units designed for tensor computations in machine learning tasks; dedicated neural network processing units such as Intel Nervana NNP, Graphcore IPU, IBM TrueNorth, or Qualcomm Cloud AI 100; custom neural network processing units such as Amazon Web Services (AWS) Inferentia, Apple Neural Engine, and Huawei Ascend; and Neuromorphic Neural Network Processing Units such as Intel Loihi or BrainChip Akida), and other processors. For example, the other processors may be embodied as a single or multi-core processor, a micro-controller, or other processor or processing/controlling circuit. In some embodiments, the other processors may be embodied as, include, or be coupled to an FPGA, an ASIC, reconfigurable hardware or hardware circuitry, or other specialized hardware to facilitate the performance of the functions described herein.

ii. Architecture

The computing architecture 1100 includes: (i) a movement controller 1302, (ii) a behavior manager 1350, (iii) a perception system 1420, (iv) a local AI system 1470, (v) a whole body controller 1550, (vi) one or more controllers 1600, and (vii) other subcomponents 1650.

1. Movement Controller

Figure 6:
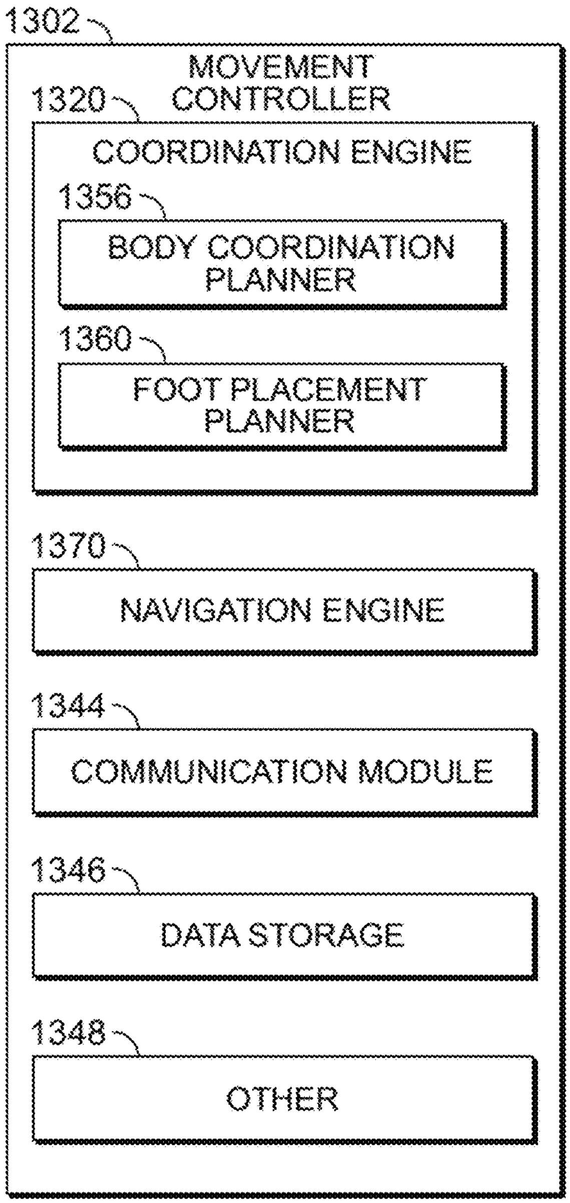
FIG. 6 is a block diagram of a movement controller for the humanoid robot of FIGS. 1-3B.

Referring to FIG. 6, the movement controller 1302 may be embodied as any hardware, software, or circuitry to determine a sequence of actions or a path for the humanoid robot 1 to achieve a given goal or complete a given task, in light of a current state, a set of constraints (e.g., the capabilities of the robot 1 and the environment and surroundings of the robot 1), and instructions from another sub-component of the robot 1 or another aspect of the overall architecture 1100. To carry this out, the movement controller 1302 may include a variety of components, such as: (i) a coordination engine 1320, (ii) a navigation engine 1370, (iii) a communication module 1344, (iv) a data storage 1346, and/or (v) other 1348.

The disclosed movement controller 1302 overcomes limitations associated with conventional robotic systems by enabling the robot 1 to: (i) coordinate its body using the body coordination planner 1356 and foot placement planner 1360 based on instructions from the local AI system 1470 and/or remote AI system 2780, (ii) navigate its world by mapping its environment (e.g., SLAM) and predict movement of objects within said environment, and (iii) communicate with its environment. The movement controller 1302 also enables the robot 1 to adapt in real-time to dynamic environments by continuously monitoring the execution of its plans and comparing the expected outcomes with actual results. The movement controller 1302 further solves the technical challenge of efficient resource allocation. By considering the current state of the robot 1, available energy, time constraints, and the relative importance of different goals, the movement controller 1302 optimizes the allocation of the computational and physical resources of the robot 1. Furthermore, the movement controller 1302 can addresses the issue of human-robot collaboration by incorporating models of human behavior and preferences into its decision-making process. This allows the robot 1 to generate plans that are not only efficient from a purely mechanical standpoint but are also intuitive and comfortable for human collaborators.

In an embodiment, the coordination engine 1320 receives task inputs from one or more AI systems 1470, 2780 and provides supplemental information to the whole body controller 1550 regarding the state, configuration, and/or position of the robot 1 within its environment. In particular, the coordination engine 1320 can utilize both the body coordination planner 1356 and the foot placement planner 1360 to control the body placement and foot placement of the humanoid robot 1 based on the inputs from the one or more AI systems 1470, 2780. Specifically, the coordination engine 1320 may break down or override the task inputs from the one or more AI systems 1470 to ensure efficient control of the robot 1 within a space, e.g., during movement such as walking, running, or jumping, to ensure balance, stability, and efficient locomotion of the humanoid robot 1. In other embodiments, the coordination engine 1320 and/or most of the movement controller 1302 may be consumed within the one or more AI systems 1470, 2780.

The navigation engine 1370 may be embodied as any combination of hardware, software, and/or circuitry to map the environment and surroundings based on obtained sensor data (and data that may be obtained from external sources such as other humanoid robots 2700A-X, mapping services, weather services, GPS modules, etc.) and to generate one or more paths. The mapping for the environment by the navigation engine 1370 may then be provided to the one or more AI systems 1470, 2780 to enable said systems to plan the next move or task of the robot 1.

The data storage 1346 may be configured to store navigational data generated by the navigation engine 1370 and/or position data generated by the planners 1356, 1360. This navigational data and/or position data may be then fed back into the one or more AI systems 1470, 2780 to enable said systems to plan the next move or task. This data may be categorized as short-term memory data and/or long-term memory data. For example, the short-term memory data may include said position data, which comprises the positions of the robot 1 over the last predefined amount of time (e.g., 1 minute or 5 seconds, or anytime between). Meanwhile, the long-term memory data may include the navigational data, which comprises maps of every place any robot 1, 2700A-X has ever visited or been. The ability to feed different amounts of short-term memory data and/or long-term memory data into the one or more AI systems 1470, 2780 provides a significant advantage over conventional robots, as it can efficiently limit the data needed to perform the task without requiring unnecessary processing power that could not be performed on a mobile robot 1. It should be understood that the movement controller 1302 may be omitted and/or consumed by one or more models (e.g., RL trained models) that are contained within the local AI system 1470.

2. Behavior Manager

Figure 7:
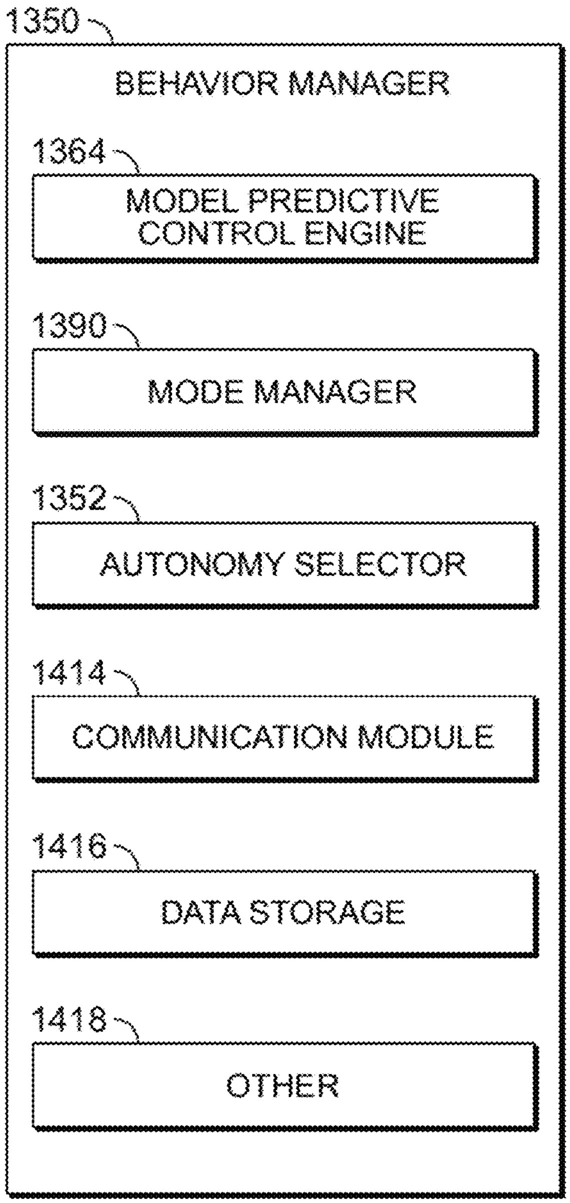
FIG. 7 is a block diagram of a behavior manager for the humanoid robot of FIGS. 1-3B.

Referring to FIG. 7, the behavior manager 1350 may be embodied as any hardware, software, or circuitry for managing behaviors or actions of the humanoid robot 1 based on a given goal, sensor data, and the environment and surroundings of the humanoid robot 1. To accomplish this, the behavior manager 1350 includes: (i) at least one model predictive control engine 1364, (ii) a mode manager 1390, (iii) an autonomy selector 1352, (iv) a communications module 1414, (v) a data storage 1416, and (vi) other modules or components 1418. The disclosed behavior manager 1350 solves several critical technical issues in the field of robotics. One technical issue solved by the behavior manager 1350 is the integration and coordination of multiple modules within a single robotic system. The behavior manager 1350 also solves the technical issue of ensuring that the behaviors of the robot 1 are executed in the correct order, which prevents conflicts and ensures smooth transitions between different actions or states. For example, the manager 1350 might ensure that a "stand up" behavior is completed before a "walk" behavior is initiated, or that an "object recognition" behavior is performed before an attempt to grasp an object is made.

The model predictive control engine 1364 aids in predicting future states of the humanoid robot 1 based on its current state, and/or making decisions to optimize behavior and performance over a given time period. The MPC engine 1364 may select from one or more predefined or learned actions for the humanoid robot 1 to take in response to various stimuli observed by the humanoid robot 1 (e.g., via sensors 1.2.8) and other factors such as assigned tasks to perform. For example, such MPC engine 1364 may select from or utilize different predefined routines or modes to accomplish path planning, obstacle avoidance, object grasping and manipulation, human-robot interaction, task planning and execution, decision making, coordination with other humanoid robots 2700A-X and machines 2710A-X, and safety and regulatory compliance behaviors. Over time, the MPC engine 1364 may communicate with the local AI system 1470 to enable the MPC engine 1364 to refine its selections based on learning algorithms that identify predefined or learned actions for the humanoid robot 1 based on the given tasks, scenarios, and constraints.

Meanwhile the mode manager 1390 can manage modes of the robot 1. Specifically, the mode manager 1390 is configured to select an appropriate mode or set of modes given a specified task, scenario, or constraint. For example, the mode manager 1390 may select between a power mode, a standby mode, a standing mode, a sitting mode, a movement mode (e.g., running, walking, jumping, hovering, etc.), a falling mode, a learning mode, a diagnostic mode, an emergency mode, etc. Over time, the mode manager 1390 may collaborate with the local AI system 1470 to refine its mode selection based on learning algorithms.

The autonomy selector 1352 may be configured to manage autonomous features of the behavior manager 1350. For example, an operator may, through the autonomy selector 1352, configure a level of autonomy of the humanoid robot 1 (e.g., such that the humanoid robot 1 operates manually, in which the operator may remotely control the operation of the robot 1, semi-autonomously, or fully autonomously). In an embodiment, the operator may, through the autonomy selector 1352, specify certain features to be conducted autonomously and others to, e.g., perform a repetitive task without any form of AI/ML-based behavior or to require some form of manual input for operation.

The communication module 1414 may be embodied as any combination of hardware, software, or circuitry to enable components of the behavior manager 1350 to communicate with one another and with other components of the humanoid robot 1 (such as of the compute 1000). The data storage 1416 may be any data storage device or partition on a data storage device for short-term or long-term storage of behavior controller data (e.g., event logs, movement data, training data, navigation logs, mapped area and path data, etc.). Other components 1418 may pertain to other hardware, software, and/or circuitry not previously discussed above relative to the behavior manager 1350, such as cache data, data aggregation modules, data augmentation modules, body part component health management, or calibration data management. It should be understood that the behavior manager 1350 may be omitted and/or consumed by one or more models (e.g., RL trained models) that are contained within the local AI system 1470.

3. Perception System

The perception system 1420 may be embodied as any hardware, software, or circuitry for obtaining audiovisual data (e.g., from sensors 1.2.8) and providing this data to the local AI system 1470 for executing AI-based vision techniques (e.g., object detection, image classification, segmentation, object tracking, facial recognition, scene understanding, depth estimation, anomaly detection, reinforcement learning etc.) to generate, from the audiovisual data, one or more three-dimensional (3D) images. The images may further be annotated with contextual data (e.g., foreground/background information, object classification data, labeling, etc.) for additional processing by the local AI system 1470 and the behavior manager 1350. It should be understood that the perception system 1420 may be omitted and/or folded into the local AI system 1470.

4. Local AI system

The local AI system 1470 may be embodied as any combination of hardware, software, or circuitry to drive semi- to fully-autonomous perception, learning, and behavior by the humanoid robot 1. The local AI system 1470 may: (i) include modes or architectures that are run on the disclosed local AI system 1470 only, (ii) include models or architectures where a portion of the model or architecture is run on the local AI system 1470 and another portion of the model or architecture is run on the remote AI system 2780, and (iii) include modes or architectures that are run on the disclosed remote AI system 2780 only. The local AI system 1470 is described in further detail relative to FIG. 8.

Figure 8:
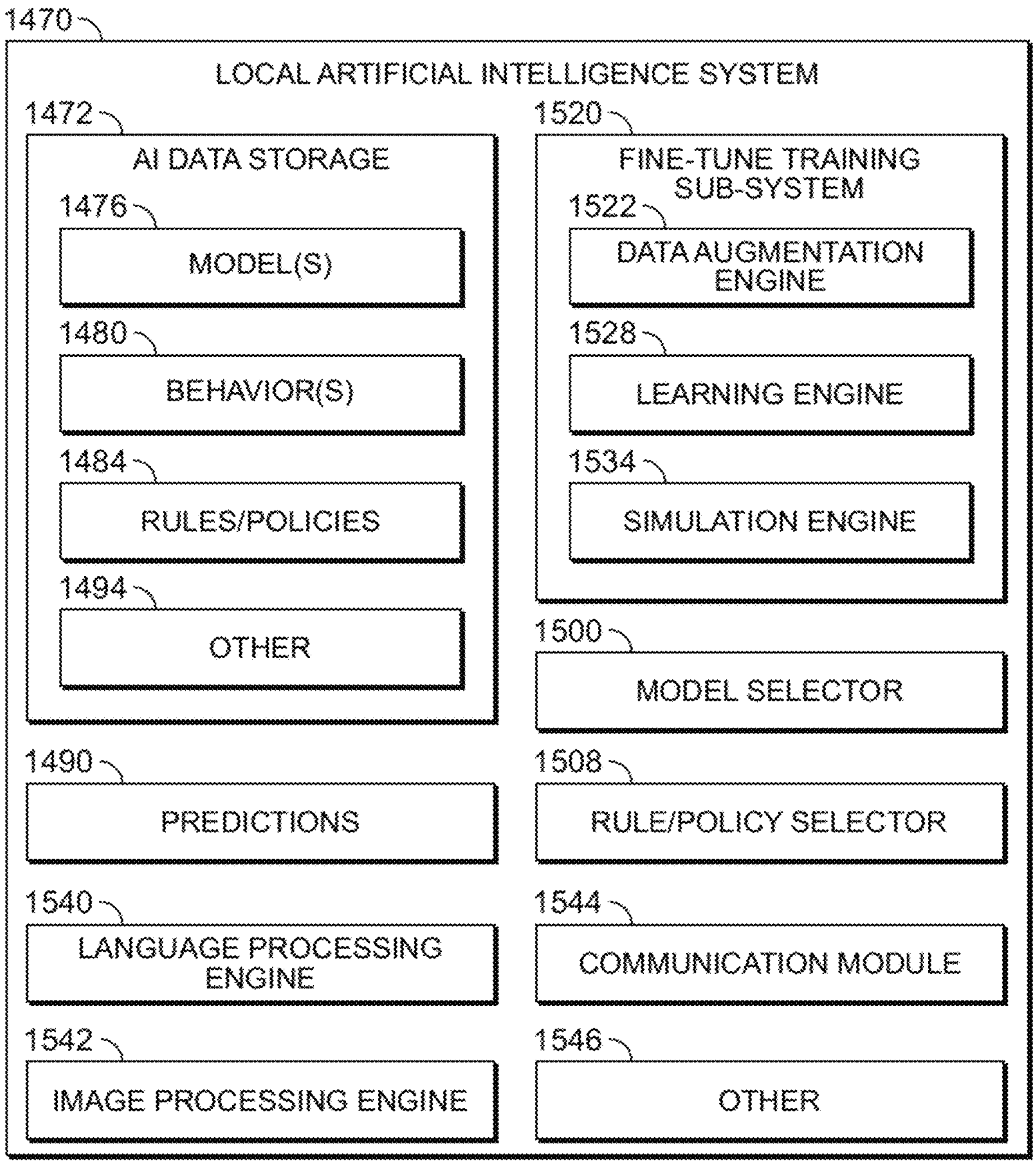
FIG. 8 is a block diagram of an onboard artificial intelligence (AI) system for the humanoid robot of FIGS. 1-3B.

Referring now to FIG. 8, the illustrative local AI system 1470 may include a variety of components, including an AI data storage 1472, predictions 1490, a model selector 1500, a rule and policy selector 1508, a training sub-system 1520, a language processing engine 1540, an image processing engine 1542, and a communication module 1544. However, it should be understood that the local AI system 1470 may interact with and form part of each and every other component (e.g., movement controller 1302, behavior manager 1350, perception 1420, whole body controller 1550, and controllers 1600). As such, in some embodiments, the compute 1000 may only include or primarily include the local AI system 1470. In other words, the local AI system 1470 may not be considered a separate component or system, but instead an integral component of other systems contained within the compute 1000. Thus, a primary technical issue solved by the local AI system 1470 is the challenge of real-time, context-aware decision-making. Traditional robotic systems often rely on pre-programmed responses or remote processing, which can lead to delays or inappropriate actions in dynamic situations. The local AI system 1470 overcomes this limitation by enabling rapid, localized processing of sensory inputs and the immediate generation of appropriate responses.

Another technical challenge addressed by the local AI system 1470 is the integration and interpretation of multimodal sensory data. The humanoid robot 1 is equipped with various sensors, including visual, auditory, tactile, and proprioceptive systems. The AI system 1470 efficiently fuses these diverse data streams in real-time, creating a comprehensive and coherent representation of the state of the robot 1 and its environment. This integrated perception allows for more nuanced and accurate interactions with the physical world and human collaborators. The local AI system 1470 also solves the technical issue of adaptive learning and continuous improvement. Unlike static systems, this local AI system 1470 can modify its behavior based on experience and feedback. It employs advanced machine learning algorithms, potentially including deep reinforcement learning and online learning techniques, to continuously refine its decision-making processes. This adaptability allows the robot 1 to improve its performance over time, learn new tasks with minimal explicit programming, and adjust to changes in its operational environment or physical capabilities. A further technical challenge resolved by the local AI system 1470 is the efficient management of the limited computational resources of the robot 1. The AI system 1470 implements sophisticated task prioritization and resource allocation algorithms, ensuring that critical processes receive adequate computational power while less urgent tasks are managed efficiently. This dynamic resource management enables the robot 1 to maintain optimal performance across a wide range of operational scenarios, from simple repetitive tasks to complex problem-solving situations.

The AI data storage 1472 may further include one or more models 1476, behaviors 1480, rules and policies 1484, and other data 1494. The models 1476 may comprise one or more AI/ML-based models to perform the functions described herein, such as observing, reasoning, and learning behaviors based on the environment and surroundings and performing simple to complex tasks given the environment and surroundings, e.g., similar to the models 2902 of the remote AI system 2780. The illustrative model selector 1500 is configured to select an appropriate model or set of models 1476 given a specified task, scenario, or constraint. For example, the model selector 1500 may select a given model based on considerations such as the task, a cost to perform the task, performance efficiency, the environment and surroundings, resource management, or the current health status of the humanoid robot 1 or its components. Over time, the model selector 1500 may be refined based on learning algorithms that identify efficient models 1476 for given tasks, scenarios, and constraints. In an embodiment, the model may be selected in response to operator input as an alternative to automated selection. This may be useful, e.g., during the initialization of the humanoid robot 1.

The illustrative rule and policy selector 1508 may be configured to select one or more of the rules and policies 1484 that are stored in the AI data storage 1472 to be enforced during the operation of the humanoid robot 1, e.g., based on operator input given a context, environment, compliance and regulatory jurisdiction, safety considerations, and the like. In an embodiment, the rule and policy selector 1508 may automatically learn efficient methods for adapting to selected rules and policies over time.

The language processing engine 1540 may be embodied as any combination of hardware, software, or circuitry for obtaining, parsing, interpreting, and understanding natural language directives and concepts, and also for generating natural language speech. For example, the language processing engine 1540 may be configured to translate speech-to-text and text-to-speech. The image processing engine 1542 may be embodied as any combination of hardware, software, or circuitry for performing object detection, image classification, segmentation, object tracking, facial recognition, scene understanding, depth estimation, anomaly detection, or reinforcement learning on input visual data (e.g., as obtained by sensors 1.2.8 such as cameras or in preloaded training data).

The training sub-system 1520 may be embodied as any hardware, software, or circuitry configured to refine models 1476 and behaviors 1480 based on observed data and training data. The training sub-system 1520 may include a data augmentation engine 1522, a learning engine 1528, and a simulation engine 1534. The data augmentation engine 1522 may be embodied as any hardware, software, or circuitry configured to increase the size and diversity of training data, similar to the data augmentation engine 2782 of the remote AI system 2780. The learning engine 1528 may be embodied as any hardware, software, or circuitry for training the AI models 1476, given a set of rules and policies 1484, behaviors 1480, and training data, similar to the training engine 2790 of the remote AI system 2780. The simulation engine 1534 may be embodied as any hardware, software, or circuitry for executing one or more of the AI models 1476 in a virtualized simulation environment to simulate and analyze aspects of the humanoid robot 1, such as kinematics, sensor behavior, robot 1 behavior, and anomalies, similar to the simulation engine 2800 of the remote AI system 2780. Compared to the remote AI system 2780, the AI fine-tuning conducted by the local AI system 1470 may be localized to the specific humanoid robot 1, which can be advantageous in situations such as those where the humanoid robot 1 is configured to perform a specific task.

The other 1546 may include a communications module that is embodied as any combination of hardware, software, and/or circuitry to enable components of the local AI system 1470 to communicate with one another and with other components of the humanoid robot 1 (such as of the compute 1000). It should be understood that the controllers may be omitted and/or consumed by one or more models (e.g., RL trained models) that are contained within the local AI system 1470.

5. Whole Body Controller

The whole body controller 1550 may be embodied as any combination of hardware, software, or circuitry for receiving information from the behavior manager 1350 or the local AI system 1470. The whole body controller 1550 may thereafter send the information to other components of the compute 1000. For example, the whole body controller 1550 may transmit joint torque data, which is data pertaining to rotational forces exerted at "joints" of the humanoid robot 1, to the controllers 1600. It should be understood that the whole body controller 1550 may be omitted and/or consumed by one or more models (e.g., RL trained models) that are contained within the local AI system 1470.

The controllers 1600 may be embodied as any combination of hardware, software, and/or circuitry for transmitting joint torque data to the actuators 1.2.4, e.g., to extend and retract parts (such as arms, hands, fingers of the humanoid robot 1). The controllers 1600 may also infer joint torque and angle data received from other sensors 1.2.8, such as IMUs mounted on a given "body part." In some embodiments, the joint torque and angle data may be measured using rotary position sensors, optical reflection, or other methods. The whole body controller 1550 may also incorporate advanced control strategies, such as passivity-based control or adaptive control, to ensure stability and robustness in the presence of uncertainties or external disturbances. It should be understood that the controllers 1600 may be omitted and/or consumed by one or more models (e.g., RL trained models) that are contained within the local AI system 1470.

6. Other

Other components 1650 of the compute 1000 may include components not discussed above relative to the compute 1000, such as power management modules (e.g., to manage battery pack health, manage power usage profiles, etc.) and calibration modules (e.g., to ensure that actual kinetic movements of the humanoid robot 1 align with the expected kinetic movements determined based on calculations). The humanoid robot 1 may include other components 1.2.18, which can encompass components that do not necessarily fall within the aforementioned mechanical and electrical architecture 1.2, or compute 1000. For example, the other components 1.2.18 may include safety systems and mechanisms, emergency override systems, or ports for connecting peripheral devices.

E. BIPEDAL ACTION MODEL

Disclosed herein are systems, methods, and techniques for generating and deploying a bipedal action model (BAM), which is an end-to-end framework designed to control the complex, high-degree-of-freedom movements of humanoid robots 1, 2700A-X. As described herein, the BAM is designed to ingest multimodal sensory inputs, which may comprise a combination of real-time visual data from onboard cameras, proprioceptive state information from joint encoders and inertial measurement units, force-torque sensor readings from end effectors, and natural language instructions. The system outputs a continuous sequence of low-level robot control commands, or "actions," that can be utilized by the robot 1, 2700A-X to directly specify joint torques, velocities, or target positions or deltas thereof. The disclosed BAM offers several key advantages over existing robotic control approaches, including, but not limited to: zero-shot generalization capabilities that enable the robot to perform novel tasks and interact with unseen objects without task-specific training through learned representations in high-dimensional feature spaces, direct continuous control over high-dimensional action spaces to produce fluid and precise motion, inherent capabilities for multi-robot collaboration through shared world models that maintain geometric and semantic consistency across robot instances, and a design that is commercially ready and fully scalable for deployment across fleets of robots 1, 2700A-X.

a. BAM Generation

Figure 9:
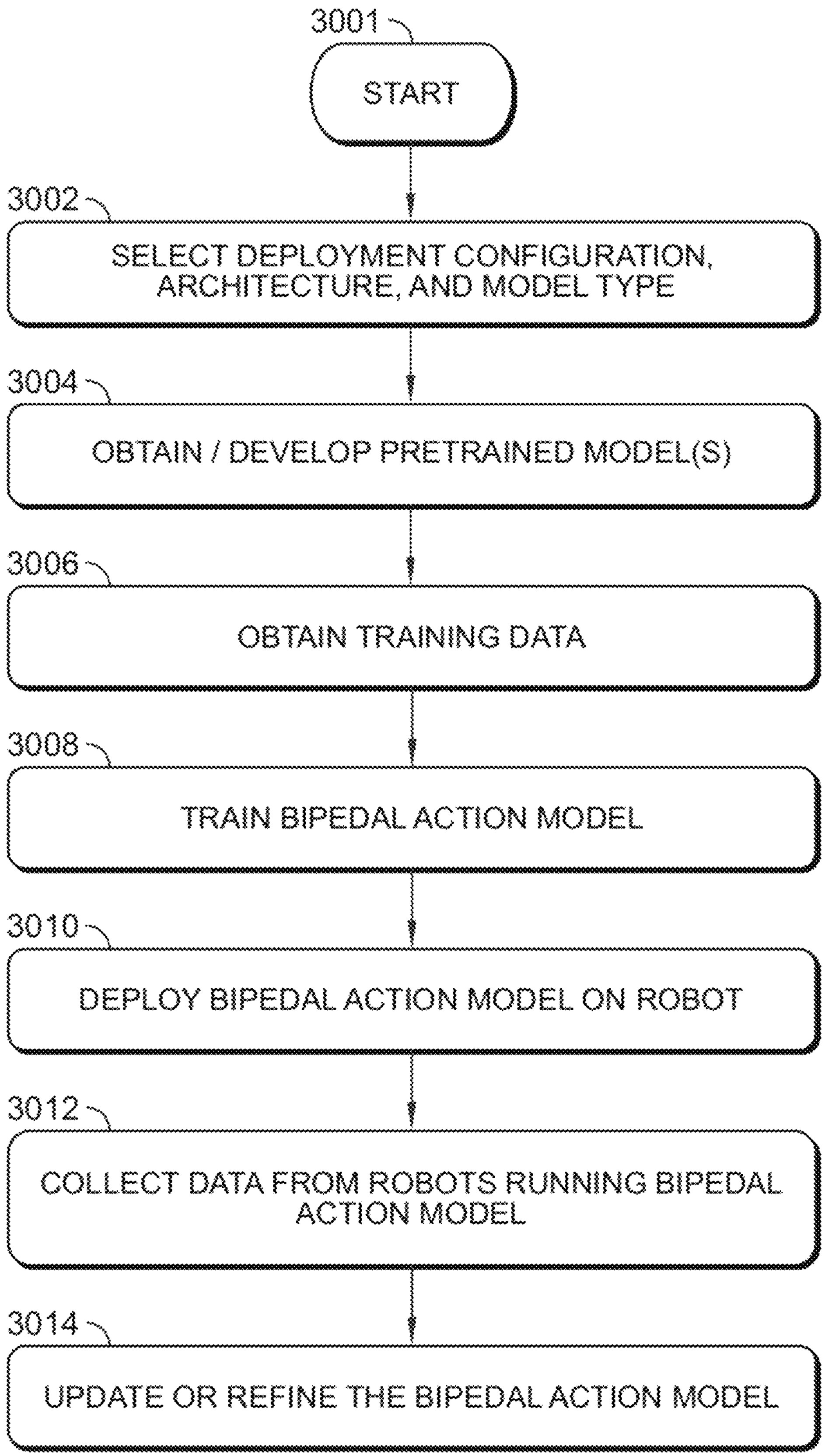
FIG. 9 is a flowchart illustrating the process of training, running, and retraining a bipedal action model (BAM)
Figure 17:
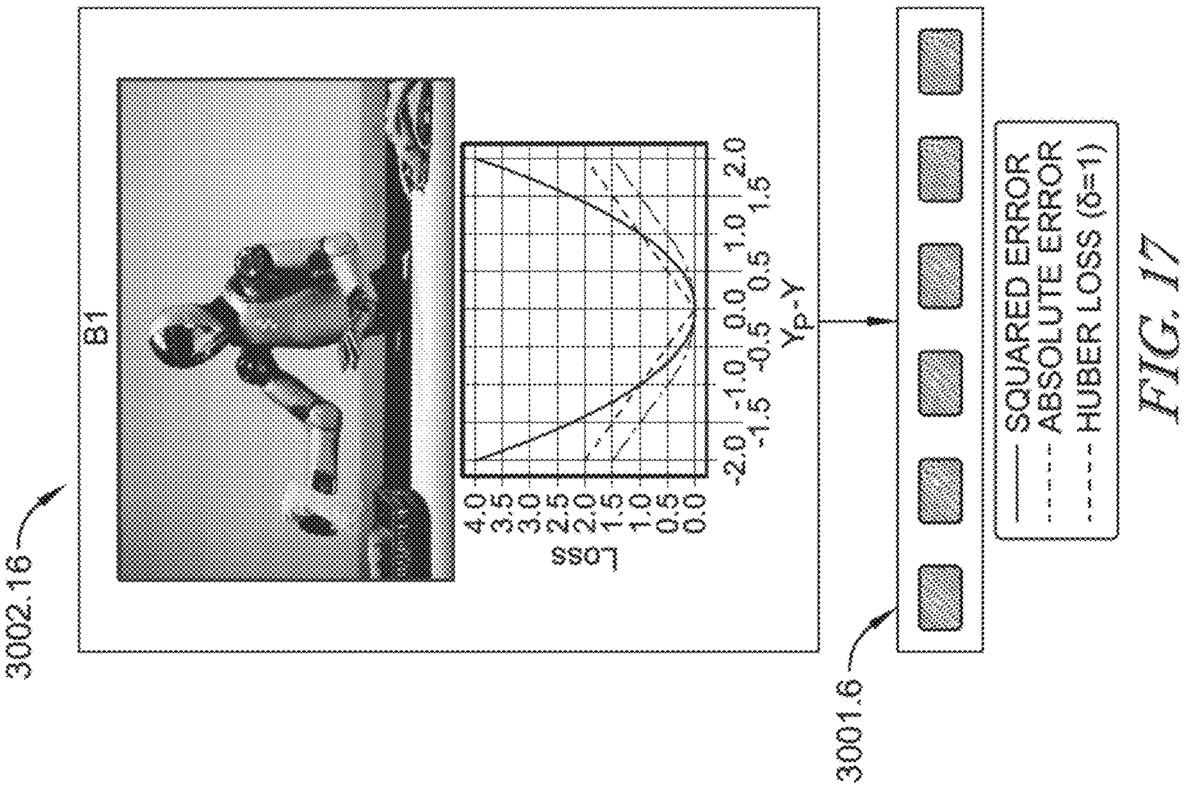
FIG. 17 is a diagram illustrating an example beta model of FIGS. 10-15, wherein said beta model is an AI model that has been pretrained with a regression loss function and outputs continuous data.
Figure 18:
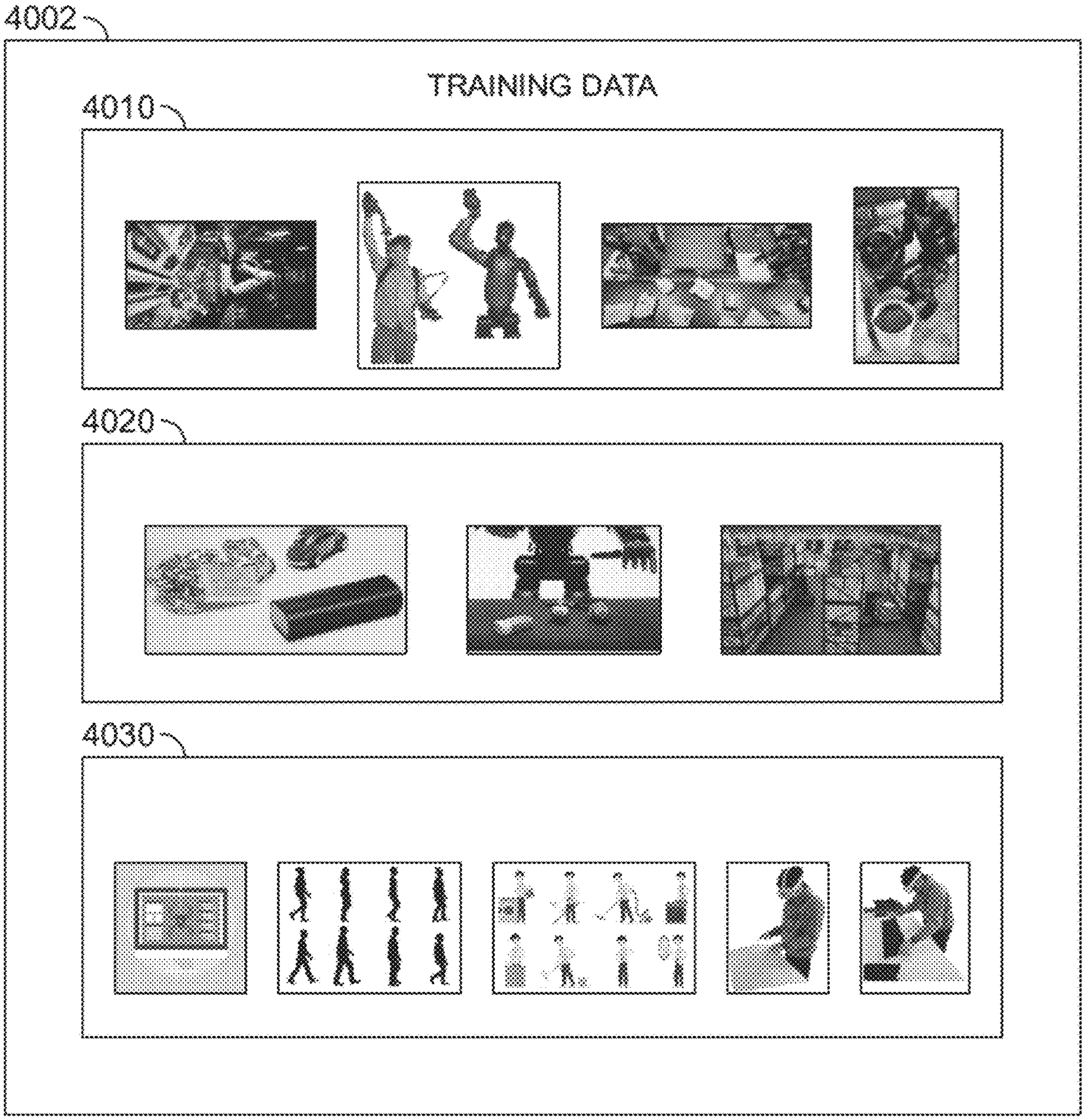
FIG. 18 is a block diagram depicting a collection of training data that may be used in generating the BAM.

FIG. 9 illustrates a flowchart of a method for the development, deployment, use, and refinement of a bipedal action model (BAM). Following the initiation of the process at step 3001, a selection or development of foundational elements may be performed at step 3002, as shown in FIGS. 10-15. This step involves specifying: (i) a deployment configuration, which dictates how computational resources are allocated between local onboard processors and remote servers, (ii) an internal architecture, which defines the arrangement and interaction of different model components through attention mechanisms, skip connections, and gradient flow pathways, and (iii) the specific type or types of machine learning models to be contained within the architecture, such as transformer-based models with multi-head attention mechanisms, diffusion-based models with denoising score matching, or hybrid architectures combining convolutional and recurrent elements. As such, step 3002 defines the foundational configuration, architecture, and components of the BAM. Once the designer has completed step 3002, the constituent software and hardware components of the BAM are obtained or developed in step 3004, as illustrated in FIGS. 16-17. As described below, this step of obtaining the components of the BAM may require procuring previously generated and pre-trained models and/or developing new, custom models from the ground up to meet specific performance criteria. Once the components of the BAM are obtained or generated in step 3004, the designer can focus their attention on obtaining training data in step 3006, as shown in FIG. 18. This training data may encompass a wide range of sensory inputs, actions, and environmental contexts relevant to the tasks the BAM is intended to perform, ranging from large-scale internet datasets containing billions of image-text pairs to specific, high-fidelity robot teleoperation logs with synchronized multi-sensor streams.

Figure 19:
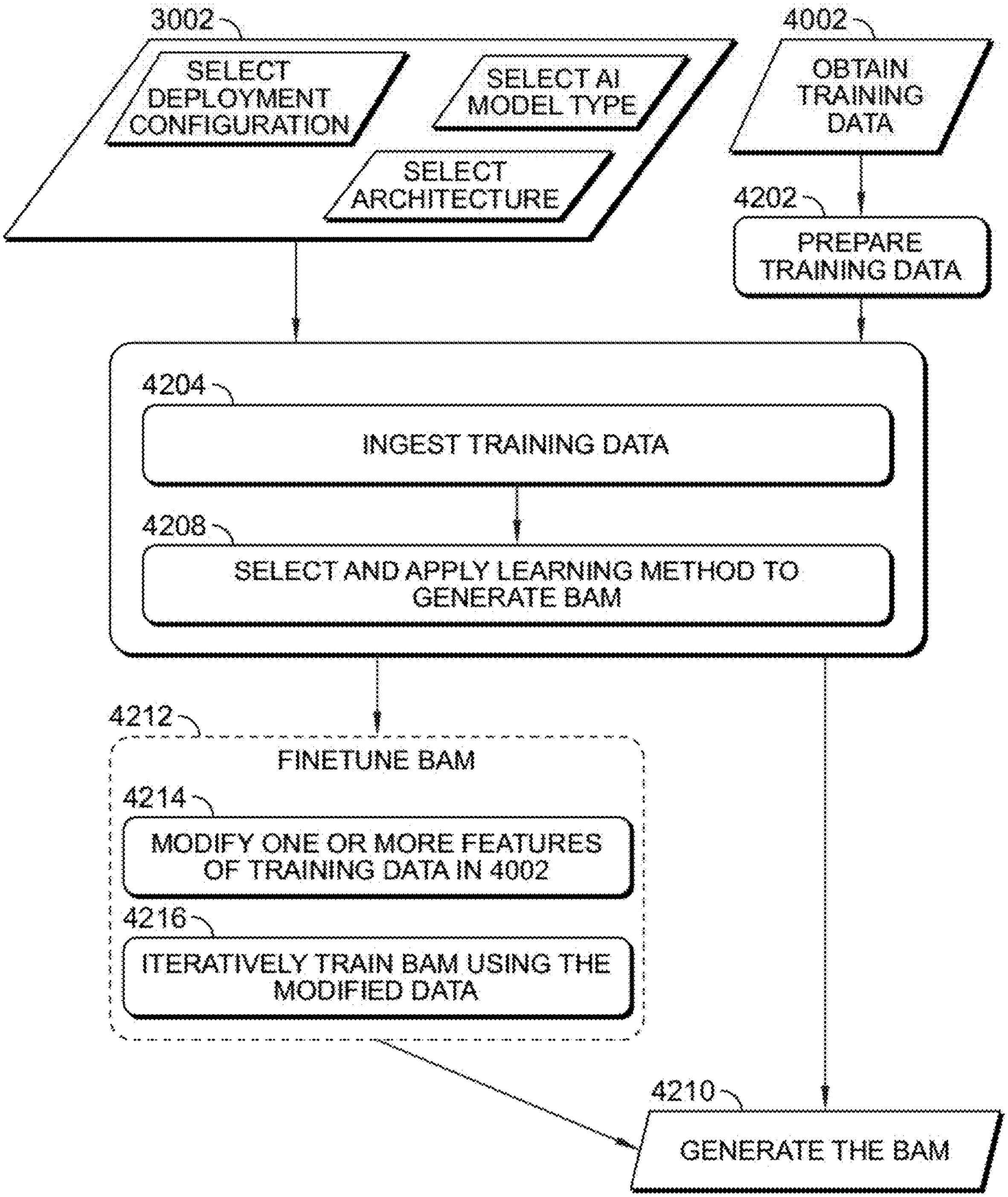
FIG. 19 is a flowchart illustrating a process of generating the BAM.
Figure 20:
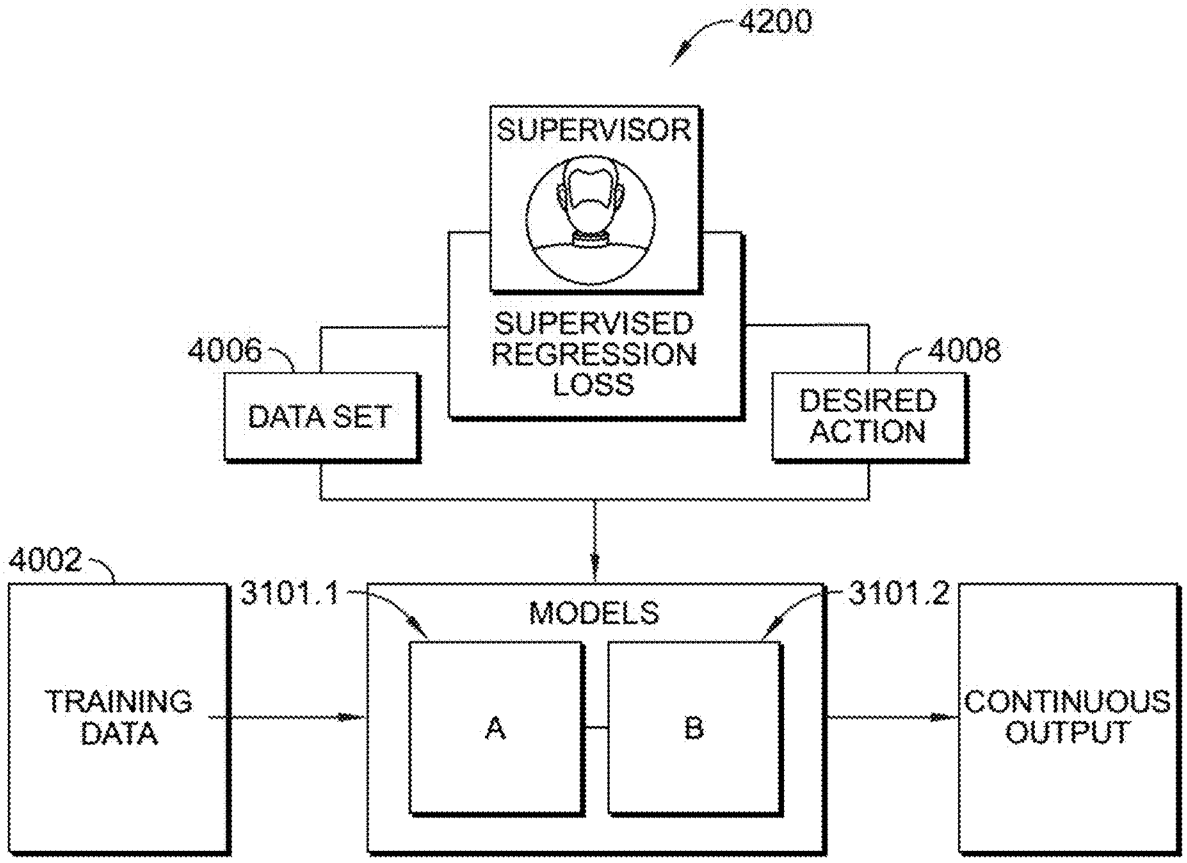
FIG. 20 is a diagram illustrating a training methodology that may be used in the generation of the BAM.

With the training data obtained and preprocessed in step 3006, the BAM may be trained at step 3008, as shown in FIGS. 19-20. This training process can involve the selection or development of a training methodology, wherein said training methodology is designed to adjust aspects of the previously obtained or generated components of said BAM. In particular, the aspects that can be adjusted in this step include the weights and biases of the neural network models contained in the BAM, normalization parameters, attention temperature coefficients, dropout probabilities, and/or other parameters of said models. The adjustment of these aspects is designed to facilitate the identification of complex, non-linear correlations between the multimodal inputs and the output of continuous robot control commands, not discrete, not selected from a subset of values or bins, or "actions." It should be understood that continuous robot control commands do not refer to a continuous time period, but rather to the fact that the values can be any number (as opposed to being selected from a subset of values).

Upon completion of the training, the BAM may be deployed based on the selected or generated deployment configuration and utilized to autonomously control the humanoid robot 1, 2700A-X at step 3010, as shown in FIGS. 21-28. During runtime, the deployed BAM continuously receives multimodal inputs (e.g., video streams at 30-60 frames per second and state information at rates between 1 Hz-500 kHz), processes these inputs through cascaded neural network layers with millisecond-scale latency, and outputs continuous robot control commands. The output of continuous robot control commands can then be organized into action chunks spanning 1 millisecond to 10 seconds of future trajectory. These action chunks can be processed or distributed by the whole-body controller 1550 to generate low-level or actuator-based humanoid controls. Once the low-level or actuator-based humanoid controls are generated and acted upon by the motor drivers and power amplifiers, said low-level or actuator-based humanoid controls can be fed back into the BAM through feedback loops to generate or alter the next action chunk based on the observed state evolution. This closed-loop design enables the robot to perform long-horizon tasks spanning minutes to hours and dynamically adapt its behavior in response to its ever-changing environment through online replanning and reactive control strategies.

Figure 29:
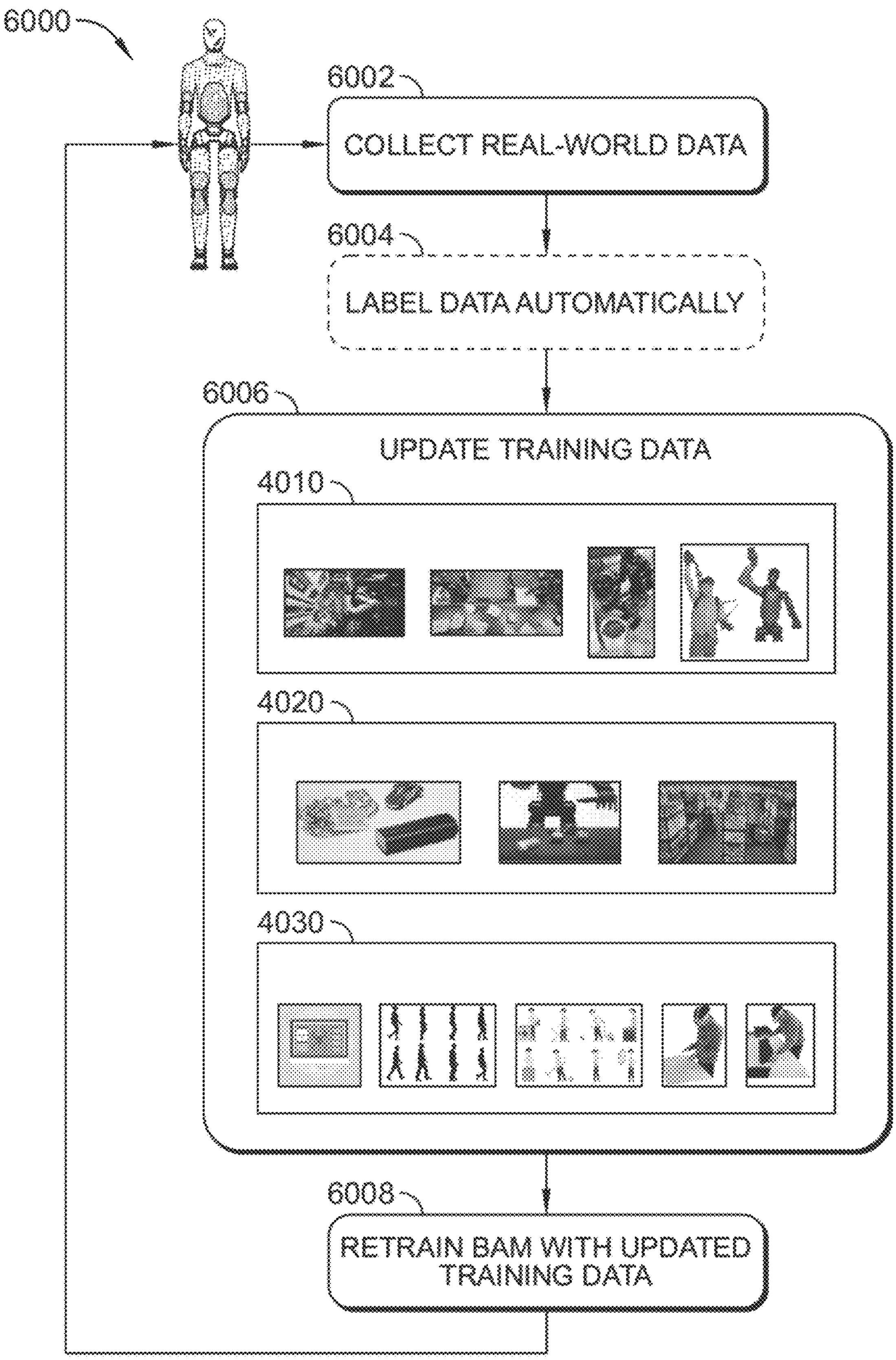
FIG. 29 is a flowchart illustrating a process of retraining the BAM after deploying the trained BAM to the humanoid robot of FIGS. 1-3B.

While the robot is operating with the deployed BAM, new data can be collected at step 3012, as shown in FIG. 29. This data may include successful task completions with reward signals, failure cases with diagnostic information, novel interactions with previously unseen objects or environments, and edge cases that expose model limitations. The collected data can then be used to update, retrain, or refine the BAM at step 3014 through techniques such as experience replay, hindsight relabeling, and adversarial training. This updating, retraining, or refining step enables iterative improvement of the model's performance metrics, allowing it to adapt its capabilities based on new experiences and information while maintaining backward compatibility with existing behaviors. This continuous learning loop facilitates creating a generalist model that can improve over time through lifelong learning mechanisms and expand its skill repertoire without forgetting previously learned tasks.

i. Deployment Configuration

Figure 10:
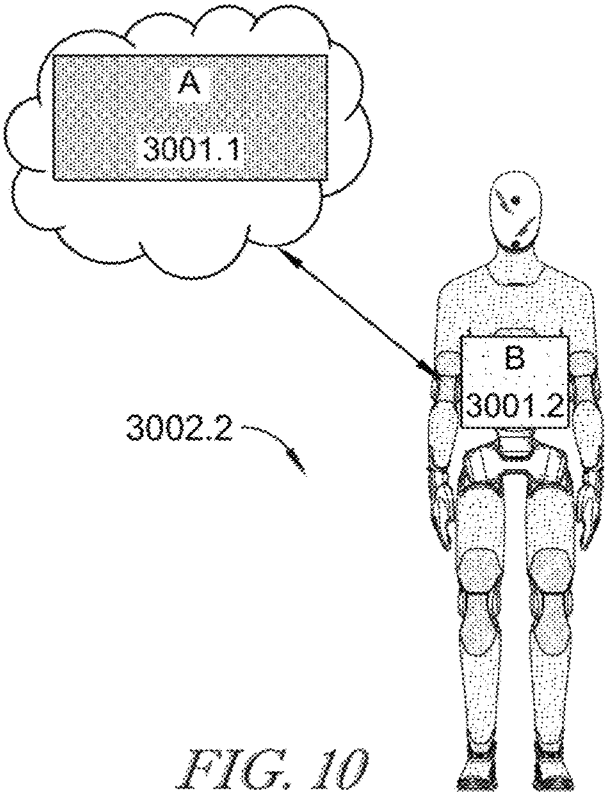
FIG. 10 is a diagram depicting a first deployment configuration of the BAM of FIG. 9, wherein an alpha model is not deployed locally on the humanoid robot of FIGS. 1-3B, while a beta model is deployed locally on said humanoid robot.
Figure 11:
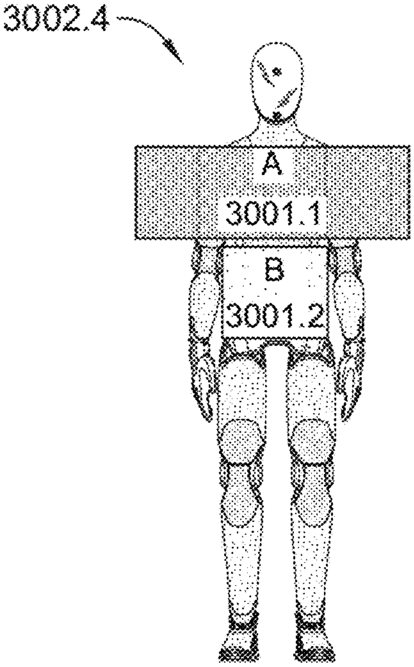
FIG. 11 is a diagram depicting a second deployment configuration of the BAM of FIG. 9, wherein both the alpha and beta models are deployed locally the humanoid robot of FIGS. 1-3B.
Figure 12:
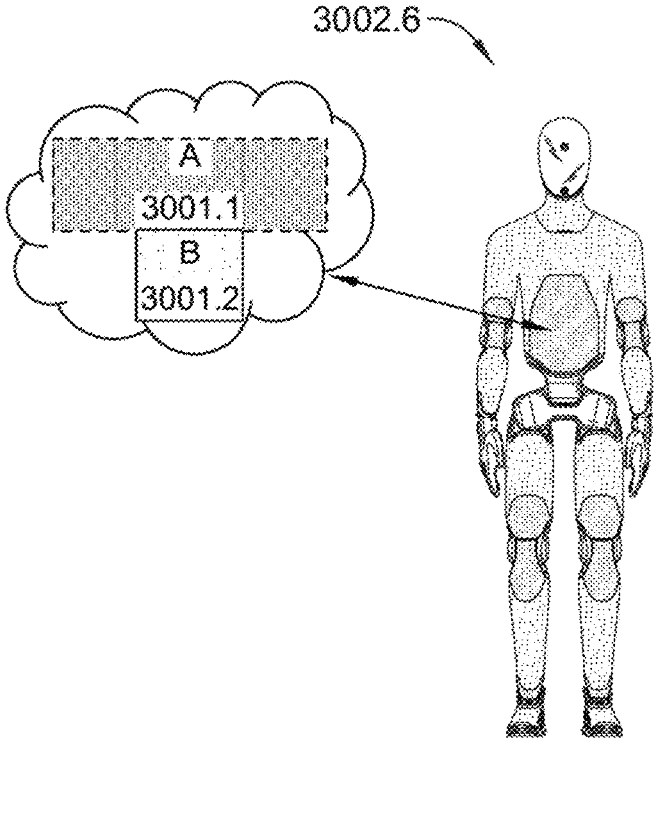
FIG. 12 is a diagram depicting a third deployment configuration of the BAM of FIG. 9, wherein neither of the alpha nor the beta models is deployed locally on the humanoid robot of FIGS. 1-3B.

One of the first steps in generating a BAM involves the selection and/or identification of the desired deployment configuration. As shown in FIGS. 10-12, the BAM may be deployed in the remote AI system 2780 only, in the local AI system 1470 only, and/or split between the remote AI system 2780 and the local AI system 1470. It should be understood that the term "local" is intended to mean that the model or the identified portion of the model is running on computing hardware physically integrated within or attached to the robot 1, 2700A-X, including the above described embedded GPUs, TPUs, or specialized neural processing units. The term "remote" is intended to mean that the model or the identified portion of the model is running on computing hardware that is not local to the robot 1, 2700A-X. In other words, the term "remote" includes all servers, computers, edge computing nodes, and/or other equipment that is not physically integrated within or attached to the robot 1, 2700A-X, but can be located in the same building as the robot 1, 2700A-X, adjacent to the robot 1, 2700A-X, and/or distributed across data centers positioned around the world.

The deployment configuration of the BAM may be or include any known configuration. FIGS. 10-12 identify a few different configurations, but other configurations are contemplated by this disclosure. Further, the selection and/or creation of the internal architecture of the BAM is discussed in great detail below, and this subsection is primarily focused on what computing resources may be used to run the BAM. As such, FIG. 10 is a diagram depicting a first deployment configuration 3002.2 of the BAM, wherein an alpha model 3001.1 is not deployed locally on the humanoid robot 1, 2700A-X of FIGS. 1-3B, while a beta model 3001.2 is deployed locally on said humanoid robot 1, 2700A-X. In other words, the alpha model 3001.1 is deployed on the remote AI system 2780, while the beta model 3001.2 is deployed on the local AI system 1470. This arrangement beneficially allows the computationally demanding cognitive tasks (e.g., abstract reasoning, long-horizon planning, nuanced language understanding, etc.) that can run at a lower refresh rate or frequency of 1-100 Hz, and preferably between 1 and 20 Hz to be handled by the extensive resources of powerful remote servers, while performing the less computationally demanding reactive tasks (e.g., balance control, positioning of end effectors, force compliance, collision avoidance, etc.) that need to run at a higher refresh rate or frequency of 100 Hz-500 kHz to be handled by the less power hungry local computing resources optimized for real-time execution.

FIG. 11 is a diagram depicting a second deployment configuration 3002.4 of the BAM, wherein both the alpha model 3001.1 and the beta model 3001.2 are deployed locally on the humanoid robot of FIGS. 1-3B. This configuration can effectively minimize the communication latency between the alpha and beta models 3001.1, 3001.2, thereby enabling exceptionally fast, reactive control and immediate real-time decision-making without network dependencies. However, running both computationally distinct alpha and beta models 3001.1, 3001.2 locally may place high demands on the robot's onboard computing resources, potentially requiring more powerful processors, increased memory, and greater power consumption, which could impact the robot's overall design, weight distribution, and operational endurance. It should be understood that in some embodiments, the alpha model 3001.1 may be omitted in this deployment configuration, and the BAM may only include a single beta model 3001.2 optimized for the specific task domain.

FIG. 12 is a diagram depicting a third deployment configuration 3002.6 of the BAM, wherein neither the alpha model 3001.1 nor the beta model 3001.2 is deployed locally on the humanoid robot of FIGS. 1-3B. This architectural setup minimizes the computational load on the robot to the greatest extent possible through thin-client design principles, as all significant processing including neural network inference, trajectory optimization, and scene understanding is offloaded to scalable remote servers with elastic compute capabilities. This may be particularly advantageous for deploying fleets of robots that are designed to be lightweight with reduced mechanical inertia, energy-efficient with extended battery life exceeding 8 hours, and less expensive due to reduced onboard computing requirements that eliminate the need for high-end processors and cooling systems. It should be understood that the alpha model 3001.1 may be omitted in this deployment configuration for simplified control pipelines, and the BAM may only include a single beta model 3001.2 specialized for the target application domain.

In a further deployment configuration, some layers, functions (e.g., encoding through convolutional layers, decoding through transposed convolutions, attention mechanisms with query-key-value projections) of either the alpha model 3001.1 or the beta model 3001.2 may be split between the remote AI system 2780 and the local AI system 1470 using model partitioning strategies. For example, the beta model 3001.2 and the tokenization and/or embedding layers associated with the alpha model 3001.1, comprising vocabulary lookups and positional encodings, may be performed/run on the local AI system 1470 with SIMD optimizations, while the remaining computationally intensive transformer blocks of the alpha model 3001.1 containing multi-head attention and feed-forward networks may be performed/run on the remote AI system 2780 with tensor parallelism. In an alternative example, the high-frequency reflexes operating at 1 kHz and basic stability functions such as zero-moment-point control of the beta model 3001.2 may be performed/run on the local AI system 1470 using real-time kernels, while the remaining tasks/functions of the beta model 3001.2 including trajectory generation and the alpha model 3001.1 for semantic understanding may be performed/run on the remote AI system 2780. Even further deployment configurations are contemplated, wherein a single remote model may communicate with models locally deployed on a plurality of robots through publish-subscribe architectures, or any other configuration that facilitates distributed intelligence based on this disclosure.

ii. Internal Architecture

Along with selecting the deployment configuration, the designer must select the internal architecture for the BAM.

Figure 13:
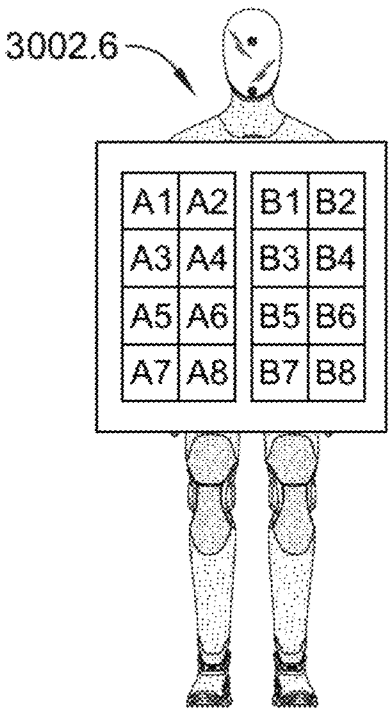
FIG. 13 is a diagram depicting a first architecture of the BAM of FIG. 9, wherein said BAM includes a first pool having a plurality of alpha models, and a second pool having a plurality of beta models.
Figure 14:
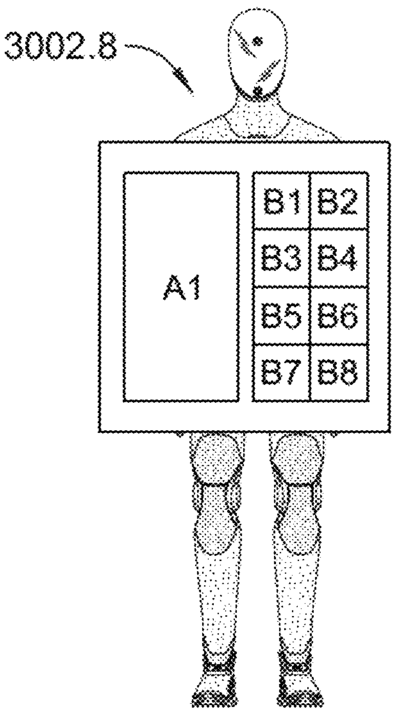
FIG. 14 is a diagram depicting a second architecture of the BAM of FIG. 9, wherein said BAM includes a first pool having a single alpha model, and a second pool having a plurality of beta models.
Figure 15:
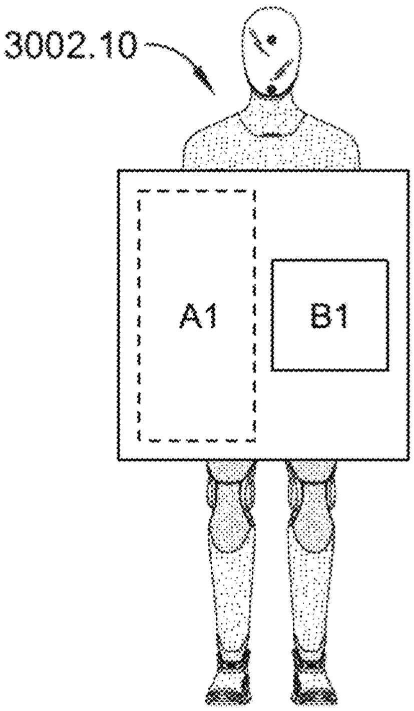
FIG. 15 is a diagram depicting a third architecture of the BAM of FIG. 9, wherein said BAM includes a first pool having a single alpha model, and an optional second pool having a single beta model.
Figure 16:
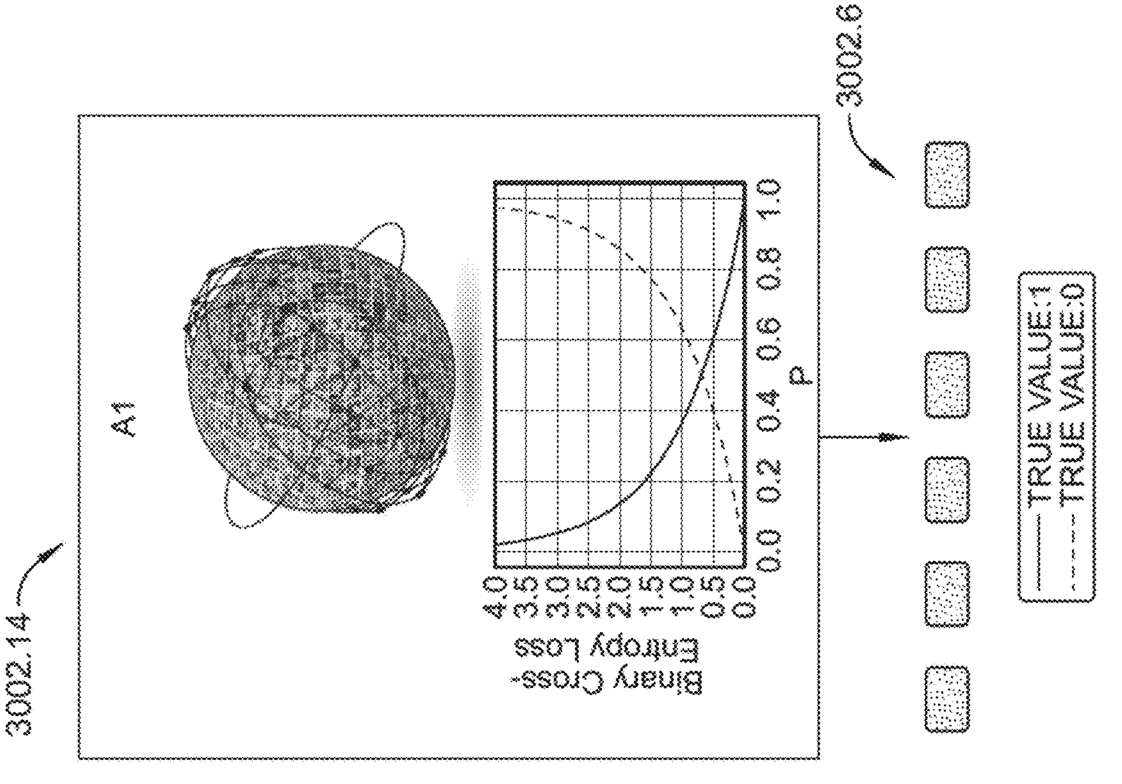
FIG. 16 is a diagram illustrating an example alpha model of FIGS. 10-15, wherein said alpha model is an AI model that has been pretrained with a cross-entropy loss function and outputs discrete data.

As shown in FIGS. 13-15, the internal architecture may include an optional first pool of models and a second pool of models, wherein the first and second pools of models can include: (i) a single model, or (ii) a plurality of models. While these pools of models are depicted as being deployed on the local AI system 1470, it is essential to note that these pools and their associated models may be fully deployed or partially deployed on the remote AI system 2780 (as described above). Also, it should be understood that the BAM may have any type of hierarchical internal design, which may span from including two hierarchically arranged pools of models to n layers (e.g., where n is between 3 and 1,000) of hierarchically arranged pools of models. Moreover, as noted below, the BAM may only include a single model, and thus it may not have a hierarchical internal design. Further, the alpha model(s) that are contained within the first pool may also be referred to as: (i) a second model, (ii) second sub-system, (iii) large/larger, (iv) slow/slower, (v) backbone, and/or (vi) thinking, while the beta model(s) that are contained within the second pool may also be referred to as: (i) a first model, (ii) first sub-system, (iii) small/smaller, (iv) fast/faster, (v) actor, and/or (vi) reactive. Finally, in alternative FIG. 13 is a diagram depicting a first architecture 3002.6 of the BAM, wherein said BAM includes a first pool having a plurality of alpha models 3001.1, and a second pool having a plurality of beta models 3001.2. Each model contained in the plurality of alpha models 3001.1 may be different from all other models contained in said plurality of alpha models 3001.1. For example, a first alpha model 3001.1 may be designed to provide industrial cognitive reasoning, a second alpha model 3001.1 may be designed to provide household cognitive reasoning, and a third alpha model 3001.1 may be designed to provide retail cognitive reasoning. Likewise, a first beta model 3001.2 may be designed to provide industrial reactive movements, a second beta model 3001.2 may be designed to provide household reactive movements, and a third beta model 3001.2 may be designed to provide retail reactive movements.

In another example demonstrating the flexibility of the architecture, the first pool might contain a first alpha model 3001.1 specialized for fine-grained object recognition and a second alpha model 3001.1 optimized for high-level spatial reasoning. Similarly, the second pool could include a first beta model 3001.2 for dexterous, bimanual manipulation, and a second beta model 3001.2 for efficient locomotion. At runtime, the humanoid robot 1, 2700A-X can dynamically select one or more of these models from the first and second pools to best suit the current task. For instance, to execute a command like "go to the kitchen," the humanoid robot 1, 2700A-X might select the second alpha model 3001.1 for its spatial reasoning capabilities and pair it with the second beta model 3001.2 specialized locomotion capability. For a more complex task, such as "pick up the red block and place it on the blue one," an alpha model 3001.1 with a fused SigLIP and DINOv2 vision encoder for robust perception could be paired with the beta model 3001.2 using a diffusion policy for precise, dexterous manipulation.

As shown in this Figure, the alpha models 3001.1 may have a first size (e.g., have the same number of parameters ranging from 10 million to 100 billion (preferably between 500 million and 30 billion) or the same context window spanning 100 tokens to 500,000 tokens) that is the same as the size of the beta models 3001.2, enabling balanced computational loads. Also, the alpha models 3001.1 may operate at a first frequency or refresh rate between 1-100 Hz (preferably between 1 and 20 Hz), which is the same as the frequency or refresh rate of the beta models 3001.2 for synchronized execution. This architectural modularity also enhances system resilience, as faults or errors in output from the alpha model(s) 3001.1 can be sandboxed away from lower-level outputs of the beta model(s) 3001.2, reducing the likelihood of an actuator or the robot behaving erratically in response to erroneous task logic.

In contrast to FIG. 13, FIG. 14 is a diagram depicting a second architecture 3002.8 of the BAM, wherein said BAM includes a first pool having a single alpha model 3001.1, and a second pool having a plurality of beta models 3001.2. In this embodiment, the BAM may provide an alpha model 3001.1 that can provide general reasoning and a plurality of specialized beta models 3001.2 (e.g., one that is tailored for each environment or task, as described above). Additionally, the alpha model 3001.1 may have a higher or larger number of parameters exceeding 5 billion or a higher or larger context window exceeding 30,000 tokens than the number of parameters (e.g., below 1 billion) or the context window (e.g., below 10,000 tokens) of the beta models 3001.2. Also, the alpha model 3001.1 may operate at a first frequency or refresh rate of 1-25 Hz that is lower than the second frequency or refresh rate of 100-10,000 Hz of the beta models 3001.2.

FIG. 15 is a diagram depicting a third architecture 3002.10 of the BAM, wherein said BAM includes an optional first pool having a single alpha model 3001.1, and a second pool having a single beta model 3001.2. In this embodiment, the pools of models are consumed by the single model contained in each of said pools. Like the second architecture, the alpha model 3001.1 may be larger (e.g., higher number of parameters, larger context window) and have a lower frequency or refresh rate in comparison to the smaller (e.g., lower number of parameters, smaller context window) and higher frequency or refresh rate beta model 3001.2 optimized for real-time execution. Also, as described above, the alpha model 3001.1 may be omitted and the BAM may only include a beta model 3001.2.

It should be understood that in other embodiments, the beta models 3001.2 may have a higher or larger number of parameters or a higher or larger context window than the number of parameters or the context window of the alpha models 3001.1. Furthermore, the beta models 3001.2 may operate at a first frequency or refresh rate that is lower than the second frequency or refresh rate of the alpha models 3001.1. Finally, the BAM may also be comprised of: (i) a first pool having a plurality of alpha models 3001.1, and a second pool having a single beta model 3001.2, (ii) a pool that contains a plurality of beta models 3001.2, but omits the alpha model 3001.1, (iii) a pool that contains a single or plurality of alpha models 3001.1, and (iv) any other architecture that is obvious to one of skill in the art based on this disclosure.

iii. Model Type

The alpha model(s) 3001.1 and the beta model(s) 3001.2 may be of any type of artificial intelligence models, machine learning models, neural network-based models, deep learning models, or generative artificial intelligence models. In addition to these general model types, the alpha model(s) 3001.1 and the beta model(s) 3001.2 may be classified as one, more than one, or a combination of large language models (LLMs), VLMs, multimodal large language models (MLLMs), audio models, video models, graph models, any combination thereof, and/or any other known model.

Further, the alpha model(s) 3001.1 and the beta model(s) 3001.2 may be implemented as and/or including: (i) transformer family architectures (e.g., decoder-only with causal masking; encoder-only (BERT) with bidirectional attention; cross-attention encoder-decoder (T5) with separated encoding and decoding; ViT/DeiT for image patches, Swin with hierarchical windows; Longformer with sparse attention, BigBird with random and global tokens, Reformer with locality-sensitive hashing, Linformer with linear complexity, Performer with kernel-based attention; Transformer-XL with segment-level recurrence, Memorizing Transformer with explicit memory; Cross-Modal Bridges for multimodal fusion, Q-Former for query-based extraction; Perceiver/Perceiver-IO with latent bottlenecks; Graph Transformers for structured data), (ii) state-space/long-sequence & recurrence models (e.g., S4/S5 with structured matrices; Mamba/Mamba-2 with selective state spaces; RetNet with retention mechanisms; Liquid Models with continuous-time dynamics; Hyena/Long Convolutions with implicit parameterization; Linear-Attention Kernels with softmax alternatives), (iii) recurrent neural networks (e.g., LSTM/GRU/SRU with gating mechanisms; RWKV with linear complexity; RNN-T for sequence transduction), (iv) convolutional neural network architectures (e.g., ResNet/EfficientNet/ConvNeXt with modern design principles; U-Net for dense prediction; Sparse/3D CNNs (Minkowski) for point clouds), (v) graph neural network & geometric architectures (e.g., GCN/GAT/GIN with message passing; GraphSAGE with sampling; EGNN with equivariance; SE (3)-Transformers with group theory; E (n)-Equivariant CNNs preserving symmetries), (vi) spiking neural networks (e.g., Event-Driven SNNs with temporal coding), (vii) MLP-Style Vision architectures (e.g., MLP-Mixer with token mixing; gMLP with gating; MetaFormer-Style Variants abstracting transformer components), (viii) audio-centric backbones (e.g., Conformer combining convolution and attention; TasNet/Conv-TasNet for source separation; wav2vec/HuBERT for self-supervised speech; Diffusion Vocoders for waveform generation), (ix) sets/point clouds/3D representations (e.g., DeepSets/Set Transformer with permutation invariance; PointNet/PointNet++ with hierarchical features; Point Transformer adapting attention; KPConv with kernel convolutions; Minkowski networks for sparse voxels), (x) implicit neural representations/neural fields (e.g., SIREN with periodic activations; NeRF Family Including Mip-NeRF with anti-aliasing, Instant-NGP with hash encoding; DeepSDF for shape representation; 3D Gaussian Splatting for fast rendering), (xi) autoregressive models (e.g., Token/Patch/Audio AR with sequential generation; PixelCNN/RNN for images; AR Transformers with causal masking), (xii) variational autoencoder & latent-variable models (e.g., B-VAE with disentanglement; Hierarchical VAEs with multiple scales), (xiii) diffusion/score-based models (e.g., LDMs in latent space; DiT with transformers; Video Diffusion with temporal consistency; Vocoders for audio synthesis), (xiv) normalizing flows (e.g., RealNVP with coupling layers; Glow with invertible convolutions; Neural ODE Flows with continuous dynamics; FFJORD with free-form Jacobians), (xv) generative adversarial networks (e.g., StyleGAN with style modulation; BigGAN with class conditioning), (xvi) energy-based models (e.g., Including Boltzmann/RBMs with stochastic units), (xvii) masked/denoising objectives (e.g., BERT-Style MLM for language; MAE for images; Denoising AEs with corruption), (xviii) contrastive/self-distillation methods (e.g., CLIP for vision-language; SimCLR for visual representations; MoCo with momentum encoding; DINO/iDINO with self-distillation), (xix) tokenization/latent tokenizers (e.g., VQ-VAE/VQ-GAN with discrete codes; Tokenizer-Decoder Stacks for compression), (xx) preference/RL fine-tuning (e.g., RLHF/RLAIF with human feedback; DPO for direct optimization), (xxi) mixture-of-experts (MoE) systems (e.g., Switch with routing; GShard with sharding; DeepSeek-MoE with sparse activation), (xxii) retrieval & external memory (e.g., RAG for knowledge grounding; kNN-LM with nearest neighbors; NTM with differentiable memory; DNC with addressing mechanisms), (xxiii) world/dynamics models (e.g., PlaNet/RSSM/Dreamer with latent dynamics; MuZero-Style with planning; Latent ODE Dynamics with continuous time; Diffusion World Models for stochastic environments), (xxiv) multimodal fusion strategies (e.g., Cross-Attention Bridges between modalities; FiLM-Style Conditioning with affine transformations; Gated Fusion with learnable weights; Q-Former/Perceiver Latents for bottleneck processing), any combination thereof through hybrid architectures, and/or any other type that advances the state of the art based on this disclosure.

Additionally, this Application contemplates that the alpha model(s) 3001.1 and the beta model(s) 3001.2 could use or include any model type disclosed in any one of the following papers: Radford, Alec, et al. "Learning transferable visual models from natural language supervision." *International conference on machine learning*. PMLR, 2021, Li, Yangguang, et al. "Supervision exists everywhere: A data efficient contrastive language-image pre-training paradigm." ar Xiv preprint arXiv: 2110.05208 (2021), Yao, Lewei, et al. "Filip: Fine-grained interactive language-image pre-training." arXiv preprint arXiv: 2111.07783 (2021), Rombach, Robin, et al. "High-resolution image synthesis with latent diffusion models." *Proceedings of the IEEE CVF conference on computer vision and pattern recognition*. 2022, Li, Junnan, et al. "Blip: Bootstrapping language-image pre-training for unified vision-language understanding and generation." *International conference on machine learning*. PMLR, 2022, Zhang, Renrui, et al. "Llama-adapter: Efficient fine-tuning of language models with zero-init attention." ar Xiv preprint arXiv:2303.16199 (2023), Liu, Haotian, et al. "Visual instruction tuning." *Advances in neural information processing systems* 36 (2024), Liu, Haotian, et al. "Improved baselines with visual instruction tuning." *Proceedings of the IEEE/CVF Conference on Computer Vision and Pattern Recognition*. 2024, Lin, Ji, et al. "Vila: On pre-training for visual language models." *Proceedings of the IEEE CVF Conference on Computer Vision and Pattern Recognition*. 2024, Jin, Yang, et al. "Unified Language-Vision Pretraining in LLM with Dynamic Discrete Visual Tokenization. arXiv 2024." ar Xiv preprint arXiv: 2309.04669, Maniparambil, Mayug, et al. "Do Vision and Language Encoders Represent the World Similarly?." *Proceedings of the IEEE/CVF Conference on Computer Vision and Pattern Recognition*. 2024, Liu, Daizong, et al. "A Survey of Attacks on Large Vision-Language Models: Resources, Advances, and Future Trends." ar Xiv preprint arXiv: 2407.07403 (2024), Chang, Yupeng, et al. "A survey on evaluation of large language models." *ACM Transactions on Intelligent Systems and Technology* 15.3 (2024): 1-45, Yin, Shukang, et al. "A survey on multimodal large language models." ar Xiv preprint ar Xiv: 2306. 13549 (2023), Zhang, Duzhen, et al. "Mm-llms: Recent advances in multimodal large language models." arXiv preprint arXiv: 2401.13601 (2024), Vaswani, A. "Attention is all you need." *Advances in Neural Information Processing Systems* (2017), Radford, A. "Improving language understanding by generative pre-training." (2018), Wang, Wei, et al. "Structbert: Incorporating language structures into pre-training for deep language understanding." ar Xiv preprint ar Xiv: 1908.04577 (2019), Radford, Alec, et al. "Language models are unsupervised multitask learners." *OpenAI blog* 1.8 (2019): 9, Liu, Yinhan. "Roberta: A robustly optimized bert pretraining approach." ar Xiv preprint arXiv: 1907.11692 (2019), Sanh, V. "DistilBERT, A Distilled Version of BERT: Smaller, Faster, Cheaper and Lighter." ar Xiv preprint ar Xiv: 1910.01108 (2019), Raffel, Colin, et al. "Exploring the limits of transfer learning with a unified text-to-text transformer." *Journal of machine learning research* 21.140 (2020): 1-67, Brown, Tom B. "Language models are few-shot learners." ar Xiv preprint arXiv: 2005.14165 (2020), Touvron, Hugo, et al. "Llama 2: Open foundation and fine-tuned chat models." ar Xiv preprint ar Xiv: 2307.09288 (2023), Schulman, John, et al. "Proximal policy optimization algorithms." ar Xiv preprint arXiv: 1707.06347 (2017), Radford, Alec, et al. "Learning transferable visual models from natural language supervision." *International conference on machine learning*. PMLR, 2021, Li, Yangguang, et al. "Supervision exists everywhere: A data efficient contrastive language-image pre-training paradigm." ar Xiv preprint arXiv: 2110.05208 (2021), Chen, Zhe, et al. "Internvl: Scaling up vision foundation models and aligning for generic visual-linguistic tasks." *Proceedings of the IEEE CVF Conference on Computer Vision and Pattern Recognition.* 2024, all of which are incorporated herein by reference and in their entirety for any purpose.

As shown in FIGS. 16 and 17, the alpha model 3001.1 may be a vision-language model (VLM) 3002.14 that was trained using internet-scale data comprising billions of image-text pairs with a cross-entropy loss function to output discrete data, whereas the beta model 3001.2 is a cross-attention encoder-decoder transformer 3002.16 trained on robot data including teleoperation demonstrations and simulated trajectories using a regression loss function to output continuous data as floating-point action vectors. The selection of an open-weight pre-trained vision-language model is beneficial because it simplifies the training pipeline to provide the model with context awareness through learned representations, reduces data requirements through transfer learning, and enables zero-shot generalization to novel scenarios. Using a robot-trained cross-attention encoder-decoder transformer that outputs continuous data is also beneficial, as the model weights are tailored to the robot's kinematics through embodiment-specific training, offering high precision due to the model's ability to directly predict the floating-point values for each action dimension without quantization artifacts, and avoids discretization errors that arise from binning continuous spaces. The selection of these models represents a significant leap forward over conventional solutions that generate clunky movements with temporal inconsistencies, as these conventional solutions split the continuous action dimension into a finite number of bins resulting in discretization artifacts when predicting the appropriate bin for each degree of freedom.

Moreover, the model 3001.1, 3001.2 may incorporate techniques such as Low-Rank Adaptation (LoRA) with rank decomposition, Quantized LoRA (QLoRA) combining quantization and adaptation, Adaptive LoRA (AdaLoRA) with importance-based allocation, Decomposed LoRA (DoRA) separating magnitude and direction, Kronecker/Hadamard Low-Rank Adapters (LoKr/LoHa) with structured matrices, Sparse LoRA with selective updates, Adapter-Based Fine-Tuning (Houlsby Adapters) with bottleneck layers, Pfeiffer Adapters with sequential processing, Parallel Adapters with concurrent paths, Compacter (Parameter-Sharing Adapters) with hypercomplex numbers, MAD-X (Modular Adapter Exchange) for task switching, AdapterFusion combining multiple adapters, AdapterDrop for efficient inference, UniPELT (Unified Parameter-Efficient Tuning) integrating methods, Prefix-Tuning with virtual tokens, Prompt Tuning (Soft Prompts) with learnable embeddings, P-Tuning v2 with deep prompt encoding, Deep Prompt Tuning across layers, Visual Prompt Tuning (VPT) for vision models, BitFit (Bias-Only Fine-Tuning) updating only biases, $IA^3$ (Input-Attention-Activation Multiplicative Adapters) with element-wise scaling, Side-Tuning with parallel networks, Ladder Side-Tuning with hierarchical connections, Knowledge Distillation (Logit Matching) transferring predictions, Feature/Intermediate-Layer Distillation preserving representations, Self-Distillation (Born-Again Networks) with self-teaching, Sequence-Level Distillation for generation tasks, Multi-Teacher/Ensemble Distillation combining knowledge sources, Online Distillation with co-training, Policy Distillation for reinforcement learning, Data-Free Distillation without training data, Post-Training Quantization (PTQ) reducing precision, Quantization-Aware Training (QAT) with simulated quantization, 8-Bit Optimizers for memory efficiency, NF4/FP4 Low-Precision Training with novel formats, GPTQ with Hessian-based quantization, AWQ with activation-aware quantization, SmoothQuant balancing weights and activations, Structured/Unstructured/Movement Pruning removing parameters, N:M Sparsity with hardware acceleration, Low-Rank SVD Adapters decomposing weight matrices, DreamBooth for subject-driven generation, Textual Inversion learning new concepts, HyperNetworks generating weights, Diffusion-LoRA for generative models, any combination thereof implementing hybrid strategies, any technique disclosed in a paper that is incorporated herein by reference advancing the field, and/or any other technique that enhances model efficiency and adaptation based on this disclosure.

The above model 3001.1, 3001.2 and incorporated techniques may have been generated using any one or combination of the following loss functions: cross-entropy loss (with label smoothing), negative log-likelihood (token-level NLL/perplexity), regression losses (MSE/l2, MAE/l1, huber/smooth-l1), kullback-leibler (kl) divergence, connectionist temporal classification (CTC) loss, rnn-t loss, infonce/NT-XENT (contrastive) loss, focal loss, dice/IOU (jaccard) loss, perceptual/quality losses (feature-space/VGG, SSIM, LPIPS), adversarial GAN losses (non-saturating/logistic, hinge, WGAN-GP), exact log-likelihood/bits-per-dim (normalizing flows), diffusion objectives (ε-prediction MSE, v-parameterization, xo-prediction, variational lower bound), VAE evidence lower bound (ELBO) including B-VAE, autoregressive maximum-likelihood (teacher-forcing NLL), spectral/audio losses (STFT/multi-resolution STFT, SI-SDR/SI-snr with pit), 3D/NERF/point-cloud losses (photometric L1/L2, chamfer distance, earth mover's distance, eikonal regularization), tokenizer/codebook losses (VQ commitment/codebook/ema), multi-modal alignment/matching losses (image-text/audio-text contrastive and ITM), distillation objectives (temperature-scaled cross-entropy, KL to teacher, feature/attention transfer), and/or reinforcement-learning fine-tuning objectives (PPO-clip with value/entropy and KL regularization to a reference, direct preference optimization (DPO)).

It should also be understood that the models may be pretrained using any of the following data: (i) image data (e.g., raw image data, annotated image data, synthetic data comprising computer-generated images used to augment real image datasets such as in instances where usable data is scarce, etc.), (ii) video data (e.g., raw video data, annotated video data, synthetic data comprising simulated video data used to train models on dynamic scenarios and interactions, etc.), (iii) text data (e.g., natural language instructions, dialogue data, machine readable instructions, natural language mapping data, etc.), (iv) depth data (e.g., map data, point cloud data from LiDAR or structured light sensors, etc.), (v) robot joint trajectories, (vi) robot joint locations, (vii) robot joint location data (e.g., obtained from teleoperation of a robot), (viii) robot joint rotations data (e.g., obtained from teleoperation of a robot), (ix) other robot sensor data (e.g., inertial measurement unit (IMU) data, force and torque data, proximity sensor data, etc.), (x) simulation data, (xi) human demonstration data (e.g., images or videos of humans performing the task), (xii) robot demonstration data (e.g., images or videos of other robots performing the task), (xiii) any combination of the above data, and/or (xiv) any other known data type. It should be understood that the data may be labeled or unlabeled.

iv. Training Data

The training data 4002 for the BAM can be structured in a layered or pyramidal configuration, as illustrated in FIG. 18, and may include any data type that is disclosed herein. This approach is designed to address the challenge of data scarcity in robotics, where high-quality, embodied data is often costly and time-consuming to acquire at scale. By organizing heterogeneous data sources by their scale and specificity, this structure allows the model to first learn broad visual and behavioral priors from vast, general datasets before being grounded in the specifics of embodied, real-robot execution. The quantity of data generally decreases, while the embodiment-specificity and relevance increase, from the bottom layer to the top layer of the structure. This layered strategy enables the development of a generalist model that is both knowledgeable about the world and proficient in physical interaction.

The foundational layer of the data structure 4030 is composed of vast quantities of Internet data and human videos. This layer can provide the largest volume of data and allow for instilling the model with a broad, common-sense understanding of objects, language, and the physical world. The Internet data may include billions of text documents, images, and video clips, which helps the model learn rich semantic representations and the relationships between visual concepts and linguistic descriptions. This is supplemented by large-scale human video datasets, such as egocentric videos of people performing everyday activities. These datasets capture a wide range of real-world human behaviors, including grasping, tool use, cooking, assembly, and other task-oriented activities, providing the model with extensive examples of human-object interactions, affordances, and natural motion patterns.

A notable component of this foundational layer can include robot-free data collection, which allows for the rapid acquisition of human motion data without requiring a physical robot. In this method, a human operator may use a commercially available virtual reality (VR) or augmented reality (AR) headset to perform various manipulation tasks. The AR/VR system may capture a first-person video stream from the headset's camera at 30-90 fps, synchronized with the three-dimensional position and orientation of the operator's head and hands. This technique can be highly scalable with parallel data collection across multiple operators and cost-effective with consumer-grade hardware, as it decouples data collection from the availability of physical robots and reduces hardware wear through eliminated mechanical stress. It allows for the safe collection of data in diverse environments including homes, offices, and industrial settings, and for a wide array of tasks spanning hundreds of activity categories, such as performing household chores with natural variations or demonstrating complex bimanual manipulations with tool use, thereby generating a large and varied dataset of natural human movements with rich annotations that can be used for initial model training through behavior cloning and trajectory learning.

The middle layer of the data structure 4020 comprises simulation and synthetic data generated through physics engines and neural rendering. This layer serves to bridge the gap between the abstract knowledge gained from internet data providing semantic understanding and the specific requirements of robotic embodiment including dynamics and control. In simulated virtual environments powered by engines like MuJoCo, Bullet, or Isaac Gym, it is possible to generate millions of perfectly annotated trajectories for a wide range of tasks with deterministic repeatability. These simulations can feature diverse objects with varying geometries and material properties, backgrounds with different visual complexities, lighting conditions including shadows and reflections, and physics-based interactions modeling contact, friction, and deformation, allowing for systematic training across a vast parameter space with controlled variations. Techniques such as domain randomization, where the visual and physical properties of the simulation are varied during training across specified distributions, can help the model learn to generalize to real-world conditions through robust feature extraction. This layer provides a scalable method for generating task-specific data that would be impractical to collect in the real world.

In addition to physics-based simulation with analytical models, this middle layer may be augmented with neural-generated synthetic data using generative models. For instance, this process can involve fine-tuning large-scale video generation models such as video diffusion models or autoregressive video transformers on a smaller set of real-world robot trajectories comprising thousands of demonstrations. Once fine-tuned through techniques like LoRA or full fine-tuning, these models can generate a significantly larger volume of novel, high-fidelity video data exceeding millions of samples depicting the robot performing counterfactual scenarios with realistic appearance, such as interacting with new objects with different geometries, executing tasks in different sequences with varied ordering, or recovering from perturbations with adaptive responses. This synthetic data generation effectively multiplies the amount of available training data by creating plausible variations of existing demonstrations through learned priors, which can be used to improve the model's robustness through exposure to edge cases and ability to generalize to unseen situations through interpolation in learned spaces.

The top layer of the data structure 4010 comprises the highest-fidelity, most embodiment-specific data: real-world humanoid data collected from physical robots. While this dataset is the smallest in terms of volume typically containing thousands to tens of thousands of trajectories, it provides essential grounding for the model's learned knowledge in the dynamics and constraints of the physical world including gravity, inertia, and actuator limitations. This data can be primarily collected through teleoperation with various control interfaces, where a human operator controls a humanoid robot to perform a variety of tasks using haptic feedback. The teleoperation system may involve wearable suits with motion capture markers, sensor gloves with force feedback, or VR controllers with spatial tracking to capture the operator's movements with high precision, which can then be translated into control commands for the robot through inverse kinematics and retargeting algorithms. This process generates a rich, time-synchronized dataset containing video from the robot's onboard cameras at multiple viewpoints, the robot's complete state data (e.g., joint positions with encoder readings, velocities from differentiation, and torques from motor currents), proprioceptive signals from IMUs and force sensors, and the operator's motion data serving as supervision signals.

The tasks performed during real-world data collection can be designed to cover a wide range of applications with varying complexity levels, from industrial settings requiring precision to domestic environments demanding adaptability. This may include autonomous factory work with repetitive precision, such as sorting items on a production line with quality control, as well as common home chores requiring dexterity and planning like loading laundry into a washing machine with fabric handling, folding clothes with bimanual coordination, loading a dishwasher with object arrangement, or tidying a room with scene understanding. These demonstrations provide the model with direct experience of physical interaction including contact establishment and maintenance, contact dynamics with force modulation, friction effects on grasping, compliance for safe interaction, and the specific kinematics of the robot's body through joint limit awareness. This real-world data proves invaluable for fine-tuning the model through supervised learning, bridging the sim-to-real gap through domain adaptation, and ensuring that the final BAM can be safe through collision avoidance, effective through task completion, and reliable through consistent performance when deployed on the physical humanoid robot in unstructured environments.

v. Model Training

FIGS. 19-20 illustrate a general process for generating the BAM through iterative optimization and validation cycles. As discussed above in connection with FIGS. 10-17, the process may start with the selection or generation of the deployment configuration determining computational resource allocation, the architecture defining model connectivity and information flow, and the model types specifying inductive biases and learning paradigms in step 3002. An example of the selections and/or generations that may be performed may include: (i) selecting a deployment configuration where an alpha model 3001.1 runs on a first GPU installed within the robot's torso 1, 2700A-X, and a beta model 3001.2 runs on a second GPU installed within the robot's torso 1, 2700A-x, (ii) identifying a two-model architecture with hierarchical processing, wherein a single alpha model 3001.1 is connected to a single beta model 3001.2 via a latency vector, and (iii) obtaining a VLM that was trained on internet data using a cross-entropy loss function and outputs discrete data, along with generating a cross-attention encoder-decoder transformer that was trained on robot teleoperation demonstrations using a regression loss function and outputs continuous floating-point numbers representing control signals.

Along with the selection or generation of these elements forming the model foundation, the designer may need to process, refine, structure, and enrich the collected training data through comprehensive preprocessing pipelines in step 4202. This preprocessing stage may involve annotation and labeling with semi-automated tools, where video data is segmented into distinct, meaningful segments using shot detection algorithms, each marked with timestamps aligned across sensors. These segments can then be assigned detailed natural language descriptions generated by vision-language models that explain the actions and interactions occurring within them, including object states, contact events, and task progress indicators. The entire task trajectory may also be labeled with its final outcome through automated evaluation, such as "success" with task completion metrics or "failure" with diagnostic information, to allow the model to learn from both positive and negative examples through contrastive learning. Other preprocessing techniques may include random sampling with stratification to create manageable training sequences from long demonstrations while preserving task diversity, and trajectory filtering using quality metrics to remove low-quality or irrelevant data, such as trajectories with significant occlusions detected through visibility analysis or noisy sensor readings identified through statistical outlier detection.

Other processing, refining, or structuring of the training data may include or exclude: (i) event-triggered slicing of multi-sensor streams (contact/fault/state-change) with precise temporal alignment, (ii) calibration handling (intrinsic/extrinsic updates with distortion correction, drift compensation through sensor fusion), (iii) quality control and curation (de-duplication using perceptual hashing, outlier removal with statistical methods, missing-data imputation through interpolation, checksum validation for data integrity), (iv) signal cleanup (denoising/smoothing with Kalman filtering, detrending removing systematic biases, artifact suppression eliminating sensor glitches), (v) event/binning at byte or packet level (burst or keyframe-grouped bins) for efficient storage, (vi) kinematic reconstruction (forward/inverse kinematics solving joint configurations, twist/wrench computation for velocity and force), (vii) derived signals (contact state from force thresholds, center-of-pressure from force distribution, occupancy/height maps from depth sensors, SDFs from point clouds, cost/reward traces from task objectives), (viii) sequence/trajectory assembly with teacher-forcing or rollout annotations for supervised learning, (ix) self-supervised target generation (masking/denoising targets for reconstruction, contrastive pairs/triplets for metric learning, next-step prediction for dynamics modeling, temporal order/reversal for sequence understanding), (x) weak/explicit labeling (heuristics from domain knowledge, simulation providing perfect labels, programmatic rules encoding priors, human annotation for ground truth), (xi) data augmentation and domain randomization (spatial/photometric/temporal/viewpoint/dynamics variations; noise injection, cutout/mixup for robustness), (xii) balancing and sampling strategies (class/scene balance addressing skew, curriculum sampling with increasing difficulty, hard-negative mining focusing on errors), (xiii) compression and quantized feature caches (e.g., NF4/FP8/INT8) for storage/throughput optimization, (xiv) privacy/security filtering (anonymization removing identifiers, PII/PHI redaction for compliance, access-control tagging for permissions), (xv) metadata/provenance attachment (sensor IDs for tracking, calibration versions for reproducibility, environment/task/policy tags for organization), (xvi) retrieval indices and memory tables for RAG-style conditioning enabling knowledge grounding, (xvii) teacher/assistant signal preparation for distillation (logits as soft targets, intermediate features for matching, attention maps for structure transfer), (xviii) dataset partitioning (train/val/test with no leakage, temporal/domain/robot splits for generalization evaluation), (xix) online/streaming ingestion with back-pressure and late-bound labeling for continuous learning, (xxi) any combination thereof creating comprehensive pipelines, (xxii) any processing, refining, or structuring disclosed in a paper that is incorporated herein by reference advancing best practices, and/or (xxiii) any processing, refining, or structuring that is obvious to one of skill in the art.

Data augmentation may also be employed to enhance the dataset with temporal and sensory context. This can include creating a vision memory by providing the model with a sequence of recent video frames, rather than a single instantaneous frame, to improve its understanding of dynamic scenes. Similarly, a state history, comprising a temporal window of past robot or human tracking states, can be used to provide context for generating smoother and more reactive motions. The input observations may also be augmented by integrating force feedback data from tactile or force sensors, providing the policy with a sense of touch to better modulate its physical interactions. Furthermore, when training with mixed datasets of human and robot data, data alignment techniques may be used. This can involve removing robot-specific state information or randomly masking sensor data fields that are not present in the human data, which forces the model to learn from the shared data streams and improves its ability to generalize across different embodiments.

The core process of creating the BAM begins with ingestion of the training data in step 4204. Said ingestion may focus on data modifications that alter the prepared training data into information that can be consumed in the process of training the BAM, wherein said data modifications include: (i) tokenization/discretization into discrete IDs (e.g., BPE/WordPiece/Unigram for text; vector-quantized codes via VQ-VAE/RVQ, product/k-means codes for images/audio/features); (ii) patchification/tiling of images or video (fixed-size patches/tubelets) and linear projection to embedding dimension; (iii) framing/windowing of time-series or audio with fixed hop sizes; (iv) padding/truncation and bucketing to normalize sequence lengths, with optional special markers (CLS/SEP/BOS/EOS); (v) feature scaling/normalization (per-channel mean-std, min-max, whitening, log scaling, clipping to valid ranges); (vi) rate conversion/resampling and time alignment/interpolation to common sampling grids; (vii) precision casting/quantization of inputs (e.g., float32→bfloat16/float16 or INT8) for compute compatibility; (viii) embedding/projection layers that map continuous inputs (pixels, forces, IMU, tabular fields) to fixed-width vectors; (ix) positional/temporal encodings (sinusoidal/learned, rotary/relative) appended or fused with inputs; (x) coordinate-frame canonicalization (e.g., transforming sensor/EE frames to a world frame; centering/orienting 3D data; unit-cube/sphere normalization); (xi) serialization to tensor layouts required by the backbone (e.g., (B,T,D), (B,C,H,W), contiguous memory; ragged/sparse tensors as needed); (xii) graph construction for GNNs (node-feature matrices, edge index/adjacency in COO/CSR; batching with graph IDs); (xiii) 3D representation building (voxel/TSDF grids, occupancy/SDF fields, ray bundles for NeRF, point-cloud subsampling/quantization, mesh→point/graph conversion, normal maps); (xiv) audio representations (STFT/mel spectrograms, MFCCs, magnitude/phase splits) normalized to model-specific ranges; (xv) label/target encoding into model-readable forms (class indices, one-hot/multi-hot, normalized boxes/segments, heatmaps/keypoints, regression tensors); (xvi) masking/corruption transforms that generate masked inputs for masked-modeling objectives (e.g., MLM/MAE span masks) while preserving model-expected shapes; (xvii) multimodal fusion prep (time-locking modalities, length-matching via padding/resampling, channel/time concatenation, or projection into a shared embedding space); (xviii) sparsity formats (structured/unstructured indices) for sparse backbones or memory-efficient loaders; (xix) value/unit harmonization (unit conversions, bias/offset removal) to match learned scaling; (xx) sample/chunk packaging into fixed, indexed records (shards/TFRecord/WebDataset/LMDB) that present tensors and metadata in the exact shapes and types the network expects; and/or (xxi) any combination thereof, any method of ingestion that is disclosed in papers that are incorporated herein by reference, and/or any other method that is obvious to one of skill in the art based on this disclosure.

Once the training data has been ingested in step 4204, a training methodology can be applied to generate the BAM in step 4208. Said training methodology includes a learning method and a loss function/reward. The learning methods may include: (i) supervised learning techniques (e.g., classification, regression, behavior cloning, etc.), (ii) unsupervised learning (e.g., clustering, dimensionality reduction, anomaly detection, etc.), (iii) transfer learning (e.g., by leveraging pre-trained models), (iv) reinforcement learning (e.g., model-free methods, model-based methods), (v) semi-supervised learning (e.g., training with labeled and unlabeled data), (vi) any combination thereof, and/or (vii) any method that is disclosed in papers that are incorporated herein by reference, and/or any other method that is obvious to one of skill in the art based on this disclosure.

After a general learning method is selected, the designer can then select a loss function or develop a reward function. Examples of loss functions that may be selected can include: (i) cross-entropy (with label smoothing) and BCE-with-logits, (ii) negative log-likelihood (token-level NLL, perplexity), (iii) focal loss and Hinge/Max-margin, (iv) regression losses (MSE/L2, MAE/L1, Huber/Smooth-L1, Charbonnier, Log-cosh), (v) segmentation/detection losses (Dice, IoU/Jaccard, Tversky/Focal-Tversky, Lovász-Softmax; box L1/GIoU/DIoU/CIoU), (vi) metric/contrastive losses (Triplet, Contrastive, N-pair, Circle, Center; Cosine-similarity; ArcFace/AAM-Softmax, CosFace), (vii) self-supervised objectives (InfoNCE/NT-Xent, BYOL/Barlow Twins/DINO; masked-modeling MLM/MAE reconstruction), (viii) autoregressive maximum-likelihood (teacher-forcing NLL, sequence-level risk), (ix) VAE objectives (ELBO, B-VAE, KL annealing/free-bits), (x) GAN losses (non-saturating/logistic, Hinge, LS-GAN, WGAN-GP, Relativistic GAN), (xi) normalizing-flow likelihood (exact log-likelihood/bits-per-dim, FFJORD), (xii) diffusion/score matching (ε-prediction MSE, v-param, xo-prediction, VLB, consistency/distillation), (xiii) audio/speech losses (STFT/multi-res STFT, spectral convergence, SI-SDR/SI-SNR with PIT, CTC, RNN-T), (xiv) 3D/geometry losses (Chamfer, EMD, point-to-surface, normal consistency, Eikonal/SDF, occupancy BCE), (xv) Perceptual/quality losses (feature/VGG, LPIPS, SSIM/MS-SSIM, total variation), (xvi) tokenizer/codebook losses (VQ commitment/codebook/EMA, Gumbel-Softmax straight-through), (xvii) distillation losses (temperature-scaled CE, KL to teacher, intermediate feature/attention transfer), (xviii) regularization terms (weight decay/L2, L1/Group-Lasso, dropout, spectral norm, orthogonality, gradient penalty, Jacobian/contractive, entropy/confidence penalties), (xix) RL policy losses (REINFORCE, PPO-Clip with value and entropy, TRPO, A2C/A3C), (xx) RL value/Q losses (TD error for DQN/Double-DQN, critic losses for DDPG/TD3, SAC entropy-regularized objective), (xxi) imitation learning losses (behavior cloning CE, GAIL discriminator, inverse RL), (xxii) any combination thereof, any method disclosed in papers that are incorporated herein by reference, or any method that is obvious to one of skill in the art based on this disclosure.

In a first example, the designer of a BAM that outputs actions in a discretized action space (e.g., discrete bins) may use a cross-entropy loss function or a negative log-likelihood (NLL) function to measure the difference between the predicted probability distribution over the action bins and the true action. In another example, the designer of the BAM that outputs actions in a continuous space may use a regression-based loss function such as mean absolute error (MAE or L1 loss) or mean squared error (MSE or L2 loss).

Additionally/alternatively, the following list of reward functions may be utilized: (i) task success and progress (sparse success, dense shaping, time penalties), (ii) safety and constraints (collisions and limit violations), (iii) control costs (action L2, energy/torque use, smoothness/jerk penalties), (iv) environment/resource rewards (throughput, latency, energy/battery, cost/revenue, risk/CVaR), (v) exploration and intrinsic motivation (entropy bonus, novelty counts, curiosity/prediction error, empowerment, information gain), (vi) preference-based/human-feedback rewards (pairwise preference models, rule-based shaping), (vii) imitation-derived rewards (inverse RL, GAIL/AIRL discriminator scores), (viii) metric-based rewards for perception/NLP (BLEU/ROUGE/CIDEr, WER, F1, PSNR/SSIM), (ix) multi-objective composition (weighted sums, lexicographic ordering, constrained/Lagrangian optimization), (x) any combination thereof, and/or (xi) any method that is disclosed in papers that are incorporated herein by reference, and/or any other method that is obvious to one of skill in the art based on this disclosure.

As shown in FIG. 20, the designer can then use the selected training methodology in connection with the previously obtained/generated components of the BAM to generate said BAM. For example, the designer may utilize supervised learning in order to modify the internal parameters of components (e.g., both the alpha and beta models 3001.1, 3001.2) of the BAM in order to minimize the error between robot action predictions and the actual robot actions provided in the training data, thereby refining its ability to generate accurate and contextually relevant text and robot actions based on human commands, images, and other visual cues. Specifically, to train both the alpha model 3001.1 and the beta model 3001.2 end-to-end (e.g., from input of the alpha model 3001.1, through the latent vector, and to the output of the beta model 3001.2), a batch of ingested training data is sampled from the preprocessed training dataset 4002 and fed to said alpha and beta models 3001.1, 3001.2 at different frequencies. The observation or "data set" 4006, derived from the training data, may include a sequence of historical video frames, other sensor data, and the robot's state. The action or "desired action" 4008, also from the training data, may be represented by an action chunk, which is a sequence of target actions for the robot that extends over a future time horizon. The observation data from the batch is ingested by the network, and the resulting observations are used by the BAM to predict an output action chunk. In various embodiments, observation data may be time-aligned to the action chunk using timestamps and interpolation, sensor inputs may be normalized to a fixed scale, and missing fields may be masked so that the BAM conditions on valid channels. The alpha model 3001.1 may provide a latent vector that captures visual token embeddings, task text tokens, and state features, and the beta model 3001.2 may incorporate this latent vector through cross-attention to produce control trajectories. The models may process sequences with positional encodings, a defined context length, and a control rate that matches the robot controller update period, so that each element of the action chunk maps to a specific future step on the horizon.

The selected loss function can then be used to calculate the loss between the action chunk output by the beta model 3001.2 and the expert action chunk from the demonstration data/ground truth action. This calculated loss is backpropagated through the network. Specifically, the gradients descend from the beta model 3001.2 output back to the beta model 3001.2 transformer network and then through the latent vector connection into the alpha model 3001.1. An optimization algorithm, such as Adam, is used to update the network weights to reduce the error. This training loop continues until a convergence criterion is met, such as the training loss plateauing or after a predetermined number of epochs. The output of this process is a trained model capable of generating action chunks based on visual inputs.

In certain embodiments, the loss may combine a regression term on joint targets or task-space poses with a temporal smoothness penalty across the action chunk, and may include a consistency term that aligns beta outputs with alpha-derived latent plans. The system may apply gradient clipping, weight decay, and a learning-rate schedule with warmup and cosine decay, and may use mixed precision for throughput. Convergence may be assessed on a validation split using sequence-level metrics such as horizon-integrated error, collision flags computed by a kinematic model, and satisfaction of joint and velocity limits. Batch size, horizon length, and update frequency may be selected to balance memory use and BAM stability on long sequences.

In addition to supervised learning, unsupervised learning techniques can be employed to further enhance the BAM. These techniques do not rely on actual robot actions provided in the training data but instead focus on identifying patterns and structures within the data itself. For example, the model can be trained using unsupervised methods such as clustering or self-supervised learning, where it learns to group: (i) similar human commands together, (ii) similar visual and textual features together, and (iii) predict missing parts of robot actions, images, or text. For example, teleop data may be collected for a subset of the waypoints for a given task or movement. The unsupervised learning techniques can then determine the missing waypoints for the given tasks or movements. This helps the model develop a deeper understanding of the underlying relationships between robot actions, visual, and textual information, making it more robust and adaptable to new, unseen data. In one approach, masked sequence modeling may be used over video tokens, state sequences, and action tokens so that the model reconstructs withheld segments, and contrastive objectives may align command text with visual clips and state descriptors. Latent dynamics models may predict future state embeddings from observations, which may improve action inference when labels are sparse.

Transfer learning is another method used to train the BAM. In this approach, the model is first pre-trained on a large, general-purpose dataset and then fine-tuned on a smaller, domain-specific dataset. This allows the model to leverage the knowledge it has already acquired during pre-training and apply it to more specialized tasks, significantly reducing the amount of data and computational resources for training. Reinforcement learning can also be applied to fine-tune or train the BAM, particularly in scenarios where the model needs to interact with its environment and receive feedback on its performance. In this method, the model is trained to make decisions based on inputs, with the goal of maximizing a reward signal. This can involve methods like Q-learning, which learns the value of taking actions in particular states, or policy gradient methods like proximal policy optimization (PPO), which directly optimize the policy's parameters. A hybrid approach, reinforcement learning from human feedback (RLHF), can also be used, where human preferences are used to shape the reward function, guiding the model towards more desirable behaviors without needing a manually specified reward function. Over time, the model learns to generate robot actions that not only accurately move the robot to the desired position, but also minimize the cost (e.g., battery, avoid singularities, etc.) in moving to the desired position. Finally, semi-supervised learning techniques can be utilized to fine-tune or train the BAM when only a limited amount of actual robot actions is available. In this approach, the BAM is trained on a combination of actual robot actions and unlabeled input data, allowing it to learn from the labeled actual robot action while also extracting useful information from the unlabeled input data. This method can improve the model's generalization capabilities and reduce the reliance on large, annotated datasets, making it more efficient and scalable. In various embodiments, the reward may include penalties for torque, jerk, and proximity to joint limits, along with task completion bonuses and safety margins based on distance fields. On-policy rollouts may occur in simulation with domain randomization over textures, lighting, mass, and friction, and off-policy updates may draw from a replay buffer seeded with teleop trajectories. Human feedback for RLHF may be gathered as pairwise preferences over short clips of behavior, with an aggregation process that yields a learned reward model used to fine-tune the policy. Additionally, it should be understood that the designer may freeze certain layers, features, portions, or models during the training. For example, the designer may freeze the alpha model after a predefined time/number of training cycles, while they continue to train the beta model. Likewise, the designer may freeze the beta model after a predefined time/number of training cycles, while continuing to train the alpha model.

Following the initial training, the BAM may undergo an iterative process of testing and evaluation to validate and improve its performance. The BAM may be deployed on a physical or simulated humanoid robot, which is then monitored as it attempts to perform a manipulation task autonomously. If the task is performed successfully, the BAM is considered validated for the encountered states. If the robot fails to complete the task, a process for collecting corrective demonstrations may be initiated. In this process, an operator may take control of the robot from the failure state and provide a new, expert demonstration showing the correct sequence of actions to recover and complete the task. This new corrective demonstration is then added to the original training dataset, and the model is retrained on this enriched dataset. This iterative loop of testing, collecting corrective data from failure states, and retraining allows the BAM to be progressively improved, making it more robust and capable of handling a wider range of situations. Evaluation may track success rate, path efficiency, contact forces, and time to completion, and logs may include synchronized video, proprioception, and controller signals for audit and replay. The system may stage deployments from simulation to a lab mockup and then to target environments, with versioned BAM artifacts and rollback plans, and dataset aggregation may bias sampling toward states that produced prior errors to speed correction.

Following the above validation process, the BAM can be further refined through an optional fine-tuning process in step 4212. Optionally, one or more features of the received training data 4002 may be modified in step 4214, for example, by using a simulation engine to alter backgrounds, objects, or environmental characteristics in the training images. The BAM can be iteratively trained using this modified data in step 4216. This iterative training can involve a variety of fine-tuning strategies to adapt the general-purpose pretrained model to specific tasks, environments, or embodiments. In one configuration, the simulation engine may vary camera pose, lens parameters, illumination, object placement, textures, and physics coefficients within set ranges to generate domain-randomized scenes, while preserving action labels through pose retargeting. Data augmentation may include geometric transforms, cutout masks, and text paraphrases of commands, and the system may rebalance class frequency to expose the BAM to rare states. Sensor calibration and time offset correction may be applied so that observation 4006 aligns with desired action 4008 across all synthetic and real sequences.

One effective strategy for finetuning is co-finetuning, where the model is trained on a mixture of its original, large-scale pretraining data (e.g., internet-scale image and text data) and the smaller, domain-specific robotics dataset. This approach may help prevent catastrophic forgetting, where the model loses its general knowledge while specializing on the new data, thereby enhancing its ability to generalize to novel situations. For large models, full fine-tuning can be computationally prohibitive. In such cases, parameter-efficient fine-tuning (PEFT) methods may be employed. Techniques such as low-rank adaptation (LoRA) introduce a small number of trainable parameters in the form of low-rank matrices into the model, allowing for efficient adaptation without updating the entire set of original model weights. Other efficiency-focused techniques include model quantization, which reduces the precision of the model's weights to decrease its memory footprint and accelerate inference speed. Mixture sampling for co-finetuning may use a fixed ratio or a curriculum that increases the share of domain data over time, and replay of pretraining examples may be chosen by similarity to current tasks. LoRA ranks may be set per layer and targeted to attention and feedforward blocks, while the base weights remain frozen so that deployment footprint stays stable. Quantization may use per-channel scaling with 8-bit or 4-bit weights and calibrated activation ranges, and knowledge distillation from a larger teacher may align logits or intermediate features.

This optional iterative fine-tuning process can also be used to teach the BAM to generalize tasks and actions. For instance, a model initially trained to pick up a cup can be further trained on a diverse set of objects to learn a general "pick up" skill applicable to objects it has never seen before. This may involve training on a task-oriented subset of data or using corrective demonstrations collected from task failures to progressively improve the BAM. Finally, the fine-tuned BAM can be returned, ready for deployment on a humanoid robot. In various embodiments, skills may be encoded as goal-conditioned policies that accept object descriptors, pose targets, or language goals, and the action chunk may incorporate gripper control, force setpoints, and end-effector velocities. The deployment artifact may include the BAM, configuration files, normalization statistics for observation 4006 and desired action 4008, safety envelopes based on reachable workspace and load limits, and interface shims for common robot controllers, so that integration with existing control stacks proceeds with consistent reference numbers and terminology.

b. Deployment of BAM and Action Output

Figure 21:
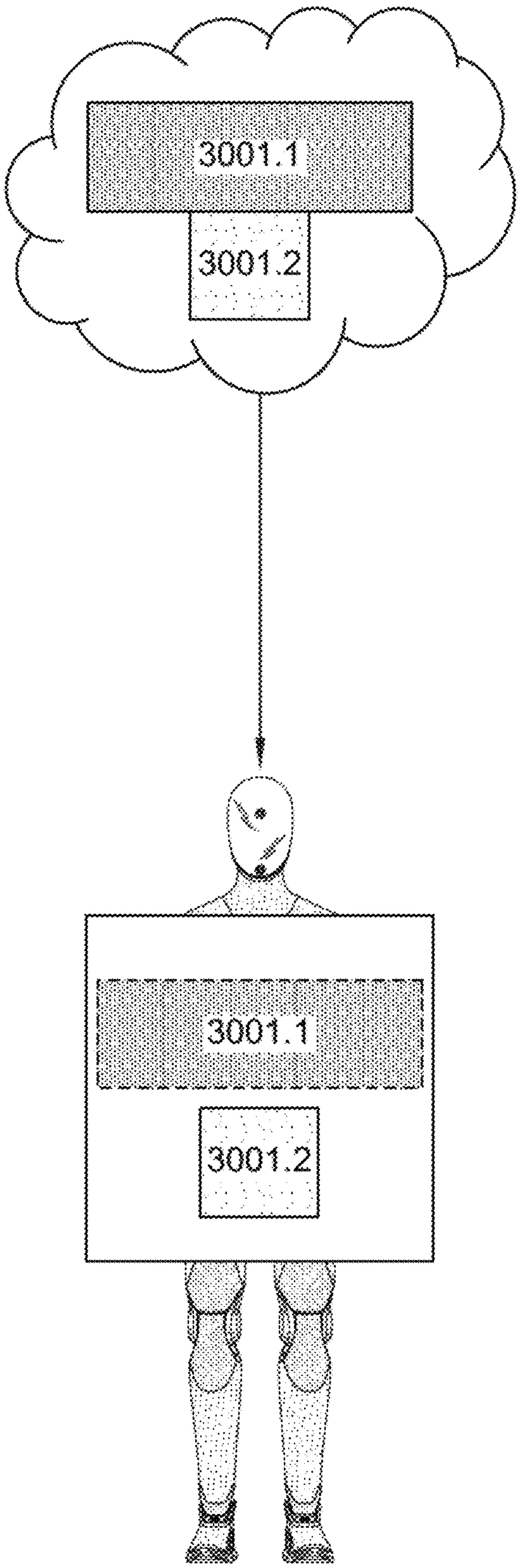
FIG. 21 is a diagram depicting the deployment of a BAM.

FIG. 21 illustrates the deployment of a BAM, which may comprise an optional alpha model 3001.1 and a beta model 3001.2. After the comprehensive training and the optional fine-tuning processes are complete, the resulting BAM or a portion of the BAM can be transferred and installed onto the robot 1, 2700A-X for evaluation, testing, and runtime execution. This deployment phase represents the transition from model development to practical application, enabling the robot 1, 2700A-X to leverage the learned policies to perceive its environment, understand commands, and perform tasks autonomously. Once deployed, the optional alpha model 3001.1 may be configured to run on a first GPU located within the robot's torso, while the beta model 3001.2 may be configured to run on a second GPU that is also located within the robot's torso. This onboard, edge execution of both the alpha and beta models 3001.1, 3001.2 facilitates the low-latency, real-time inference that aids in providing fluid and responsive physical interaction. This represents a significant departure from conventional systems and offers a solution to the technological challenge of equipping robots with generalized reasoning capabilities without introducing significant latency.

Figure 22:
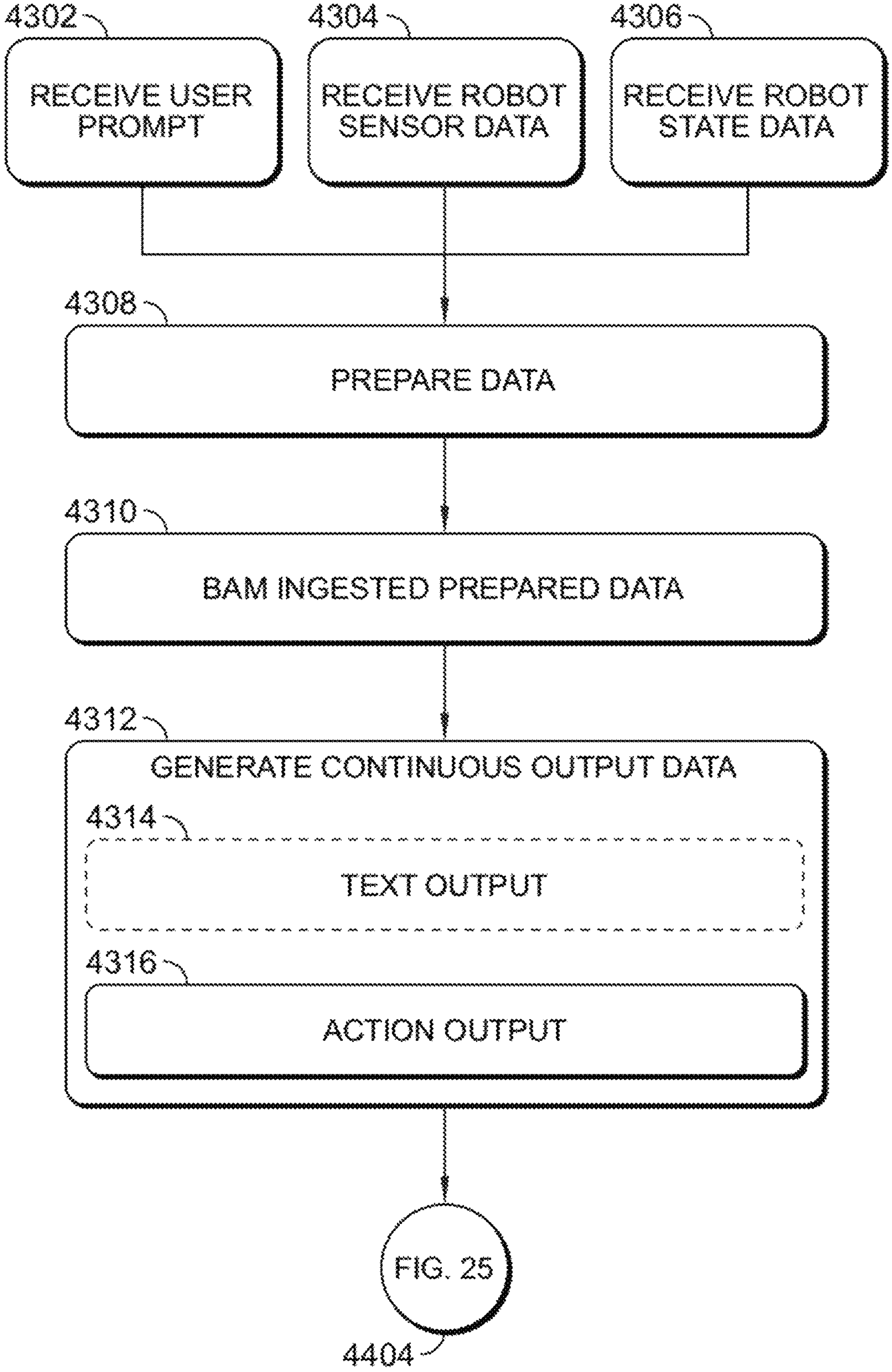
FIG. 22-23 are flowcharts illustrating a process of using the BAM to output robot actions.
Figure 23:
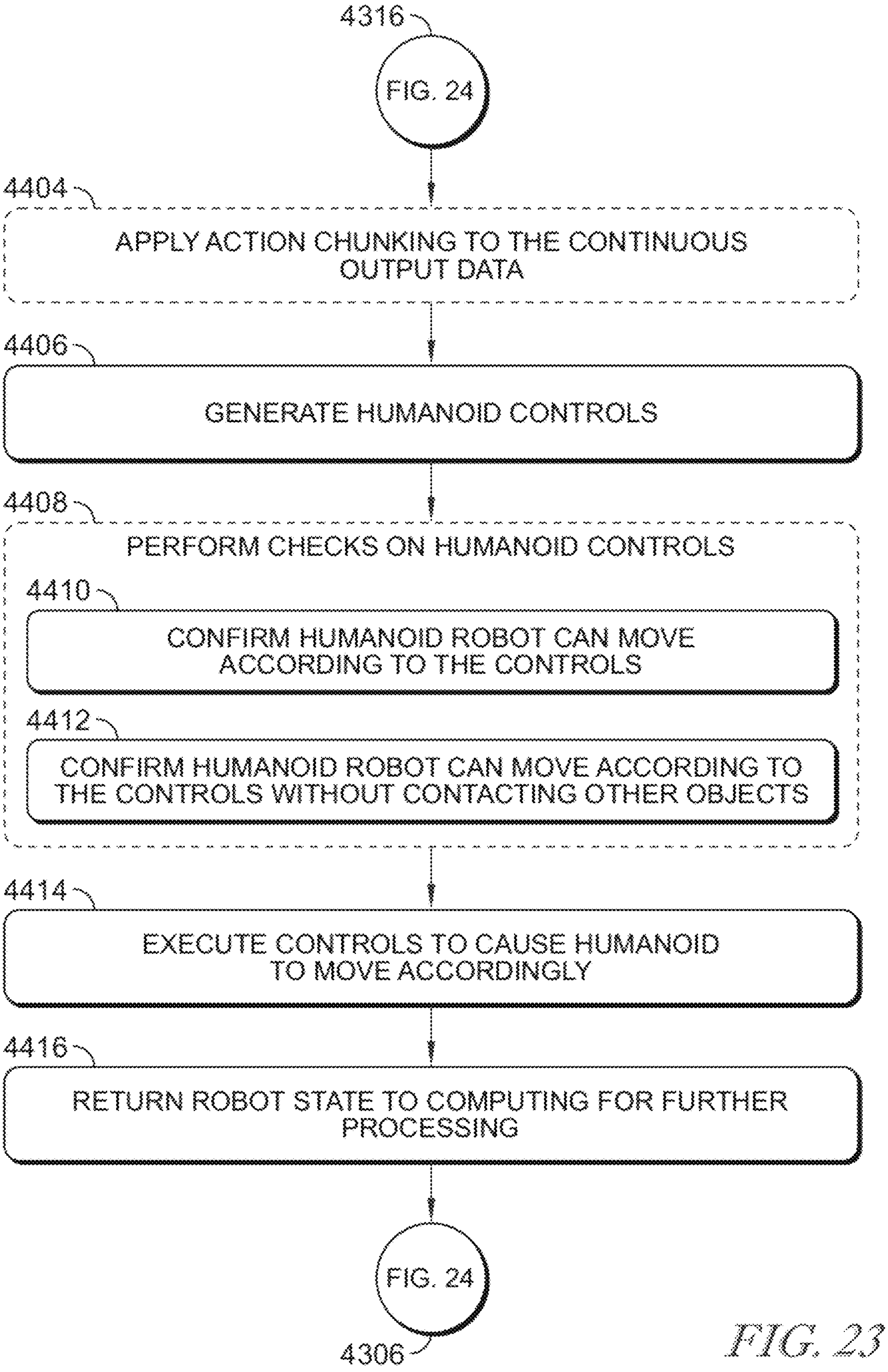

FIGS. 22-23 show flowcharts of a robot action-determining process for generating humanoid controls using a trained BAM during its runtime operation. This process is designed as a continuous, closed-loop system that may be performed to determine and provide an initial position or rotational change for the humanoid robot, and then iteratively feed the robot's subsequent state back into the BAM along with additional robot sensor data and prompt data to determine the next sequence of actions. At the start of each cycle in the process, the robot 1, 2700A-X receives multiple streams of data. For example, said robot 1, 2700A-X may receive a user prompt (as shown in block 4302 of FIG. 22), which can be a high-level task, such as a spoken or natural language command from a human operator. Simultaneously, it may receive a stream of robot sensor data (as shown in block 4304 of FIG. 22) from the robot's various onboard sensors 1.2.8, such as cameras and IMUs, providing a real-time perception of the external environment. In addition to the generation or obtaining the prompt and sensor data, the robot 1, 2700A-X also generates robot state data (as shown in block 4306 of FIG. 22), which may include detailed proprioceptive information about the robot's current physical configuration, such as joint angles and end-effector positions, and may also include historical state data from previous timesteps.

At step 4308, the diverse, multimodal data can be prepared using any aspect of the above-described methods for preparing the training data. After the data is prepared, it can be ingested by the BAM at step 4310. Said ingestion of the data may include any aspect of the above-described methods for ingesting the training data. In an example, text-based prompts can be converted into a sequence of language embeddings, while visual data from the robot's cameras may be processed through a vision model, such as a CNN or ViT, to generate a corresponding set of image embeddings. Similarly, the robot's numerical state data can also be encoded into a vector representation, e.g., by an MLP. The BAM may then employ sophisticated mechanisms, such as cross-attention, to align and fuse these different token streams, enabling the BAM to effectively understand and react to the complex relationships between the linguistic command, the visual scene, and the robot's physical state.

Upon ingesting and processing the input data, the BAM generates continuous output data (as shown in block 4312 of FIG. 22). This continuous output data may be multifaceted and may include text data (as shown in block 4314 of FIG. 22), which could be transformed into a spoken response to the user for clarification or confirmation, and/or a detailed action output (as shown in block 4316 of FIG. 22), which contains the motor commands for the robot. The motor commands may include: (i) position information (e.g., position of eachDegree of Freedom (DoF) in a 62 DoF system-X, Y, Z), (ii) location(s), (e.g., action space location for each of the 62 DoFs), (iii) actuator or motor current(s) (e.g., current for each actuator or motor that controls an extent of the 62 DoFs), (iv) actuator or motor torque(s) (e.g., torque for each actuator or motor that controls an extent of the 62 DoFs), (v) actuator encoder value(s) (e.g., encoder value for each actuator or motor that controls an extent of the 62 DoFs), (vi) changes in position information (e.g., changes for each of the 62 DoFs—ΔX, ΔY, ΔZ), (vii) changes in location(s) (e.g., changes in the action space locations for each of the 62 DoFs), (viii) changes in actuator or motor current(s) (e.g., changes in current for each actuator or motor that controls an extent of the 62 DoFs), (ix) changes in actuator or motor torque(s) (e.g., changes in torque for each actuator or motor that controls an extent of the 62 DoFs), (x) changes in actuator encoder value(s) (e.g., changes in encoder value for each actuator or motor that controls an extent of the 62 DoFs), (xi) rotational position information (e.g., rotational position of 62 DoFs—A°, B°, C°), (xii) rotational location(s) (e.g., action space rotational locations for each of the 62 DoFs), (xiii) changes in rotational position information (e.g., position of each of the 62 DoFs—ΔA°, ΔB°, ΔC°), (xiv) changes in rotational location(s) (e.g., changes in rotational action space locations for 62 DoFs), (xv) any combination of the above, or (xvi) any value or metric that is obvious to one of skill in the art based on the above disclosure. In other words, the BAM(s) can: (i) receive: (a) input data from a human user (e.g., speech), (b) sensor data from the robot, (c) state data (e.g., proprioception); (ii) process the received data; and (iii) output: (a) speech, and/or (b) actions or positional changes for the robot 1, 2700A-X to move to in order to accomplish the given task.

It should be understood that the outputs may be any numerical value, including any floating-point number that is negative or positive. Further, it should be understood that the BAM may be modified to output any number of arrays, wherein each array can be used to control a DoF. For example, if the BAM includes 62 arrays for the 62 DoF of the robot, and each array includes 6 values; then said BAM is creating 372 values. In other embodiments, the BAM may only generate 1 array that includes 7 values. Further, the BAM may generate fewer than 15 arrays that can control 62 DoF, wherein the WBC 1550 can generate the missing values. For example, the robot may not need the position and rotation of J3 or J5 from the BAM, if the BAM has provided J1, J2, J4, and J6. In other words, the number of arrays that are populated by the BAM's outputs may be less than the total number of DoF contained in the robot 1, 2700A-X, while the BAM is still able to control the robot 1, 2700A-X.

Optionally, this continuous output may be further processed by applying an action chunking algorithm (as shown in block 4404 of FIG. 23). This technique groups the continuous output into a sequence of actions that span a future time horizon, which helps to ensure that the robot's resulting movements are smooth, coherent, and temporally consistent.

At step 4406, a set of low-level humanoid controls is generated based on the continuous output or processed action chunk. This translation from high-level actions to low-level motor commands may be handled by the whole body controller 1550, which can apply sophisticated waypoint algorithms, cost functions, and kinematic constraints, such as joint limitations, to ensure that the robot moves in a manner that is both efficient and physically plausible. In other embodiments, the above step that may be performed by the whole body controller 1550 may be omitted, and the BAM may directly output the low-level humanoid controls.

Before these controls are sent to the robot's hardware, the controller may also perform a series of rigorous safety checks on the generated controls (as shown in block 4408 of FIG. 23). These optional checks are designed to validate the feasibility and stability of the planned movements. This includes confirming that the robot is physically capable of moving according to the specified controls without exceeding its joint limits or kinematic constraints (as shown in block 4410 of FIG. 23), and also verifying that the planned trajectory will not result in a collision with other objects in the environment or with the robot's own body (as shown in block 4412 of FIG. 23). If any of these checks fail, an error can be signaled, and the entire action-determining process may be repeated with updated sensor data to generate a new, stable, and valid plan.

Once the generated humanoid controls have been thoroughly validated, they are executed to cause the robot to move accordingly (as shown in block 4414 of FIG. 23). This final step involves converting the validated controls into precise electrical signals that are sent to the robot's actuators, thereby producing the desired physical movements. As the robot is performing the current action, its new state, along with fresh sensor data from its environment, is continuously captured and returned to the computing system for further processing (as shown in block 4416 of FIG. 23). This information then feeds back into the start of the control loop (as shown in block 4306 of FIG. 22), initiating the next cycle of the action-determining process. This iterative, closed-loop process of receiving multimodal inputs, determining the next best action, and executing the corresponding controls allows the robot to seamlessly perform complex, long-horizon tasks while dynamically adapting its movements in real-time in response to changes in its environment or unexpected events.

i. Action Chunking

Figure 24:
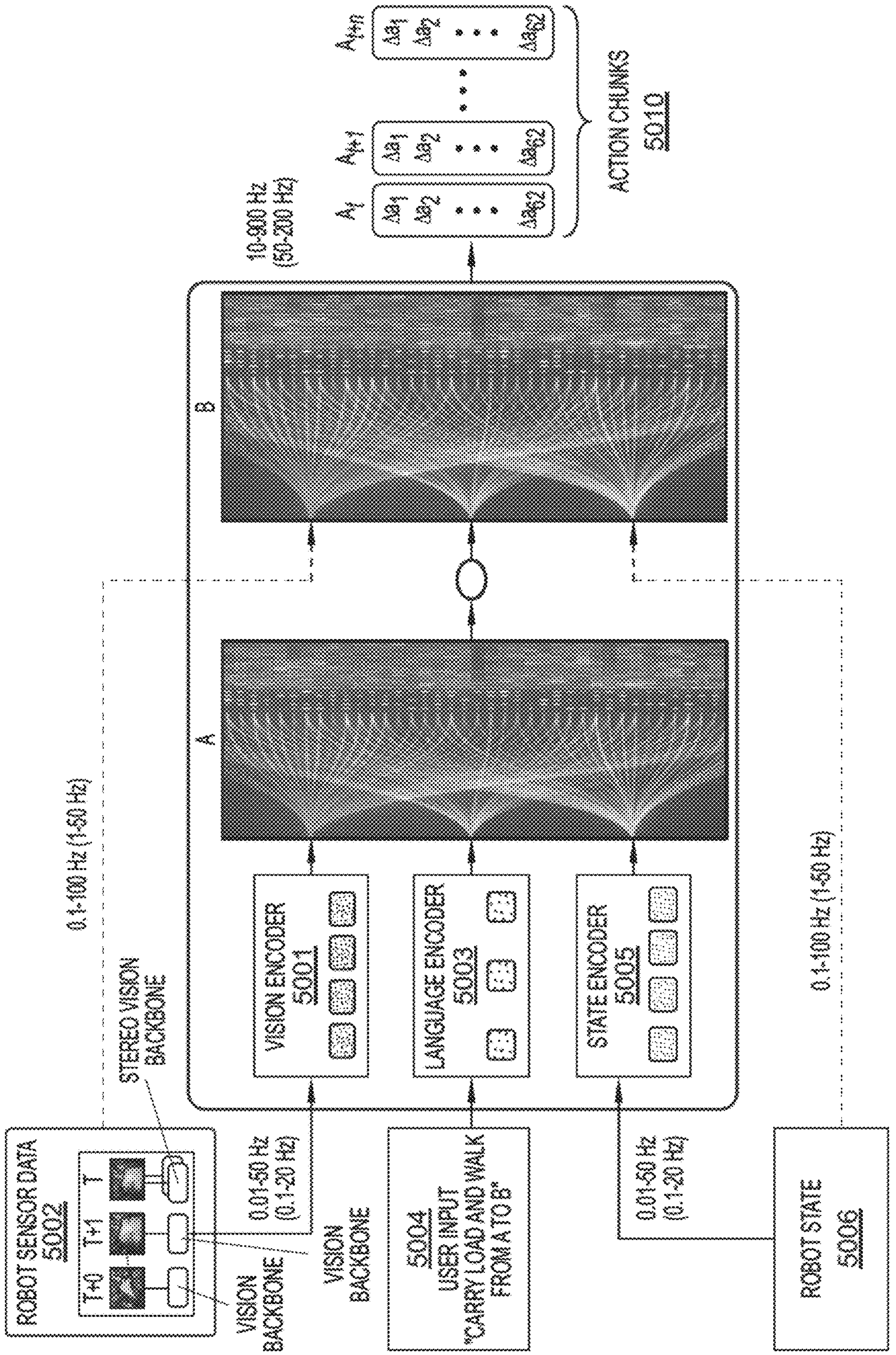
FIG. 24 is a graphical diagram illustrating the process of using the BAM to output robot actions, as described by the flowcharts in FIGS. 24-25.

FIG. 24 illustrates a deployed bipedal action model 5008 at runtime. The system 5000 continuously receives multimodal inputs from its environment and a human user. Robot sensor data 5002, which may include a history of recent image frames from various onboard cameras, is processed by a vision encoder 5001 to generate a sequence of vision tokens. Concurrently, a user input 5004, such as a natural language command like "carry load and walk from A to B," is processed by a language encoder 5003. The robot's current proprioceptive state 5006, including joint angles and end-effector poses, is processed by a state encoder 5005. These three streams of encoded information are then fed into the deployed bipedal action model 5008. The model's output is a series of parallel-generated action chunks 5010, which includes $A_t$ to $A_{t+k}$, representing a sequence of future actions. For example, an action $A_t$ may be a matrix ($\Delta a_1, \ldots, \Delta a_{35}$), where each row $\Delta a_i$ corresponds to the desired change for a specific degree of freedom of the robot, such as a vector representing changes in position and orientation ($\delta x$, $\delta y$, $\delta z$, $\delta\theta_x$, $\delta\theta_y$, $\delta\theta_z$) for a joint. The full matrix $A_t$ may have a row dimension of 62, corresponding to all 62 degrees of freedom of the robot. If the BAM is tasked to output an action chunk for a subset of the robot's body, such as the upper body, then the action vector $A_t$ may be a matrix with fewer rows. This sequence of chunks may cover a short future time horizon, for example, the next 10 to 500 milliseconds (preferably 50 to 150), and can be sent to the robot's low-level controllers for execution.

Action chunking is a technique where a BAM predicts and executes a sequence of multiple future actions in a single inference step, rather than generating one action at a time. In the context of vision-language-action (VLA) models, a BAM can make a single, complex decision to predict a sequence, or "chunk," of k future actions. This chunk typically represents the target robot states (e.g., joint positions), or changes from current states for the next k timesteps. The robot then executes this sequence of actions, either fully or partially, before the BAM is queried again for the next chunk. This method reframes the learning problem from low-level mimicry to high-level trajectory generation, which can be well-suited for sequence modeling architectures like the transformer.

The use of action chunking may provide several key benefits for robotic control. A primary advantage is the mitigation of compounding errors, a common problem in imitation learning where small prediction errors accumulate over time, causing the robot to deviate from the desired trajectory. By predicting a sequence of k actions at once, the BAM makes k times fewer independent decisions, which reduces the opportunities for errors to compound and shortens the effective horizon of the task. Action chunking can also help handle non-Markovian behaviors often present in human demonstration data, such as pauses, by allowing the BAM to implicitly model temporal information within the action sequence. Furthermore, it can enable high-frequency robot control with low-frequency inference from large, computationally intensive models. The BAM can operate at a reduced frequency and at each step output a chunk of actions, while a low-level controller can execute at a much higher frequency to ensure smooth and stable motion. Action chunking may also introduce a trade-off between temporal consistency and short-term reactivity. Longer action chunks result in smoother, more consistent motion but make the system less responsive to unexpected environmental changes. Conversely, shorter action chunks allow for more frequent replanning and greater reactivity, but can increase the risk of compounding errors. The optimal chunk size, therefore, may depend on both the specific task and the latency of the model, thus requiring careful adjustments.

Figure 25:
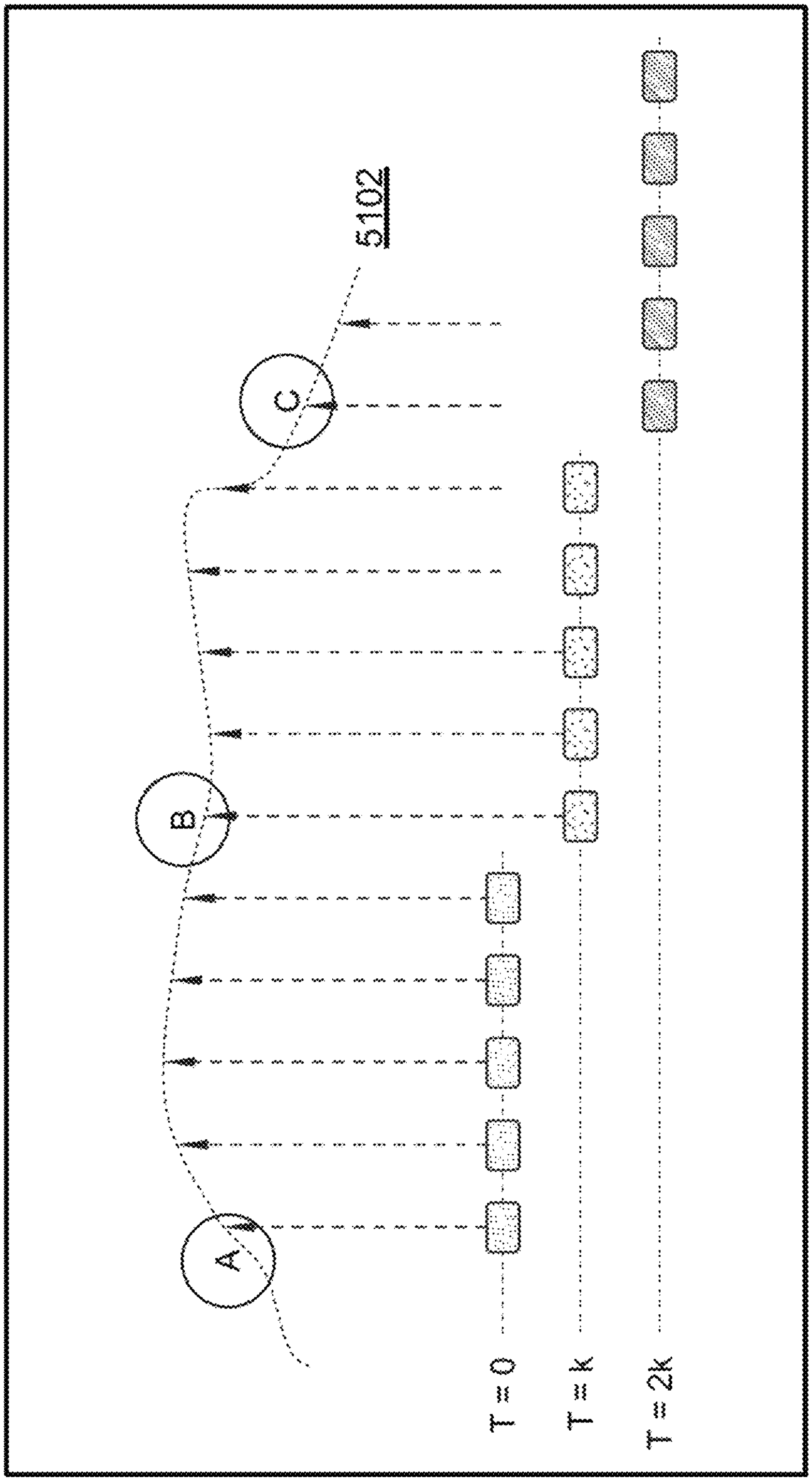
FIG. 25 is a diagram depicting a first action chunking technique that can be employed to generate robot motion.
Figure 26:
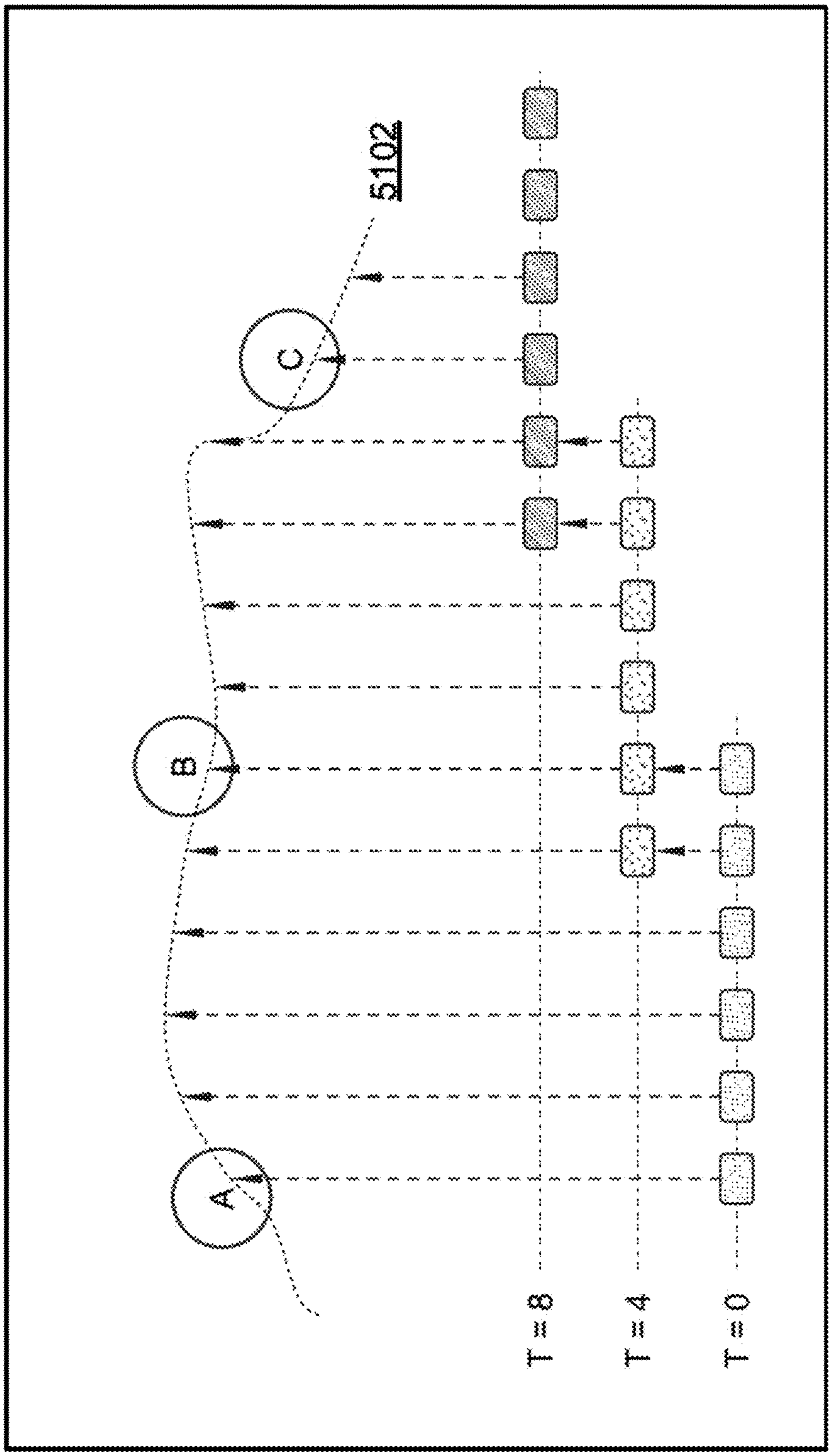
FIG. 26 is a diagram depicting a second action chunking technique that can be employed to generate robot motion.
Figure 27:
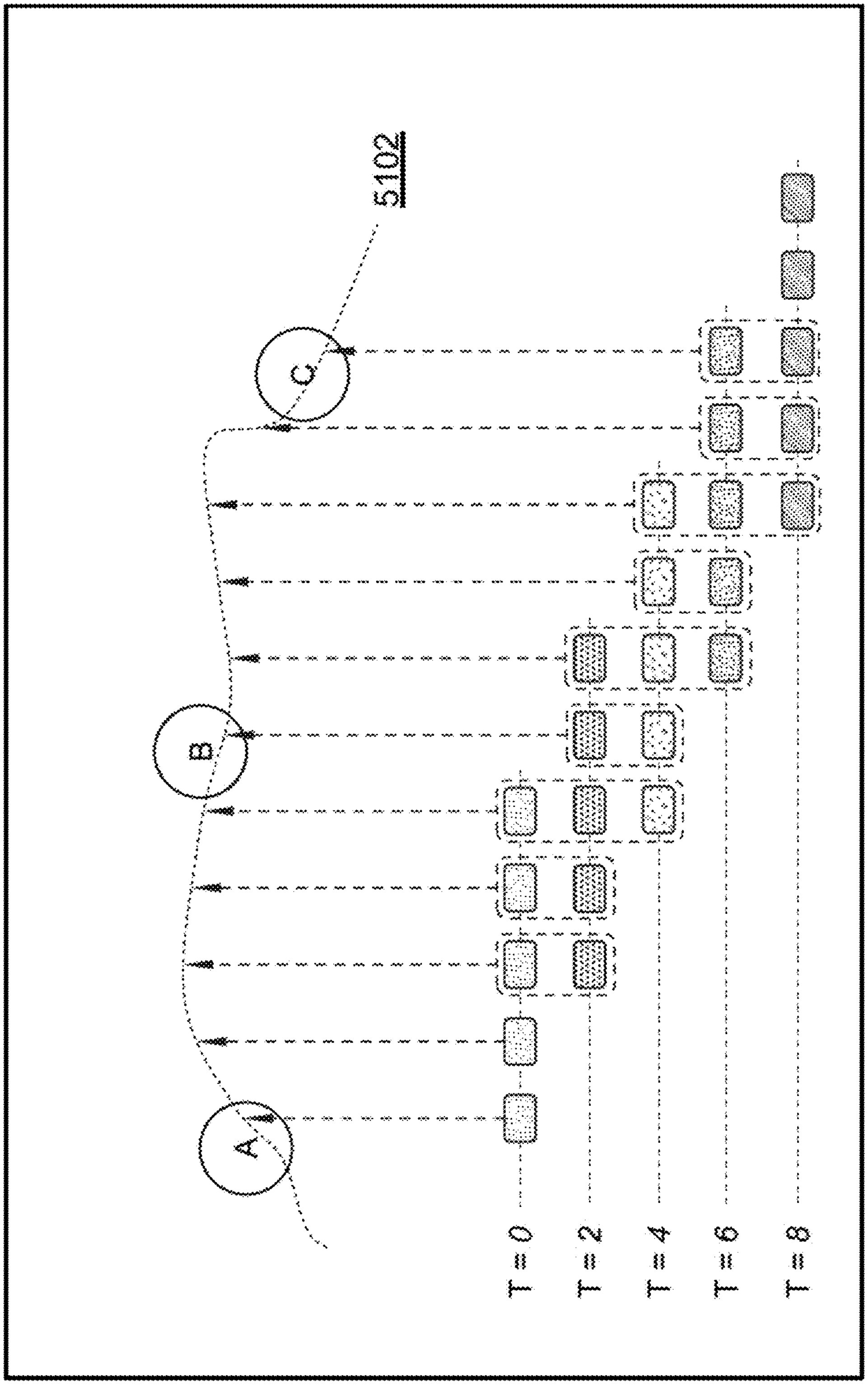
FIG. 27 is a diagram depicting a third action chunking technique that can be employed to generate robot motion.

As the robot moves along a trajectory 5102 from point A to point C, as shown in FIGS. 25-27, different action chunking techniques can be employed to generate the motion. FIG. 27 illustrates a sequential chunking method. At time T=0, the model predicts a chunk of actions, and the robot executes this entire chunk to move along the trajectory. After a fixed interval of k timesteps, at time T=k, the robot takes a new observation and predicts the next chunk of actions. This process repeats at intervals of 2 k, 3 k, and so on. This synchronous method is straightforward to implement, but it may introduce noticeable pauses between the execution of each chunk while the model performs inference. These pauses can lead to jerky, non-fluid motion and can reduce the overall throughput of the task, as the robot must wait for the next set of commands before continuing its movement.

Figure 28:
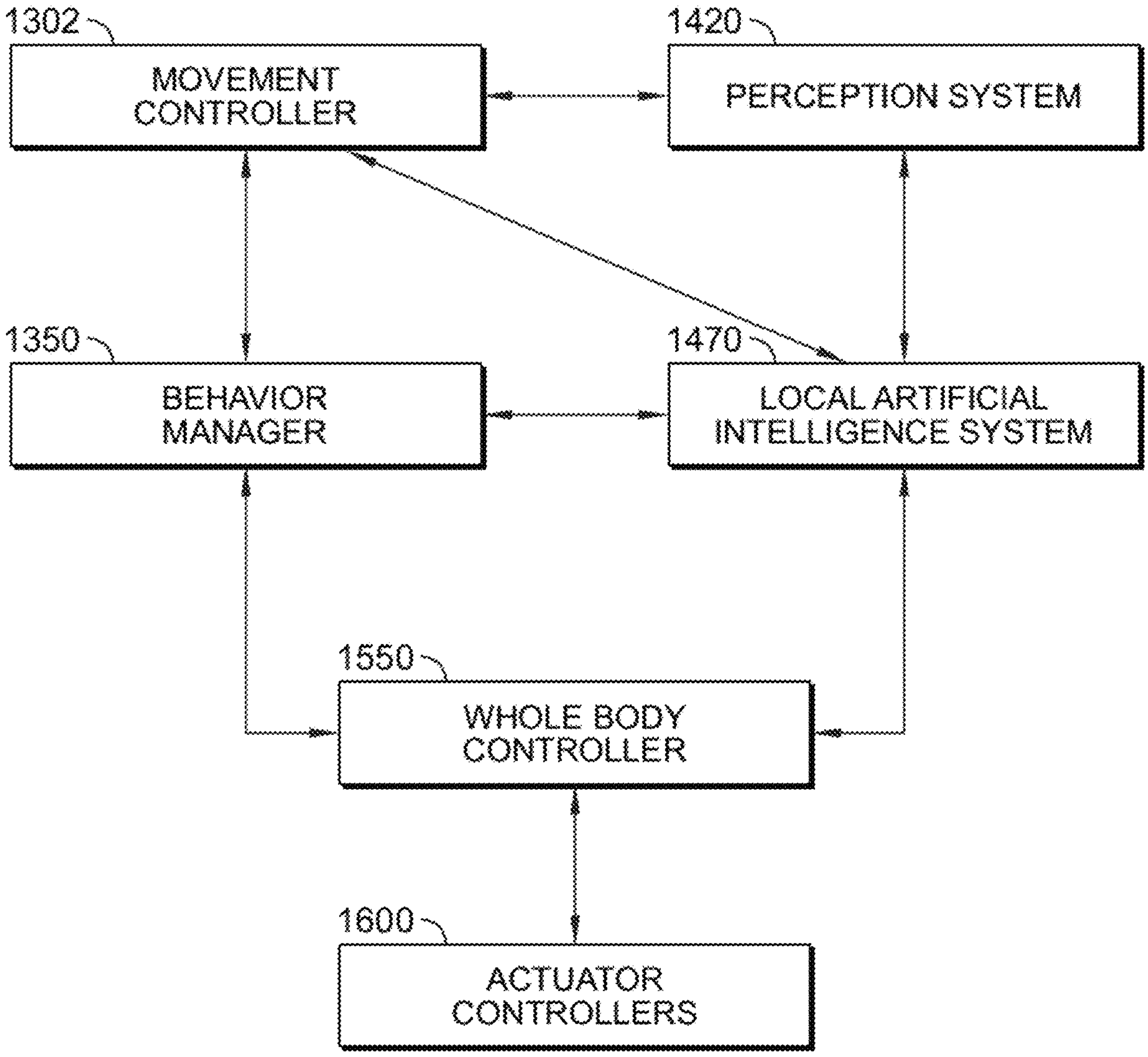
FIG. 28 is a diagram depicting an interaction of components contained within a computing architecture of the humanoid robot of FIGS. 1-3B.

FIG. 28 depicts an asynchronous technique that may be used with flow-matching or diffusion-based policies. This method involves an overlapping execution and prediction process. For example, at time T=0, the model outputs a chunk of a certain size, such as 6 actions. The robot begins executing these actions. Before the entire chunk is completed, for example, at time T=4 after executing the first 4 actions, the model starts generating the next chunk. The key insight of this method is to use the remaining actions from the current chunk (the last two actions in this example) to inform the generation of the new chunk. As shown in FIG. 28, the last two, yet-to-be-executed actions from the chunk generated at T=0 are to be "frozen," while the model generates the new chunk at T=4 to be conditioned on and consistent with these frozen actions. This ensures a smooth, continuous transition between chunks, effectively eliminating the pauses associated with synchronous methods and making the robot's motion more fluid and reactive.

FIG. 29 illustrates another overlapping execution strategy known as temporal ensembling. In this approach, the BAM is queried much more frequently, for example, at every timestep or every few timesteps (T=0, T=2, T=4, etc.). This frequent querying creates a buffer of multiple, overlapping predicted action chunks. The final action that is executed at any given timestep is not taken from a single chunk, but is instead calculated as a weighted average of all the predictions that have been made for that specific timestep from the different overlapping chunks currently in the buffer. This averaging and summing process, which may use an exponential weighting scheme to give more importance to more recent predictions, helps to smooth out jitter and reduce modeling errors. This results in a more stable and fluid trajectory, as the final command is a consensus of multiple predictions made over a short time window.

c. Interaction Between Components of the Computing Architecture

Figure 30:
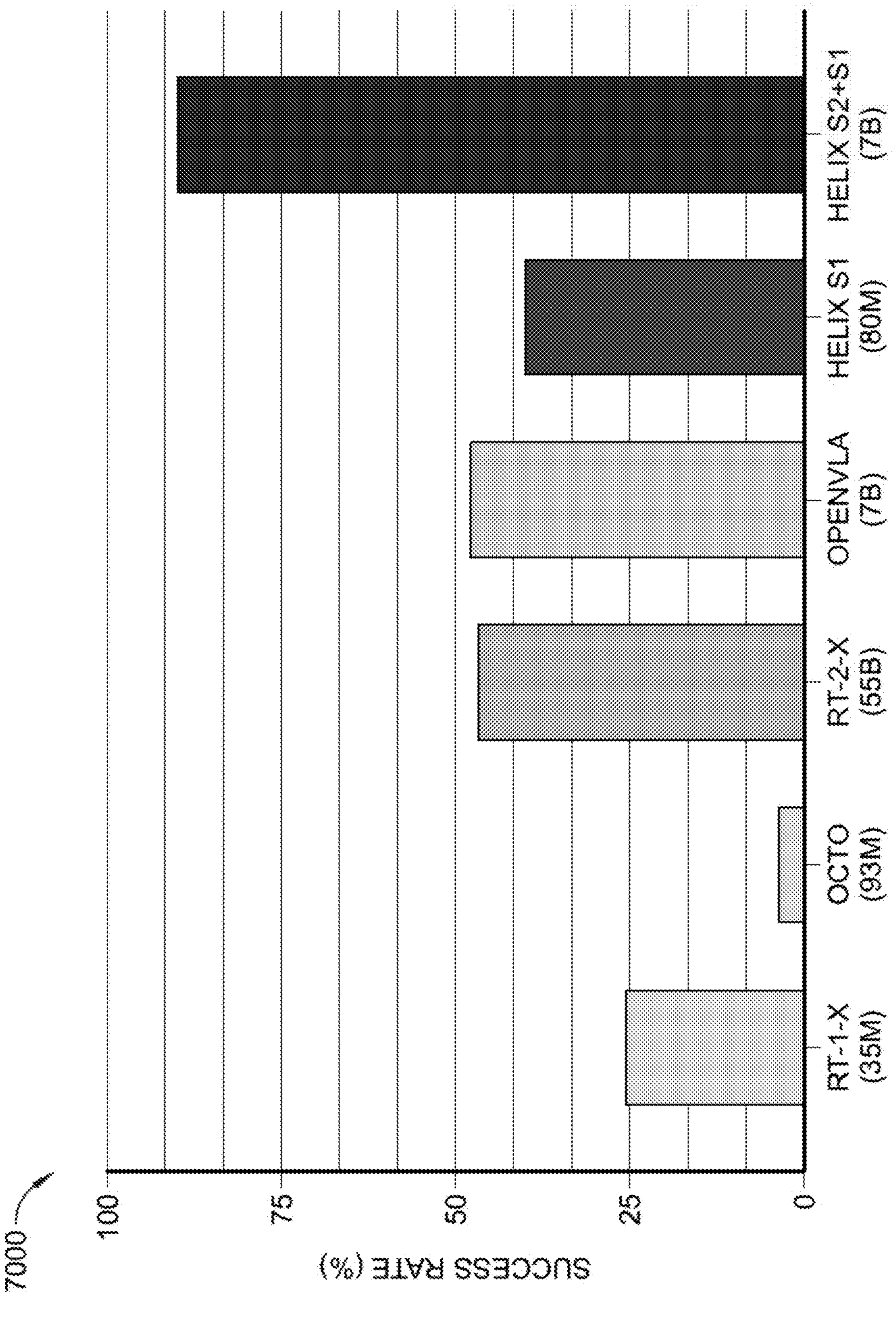
FIG. 30 is a chart illustrating a performance comparison between the BAM and other robotic vision-language-action (VLA) models.

FIG. 30 depicts interactions between components of the humanoid robot 1 during its operation. Upon startup of the humanoid robot 1, the humanoid robot 1 may be in a standby mode or may otherwise remain idle in an initial position (e.g., standing, sitting, lying down, etc.). The robot 1 may initialize and activate its sensors 1.2.8 and obtain data in relation to the environment and surroundings of the robot 1, as well as positional data, audiovisual data, and the like. The movement controller 1302 may be configured to obtain data from its environment using the perception system 1420, while understanding the location and position of the robot 1 within said environment.

As described above, the environmental data and the robot data can be fed into: (i) the BAM, wherein a portion of said BAM (e.g., the beta model 3001.2) is running on the local AI system 1470, and (ii) the behavior manager 1350. The BAM can then convert speech to text in order to obtain long-horizon goals, wherein said BAM can subdivide these long-horizon goals into one or more sub-goals or tasks. The BAM can then check with the behavior manager 1350 to confirm that the robot 1 is in the correct state for performing the first sub-goal or task. Once the state of the robot 1 is confirmed or the state of the robot 1 is changed to be in the right state, the BAM can determine the movements and actions to perform for a given specified task. For instance, the alpha model 3001.1 of the BAM may process the task and sensor data to generate information that is provided to a semantic latent vector. This information is passed through said latent vector and into the beta model 3001.2 of the BAM. The beta model 3001.2 of the BAM may then communicate the detailed movement or action information to the whole body controller 1550, which in turn generates joint current data and/or torque data and transmits the data to the controllers 1600 to effect activity in the actuators 1.2.4 and cause the movement or action to be performed.

Each of the interacting components may provide feedback information to each other as the movements or actions are being performed. For example, the perception system 1420 may relay an indication to the movement controller 1302 that a given task is complete based on audiovisual data received during the performance of an action or movement. As another example, the behavior manager 1350 may be in continuous communication with the whole body controller 1550 to ensure that the movement and positioning of the robot 1 are as instructed and/or planned by the local AI system 1470. As yet another example, the local AI system 1470 may continuously receive data from the perception system 1420, the movement controller 1302, the behavior manager 1350, and the whole body controller 1550 and use the data to refine and optimize the currently executing model given present configurations, conditions, and constraints. It should be understood that the movement controller 1302, behavior manager 1350, perception system 1420, whole body controller 1550, and/or controllers 1600 may be omitted or replaced in alternative embodiments.

d. Retraining of BAM

The process of improving a deployed bipedal action model is an iterative one, as illustrated in the retraining flowchart of FIG. 29. The process begins with the collection of new real-world data (as shown in block 6002 of FIG. 29). This data can be generated by a previously trained and deployed BAM as it performs a variety of tasks. These tasks can be executed autonomously, either by a BAM that only includes a beta model 3001.2 trained for a specific task type, or a BAM that includes both an alpha model 3001.1 and a beta model 3001.2 that can interpret high-level speech or text commands from a user. The tasks may range from household chores, such as doing laundry, working in the kitchen, or tidying a room, to industrial jobs like working on a production line or sorting packages for delivery. In addition to autonomous operation, new data can also be collected through robot teleoperation, where a human operator controls the robot using a wearable teleoperation suit or a remote-control device like a joystick or game controller. Regardless of the method, the collected data can be rich and multimodal, including video recordings from the robot's cameras, task-related trajectory data, tracked poses, velocities, and torques of the robot's joints, as well as feedback from physical interaction, such as tactile and force sensor data.

Following data collection, the newly acquired data can be automatically labeled to prepare it for use in retraining (as shown in block 6004 of FIG. 31). The optional labeling process can be adapted to the data collection method. For tasks performed via teleoperation, the labeling can be done in real-time during the data collection session. For example, the human operator can provide verbal annotations that are recorded alongside the data, or they can input textual labels before, during, or after the session to describe the task or specific sub-actions. For tasks performed autonomously by the robot, the labels can be derived from the context of the task itself. For an alpha and beta model BAM, the original user input command that initiated the task can serve as the high-level label. For a beta model-only BAM, the known target task that the model was trained for can be used as the label. In addition to these methods, a general-purpose foundation model, such as a VLM or MLLM, can be used to perform offline, automated labeling by analyzing the video recordings of the robot's performance to classify the task being performed or to identify key events and sub-goals within the task.

The final steps of the retraining loop involve updating the training data and retraining the model. At step 6006, the newly collected and labeled data is used to update the main training dataset 4002. This can involve enriching the real-world data layer (4010) with the new on-policy data, which is particularly valuable as it reflects the model's own experiences and failure modes. The simulation and synthetic data layer (4020) can also be updated with new simulations run with the current BAM to explore a wider range of scenarios.

Furthermore, the foundational layer (4030) can be expanded with more internet videos or robot-free human data collected with VR/AR systems, especially for new tasks or to provide more examples of failure recovery. Finally, at step 6008, the BAM can be retrained or fine-tuned using this updated and enriched training dataset, and the improved model can then be redeployed back to the robot. This iterative process creates a powerful feedback loop, or "flywheel," where the model continuously learns from its own real-world interactions. This allows the BAM to progressively correct its mistakes, adapt to new situations, and expand its skill set, leading to a significant boost in its real-world performance, robustness, and overall capability.

e. Performance of BAM

The disclosed BAM constitutes a material and substantial improvement over conventional robotic control systems, overcoming fundamental limitations inherent in the prior art. Whereas conventional models are narrowly circumscribed to controlling only a 7-degree-of-freedom ("DoF") end-effector-treating the robot as little more than a disembodied arm—the disclosed BAM architecture is engineered to command the full sixty-two degrees of freedom of the humanoid robot. This comprehensive, whole-body control paradigm represents a significant departure from the state of the art. It enables the robot to execute highly coordinated, human-like motions that leverage its entire physical structure for dynamic balance adjustments, extended reach through torso and leg positioning, and sophisticated obstacle negotiation. These are capabilities that are simply unattainable with simplistic end-effector-only controllers, which cannot, by design, coordinate the robot's posture or center of gravity with the manipulation task at hand.

Furthermore, the BAM's operational modality represents a critical technical advancement. Unlike prior systems that generate discrete, binned-value outputs—thereby artificially constraining motion to a limited set of predefined poses and introducing perceptible jerkiness and imprecision—the BAM generates continuous control outputs in real time. The prior art's reliance on discrete actions is analogous to a film running at a low frame rate; motion is stilted and incapable of nuanced adjustment. The BAM's continuous control stream, by contrast, facilitates the seamless composition and blending of complex actions, a concept referred to as action chunking, which results in demonstrably smoother, more fluid, and time-consistent robotic movements. Consequently, the BAM is not merely an incremental improvement; its architecture directly remedies the deficiencies in motion quality and behavioral range that plague conventional systems. This full-body, continuous-output design allows the robot to make micro-adjustments on the fly, yielding a system that exhibits markedly enhanced robustness to environmental variations and unforeseen operational contingencies-a crucial advantage for real-world deployment where conditions are seldom static.

The technical and functional superiority of the BAM is not merely theoretical but is substantiated by rigorous comparative performance data, as delineated in FIG. 30. In complex manipulation tasks requiring both semantic generalization (e.g., recognizing an object's function regardless of its specific appearance) and motion generalization (e.g., placing an object in a novel position and orientation), the alpha/beta-model BAM achieved an approximate 90% success rate. This performance unequivocally surpasses that of established prior art systems, which demonstrated success rates of approximately 48% (OpenVLA), 46% (RT-2-X), 25% (RT-1-X), and a mere 4% (Octo). The disclosed system, therefore, provides a nearly two-fold performance increase over its closest competitors, elevating the technology from the level of a laboratory experiment to one approaching practical, real-world reliability.

Moreover, the BAM architecture achieves this superior performance with unprecedented parameter efficiency, underscoring its sophisticated and optimized design. The beta-only BAM variant, comprising a relatively lean 80 million parameters, achieves a success rate of approximately 40%. This level of performance is comparable to or materially exceeds that of vastly larger and more computationally demanding models, including the 7-billion-parameter OpenVLA and the 55-billion-parameter RT-2-X. The practical implications of this efficiency are profound, translating to lower hardware costs, reduced power consumption, and faster decision-making. That the disclosed BAM can outperform models that are approximately 87 to 687 times its size provides compelling evidence of its advanced and more effective architecture. Collectively, these interconnected attributes—namely, the expanded 62-DoF control scope and continuous control output that serve as the foundation for the empirically validated superiority in task success, environmental robustness, and parameter efficiency—demonstrate that the disclosed BAM offers profound and tangible technical benefits over conventional models.

F. ALTERNATIVE EMBODIMENTS

In some embodiments, the visuomotor subsystems may utilize alternative sensor and processing hardware. The perception system 1420 may comprise event-based or neuromorphic vision sensors that asynchronously report pixel-level brightness changes, which can be processed with lower latency and reduced data bandwidth. Further, the bipedal action model (BAM) may be executed on neuromorphic processing units (NPUs), which are optimized for sparse, asynchronous data, or Field-Programmable Gate Arrays (FPGAs) to create a custom, deterministic hardware pipeline for lower-latency inference. Additionally, the robot's 1 reliance on visual data may be supplemented or replaced by non-visual ranging sensors, such as LiDAR, sonar, or radar systems, to provide direct geometric information that is robust to challenging environmental conditions like poor lighting or occlusions from smoke.

The architecture defining the interaction between cognitive and reactive subsystems may also be modified. An alternative embodiment may feature a bi-directional communication link, allowing the beta model 3001.2 to transmit a feedback signal (e.g., indicating high prediction error) to the alpha model 3001.1, thereby enabling event-driven replanning. The information channel between the models 3001.1, 3001.2 may be varied; for instance, instead of a single latent vector, a structured vector with disentangled components for task goal, waypoints, and motion style could be used. In another alternative, the alpha model 3001.1 could output a sub-goal as a natural language text string (e.g., "grasp the red box") to be used as a direct conditioning prompt for the beta model 3001.2, or a declarative set of constraints to be solved by a downstream motion planner acting as the beta model 3001.2.

The hierarchical structure may be varied. For example, a "Council of Experts" architecture may employ multiple specialized models (e.g., for locomotion, manipulation, balancing) that operate in parallel, with a gating network to weigh and fuse their outputs. Another embodiment may extend the hierarchy to an alpha-beta-gamma structure, where a third-level gamma model handles high-frequency, reflexive actions.

The methods for training and deploying the BAM may be altered. An alternative embodiment may employ evolutionary algorithms or genetic programming for gradient-free optimization of the BAM. Another variation concerns runtime execution, where an event-driven cognitive process allows the alpha model 3001.1 to remain dormant until triggered by a specific event, thereby conserving computational resources. For a fleet of robots, the retraining process may be implemented using federated learning, where anonymized model updates are computed locally on each robot and aggregated on a central server to improve a global BAM, enhancing data privacy and reducing network bandwidth.

Further embodiments may integrate the BAM with other technologies. A deployed BAM may be integrated with a real-time digital twin of the robot and its environment, allowing the BAM to simulate and validate candidate action chunks before physical execution. In another configuration, the BAM may be architected to use a predictive world model, simultaneously outputting a motor action and a prediction of the next sensory state, using the prediction error as a high-speed feedback mechanism for real-time correction. Safety may be enhanced by a hardware-based "reflex chip," a hard-real-time coprocessor programmed with a fixed set of high-priority safety reflexes that operate independently of the main BAM stack.

The training paradigm may also be varied. Generative Adversarial Imitation Learning (GAIL) can be used, wherein the BAM (a generator) learns to produce trajectories that are indistinguishable from expert demonstrations to a discriminator network. Alternatively, the BAM can be trained using adversarial self-play in simulation against a "saboteur" agent to develop policies that are more robust to unforeseen disturbances. Meta-learning frameworks, such as Model-Agnostic Meta-Learning (MAML), may be used to train the BAM not for a single task, but to be efficient at learning new skills from a very small number of demonstrations.

G. INDUSTRIAL APPLICATION

While the present disclosure shows several illustrative embodiments of a robot (in particular, a humanoid robot), it should be understood that these embodiments are designed to be examples of the principles of the disclosed assemblies, methods, and systems. They are not intended to limit the broad aspects of the disclosed concepts solely to the specific embodiments that have been illustrated. As will be realized by one skilled in the art, the disclosed robot, and its associated functionality and methods of operation, are capable of other and different configurations. Furthermore, several of its details are capable of being modified in various respects, all without departing from the fundamental scope of the disclosed methods and systems. For example, one or more of the disclosed embodiments, either in part or in whole, may be combined with another disclosed assembly, method, and system to create hybrid implementations. As such, one or more steps from the diagrams or components in the Figures may be selectively omitted or combined in a manner that is consistent with the principles of the disclosed assemblies, methods, and systems. Additionally, the order of one or more steps from the arrangement of components may be omitted or performed in a different order than what is explicitly described. Accordingly, the drawings, diagrams, and the detailed description provided herein are to be regarded as illustrative in nature, and not as restrictive or limiting, of the said humanoid robot. It should be understood that the use of the word "or" when separating element names in connection with a single reference number indicates that the same structure can have two or more different names. For example, the phrase "end effector or hand assembly 56" indicates that the structure that is referenced by the number 56 can be referred to or claimed as either an "end effector" or a "hand assembly."

While the above-described methods and systems are primarily designed for use with a general-purpose humanoid robot, it should be understood that the disclosed assemblies, components, learning capabilities, or kinematic capabilities may be adapted for use with other types of robots. Examples of other such robots include, but are not limited to: an articulated robot (e.g., an arm having two, six, or ten degrees of freedom, etc.), a cartesian robot (e.g., rectilinear or gantry robots, robots having three prismatic joints, etc.), a Selective Compliance Assembly Robot Arm (SCARA) robot (e.g., a robot with a donut-shaped work envelope, with two parallel joints that provide compliance in one selected plane, with rotary shafts positioned vertically, with an end effector attached to an arm, etc.), a delta robot (e.g., a parallel link robot with parallel joint linkages connected with a common base, having direct control of each joint over the end effector, which may be used for pick-and-place or product transfer applications, etc.), a polar robot (e.g., a robot with a twisting joint connecting the arm with the base and a combination of two rotary joints and one linear joint connecting the links, having a centrally pivoting shaft and an extendable rotating arm, a spherical robot, etc.), a cylindrical robot (e.g., a robot with at least one rotary joint at the base and at least one prismatic joint connecting the links, with a pivoting shaft and an extendable arm that moves vertically and by sliding, with a cylindrical configuration that offers vertical and horizontal linear movement along with rotary movement about the vertical axis, etc.), a self-driving car, a kitchen appliance, construction equipment, or a variety of other types of robot systems. The robot system may include one or more sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art and is used in connection with robot systems. Likewise, the robot system may omit one or more of the aforementioned sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art to be used in connection with robot systems. In other embodiments, other configurations or components may be utilized.

As is well known in the data processing and communications arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication purposes. The software functionalities that are described herein involve programming, which includes executable code as well as associated stored data. This software code is executable by the general-purpose computer. In operation, the code is stored within the memory of the general-purpose computer platform. At other times, however, the software may be stored at other locations or transported for loading into the appropriate general-purpose computer system.

A server, for example, typically includes a data communication interface for engaging in packet data communication over a network. The server also includes a central processing unit (CPU), which may be in the form of one or more processors, for executing the program instructions. The server platform typically includes an internal communication bus, program storage, and data storage for the various data files that are to be processed or communicated by the server, although the server often receives its programming and data via network communications. The hardware elements, operating systems, and programming languages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that the term "substantially" as utilized herein means a deviation of less than 15% and preferably less than 5%. It should also be understood that the term "near" means within 10 cm, the term "proximate" means within 5 cm, and the term "adjacent" means within 1 cm. It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: (i) PCT Application Nos. PCT/US25/10425, PCT/US25/11450, PCT/US25/12544, PCT/US25/16930, PCT/US25/19793, PCT/US25/23064, PCT/US25/23325, PCT/US25/24817, and PCT/US25/25005; (ii) U.S. patent application Ser. Nos. 18/919,263, 18/919,274, 19/000,626, 19/006,191, 19/033,973, 19/038,657, 19/064,596, 19/066,122, 19/180,106, 19/223,945, 19/224,109, 19/224,252, 19/249,517, 19/252,392, and 19/252,708; and (iii) U.S. Design patents application Ser. Nos. 29/889,764, 29/928,748, 29/935,680, 29/954,572, 29/967,462, 29/993,115, and 29/998,761; (iv) U.S. Provisional Patent Application Nos. 63/556,102, 63/557,874, 63/558,373, 63/561,307, 63/561,311, 63/561,313, 63/561,315, 63/561,317, 63/561,318, 63/564,741, 63/565,077, 63/573,226, 63/573,528, 63/573,543, 63/574,349, 63/614,499, 63/615,766, 63/617,762, 63/620,633, 63/625,362, 63/625,370, 63/625,381, 63/625,384, 63/625,389, 63/625,405, 63/625,423, 63/625,431, 63/626,028, 63/626,030, 63/626,034, 63/626,035, 63/626,037, 63/626,039, 63/626,040, 63/626,105, 63/632,630, 63/632,683, 63/633,113, 63/633,405, 63/633,920, 63/633,931, 63/633,941, 63/634,042, 63/634,599, 63/634,697, 63/635,152, 63/677,087, 63/685,856, 63/690,334, 63/692,747, 63/692,765, 63/694,253, 63/694,304, 63/696,507, 63/696,533, 63/697,793, 63/697,816, 63/700,749, 63/702,185, 63/705,715, 63/706,768, 63/707,547, 63/707,897, 63/707,949, 63/708,003, 63/715,117, 63/715,270, 63/720,222, 63/722,057, 63/753,670, 63/757,440, 63/759,665, 63/760,617, 63/763,209, 63/766,911, 63/770,620, 63/770,654, 63/772,440, 63/773,078, 63/776,429, 63/792,520, 63/819,533, 63/837,511, 63/837,536, 63/839,386, 63/839,517, 63/839,612, 63/839,880, 63/839,918, and 63/841,314, each of which is expressly incorporated by reference herein in its entirety.

In this application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with a robot cannot be adopted or implemented into the disclosed humanoid robot without careful analysis and verification of the complex realities of designing, testing, manufacturing, and certifying a robot for the completion of usable work nearby or around humans. Theoretical designs that attempt to implement such modifications from non-robotic structures or features are insufficient, and in some instances, woefully insufficient, because they amount to mere design exercises that are not tethered to the complex realities of successfully designing, manufacturing, and testing a robot.

The invention claimed is:

1. A robot, comprising:

a sensor configured to obtain data;

an alpha model trained on video data and configured to generate data based upon both a spoken command from a human and data from the sensor; and a beta model configured to generate output data used to control an extent of the robot based in part upon: (a) the data generated by the alpha model, and (b) the data from the sensor, wherein the output data generated by the beta model is split into action chunks.

2. The robot of claim 1, wherein the alpha model is a diffusion model that is further trained on human video demonstration data, and wherein said human video demonstration data is captured using a device worn by a human.

3. The robot of claim 2, wherein the diffusion model is further trained on data obtained from robot demonstrations.

4. The robot of claim 1, wherein the alpha model or the beta model is generated in part by using distillation techniques.

5. The robot of claim 1, wherein the robot includes an actuator with a strain-wave gearbox.

6. The robot of claim 1, wherein the beta model is trained using reinforcement learning.

7. The robot of claim 1, wherein a temporal offset is included between the alpha and beta models during end-to-end training of said models.

8. The robot of claim 7, wherein a portion of the data generated by the beta model is permitted to backpropagate from the beta model to the alpha model.

9. The robot of claim 1, wherein the alpha model includes more than 1 billion parameters and processes data at a frequency that is between 0.0001 Hz and 20 Hz.

10. The robot of claim 9, wherein the beta model is a diffusion transformer with less than 1 billion parameters and processes data at a frequency that is between 1 Hz and 300 Hz.

11. The robot of claim 1, wherein the data generated by the alpha model includes task-conditioning latent data.

12. The robot of claim 11, wherein the task-conditioning latent data includes human-readable text data.

13. The robot of claim 1, wherein the robot comprises a first arm and a second arm, and said output data generated by the beta model comprises position data and rotation data for each of a plurality of joints of at least one of the first arm or the second arm.

14. The robot of claim 1, wherein the alpha model comprises a multimodal language model that is pre-trained on a general-purpose dataset comprising text data and image data and is subsequently fine-tuned on a domain-specific dataset associated with controlling one or more robots.

15. A robot, comprising:

a sensor configured to obtain data;

a first artificial intelligence model configured to generate data based upon data from the sensor, wherein the data generated by the first artificial intelligence model includes task-conditioning latent data; and a second artificial intelligence model trained using reinforcement learning and configured to use the data generated by the first artificial intelligence model and the data from the sensor to generate output data used to control an extent of the robot.

16. The robot of claim 15, wherein the first artificial intelligence model is a diffusion model trained on video data.

17. The robot of claim 16, wherein the diffusion model is further trained on human video demonstration data, and wherein said human video demonstration data is captured using a device worn by a human.

18. The robot of claim 17, wherein the first artificial intelligence model is further trained on data obtained from robot demonstrations.

19. The robot of claim 15, wherein a temporal offset is included between the first artificial intelligence model and the second artificial intelligence model during end-to-end training of said models.

20. The robot of claim 15, wherein the output data generated by the second artificial intelligence model is split into action chunks.

21. The robot of claim 20, wherein each of the action chunks comprises actions for each of a plurality of successive time steps.

22. The robot of claim 15, wherein the first artificial intelligence model includes more than 1 billion parameters and processes data at a frequency that is between 0.0001 Hz and 20 Hz.

23. The robot of claim 15, wherein the second artificial intelligence model includes less than 1 billion parameters and processes data at a frequency that is between 1 Hz and 300 Hz.

24. The robot of claim 15, wherein the task-conditioning latent data includes human-readable text data.

25. The robot of claim 15, wherein the robot comprises a first arm and a second arm, and said output data generated by the second artificial intelligence model comprises position data and rotation data for each of a plurality of joints of at least one of the first arm or the second arm.

26. The robot of claim 15, wherein the first artificial intelligence model comprises a multimodal language model that is pre-trained on a general-purpose dataset comprising text data and image data and is subsequently fine-tuned on a domain-specific dataset associated with controlling one or more robots.

27. A robot, comprising:

a sensor configured to obtain data;

an alpha model trained on video data and configured to generate data based upon both a command from a human and data from the sensor, wherein the alpha model includes more than 1 billion parameters and processes data at a frequency that is between 0.0001 Hz and 20 Hz; and a beta model configured to generate output data used to control an extent of the robot based in part upon: (a) the data generated by the alpha model, and (b) the data from the sensor.

28. The robot of claim 27, wherein the data obtained by the sensor comprises image data, and wherein the alpha model is configured to generate the data generated by the alpha model based upon both (a) text data representing the command from the human and (b) the image data.

29. The robot of claim 28, wherein the text data is converted into text tokens and the image data is converted into image embeddings, and wherein the alpha model processes the text tokens and the image embeddings to generate the data generated by the alpha model.

30. The robot of claim 27, wherein the robot comprises a first arm and a second arm, and said output data generated by the beta model comprises position data and rotation data for each of a plurality of joints of at least one of the first arm or the second arm.

31. The robot of claim 27, wherein the output data generated by the beta model is split into action chunks, and each action chunk comprises actions for each of a plurality of successive time steps.

32. The robot of claim 31, wherein a controller of the robot converts the actions of the action chunks into actuator commands at a rate that is greater than a rate at which the beta model generates the output data.

33. The robot of claim 27, wherein the beta model is trained on robot demonstration data comprising teleoperation data collected during teleoperation of one or more robots by one or more humans.

34. The robot of claim 33, wherein the one or more robots comprise a first robot having a first form factor and a second robot having a second form factor that is different from the first form factor.

35. The robot of claim 27, wherein the alpha model comprises a multimodal language model that is pre-trained on a general-purpose dataset comprising text data and image data and is subsequently fine-tuned on a domain-specific dataset associated with controlling one or more robots.

* * * * *